United States Patent
Dua et al.

(10) Patent No.: US 11,325,345 B2
(45) Date of Patent: May 10, 2022

(54) FIBER-BOUND ENGINEERED MATERIALS FORMED UTILIZING CARRIER SCREENS

(71) Applicant: NIKE, Inc., Beaverton, OR (US)

(72) Inventors: Bhupesh Dua, Portland, OR (US); Pamela S. Greene, Portland, OR (US); Bruce J. Kilgore, Lake Oswego, OR (US); Thomas J. Rushbrook, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/480,119

(22) PCT Filed: Nov. 30, 2017

(86) PCT No.: PCT/US2017/064053
§ 371 (c)(1),
(2) Date: Jul. 23, 2019

(87) PCT Pub. No.: WO2018/144119
PCT Pub. Date: Aug. 9, 2018

(65) Prior Publication Data
US 2019/0387831 A1    Dec. 26, 2019

Related U.S. Application Data

(60) Provisional application No. 62/548,239, filed on Aug. 21, 2017, provisional application No. 62/454,474, filed on Feb. 3, 2017.

(51) Int. Cl.
*D04H 1/492* (2012.01)
*D04H 5/03* (2012.01)
(Continued)

(52) U.S. Cl.
CPC .............. *B32B 5/26* (2013.01); *A43B 1/0027* (2013.01); *A43B 1/0072* (2013.01);
(Continued)

(58) Field of Classification Search
CPC .......... D04H 1/492; D04H 5/03; D04H 1/498; D04H 1/46; D04H 1/465; D04H 1/495;
(Continued)

(56) References Cited

U.S. PATENT DOCUMENTS

| 970,950 A | 9/1910 | Rasch |
| 2,020,928 A | 11/1935 | Asnes |

(Continued)

FOREIGN PATENT DOCUMENTS

| CN | 1121968 A | 5/1996 |
| CN | 101977762 A | 2/2011 |

(Continued)

OTHER PUBLICATIONS

International Search Report and Written Opinion dated Feb. 16, 2018 in International Patent Application No. PCT/US2017/064073, 15 pages.

(Continued)

*Primary Examiner* — Amy Vanatta
(74) *Attorney, Agent, or Firm* — Thomas | Horstemeyer, LLP

(57) ABSTRACT

A method of forming a fiber-bound engineered material utilizing carrier screens is provided that imparts an intended characteristic at an intended relative location. Also provided are articles formed of fiber-bound engineered materials manufactured utilizing carrier screens. A fiber layer is placed adjacent at least one carrier screen and entangled with additional fibers in a manner to create a non-uniform engineered material. The lack of uniformity of a fiber-bound engineered material may be accomplished through manipulation of the fibers and/or through fiber binding a scrim. The fiber layer binds with additional fibers through entanglement such that a mechanical connection between the entangled fibers is provided. This entanglement allows the fibers to (Continued)

bind without supplemental adhesives, interlacing, or connections.

17 Claims, 34 Drawing Sheets

(51) Int. Cl.
| | |
|---|---|
| B32B 5/26 | (2006.01) |
| A43B 1/00 | (2006.01) |
| A43B 23/02 | (2006.01) |
| A43D 11/14 | (2006.01) |
| B32B 5/02 | (2006.01) |
| B32B 5/06 | (2006.01) |
| B32B 37/18 | (2006.01) |
| B32B 5/10 | (2006.01) |

(52) U.S. Cl.
CPC .......... *A43B 23/024* (2013.01); *A43B 23/026* (2013.01); *A43B 23/0235* (2013.01); *A43B 23/0265* (2013.01); *A43D 11/14* (2013.01); *B32B 5/022* (2013.01); *B32B 5/024* (2013.01); *B32B 5/026* (2013.01); *B32B 5/028* (2013.01); *B32B 5/06* (2013.01); *B32B 5/10* (2013.01); *B32B 37/18* (2013.01); *D04H 1/492* (2013.01); *D04H 5/03* (2013.01); *B32B 2437/02* (2013.01)

(58) Field of Classification Search
CPC .. D04H 18/04; B32B 5/26; B32B 5/06; B32B 5/024; B32B 5/10; B32B 5/022; B32B 5/026; B32B 5/028; B32B 37/18; B32B 2437/02; A43B 1/0072; A43B 1/04; A43B 23/0235; A43B 23/026; A43B 23/0265; A43B 1/0027; A43B 23/024; A43B 23/0205; A43D 11/14
USPC .................................................. 28/104, 105
See application file for complete search history.

(56) References Cited

U.S. PATENT DOCUMENTS

| | | | |
|---|---|---|---|
| 3,494,821 A * | 2/1970 | Evans ................... | D04H 1/495 442/352 |
| 3,956,560 A | 5/1976 | Smith, II | |
| 4,144,366 A | 3/1979 | Lewis | |
| 4,146,663 A | 3/1979 | Ikeda et al. | |
| 4,248,652 A | 2/1981 | Civardi et al. | |
| 4,251,587 A | 2/1981 | Mimura et al. | |
| 4,434,205 A | 2/1984 | Fujii et al. | |
| 4,602,442 A | 7/1986 | Revill et al. | |
| 4,603,075 A | 7/1986 | Dergarabedian et al. | |
| 4,808,467 A * | 2/1989 | Suskind ................. | D21H 27/34 28/104 |
| 4,927,070 A | 5/1990 | Kretchmer | |
| 5,144,729 A * | 9/1992 | Austin ..................... | B32B 5/26 28/105 |
| 5,254,399 A * | 10/1993 | Oku ....................... | D21H 13/10 428/373 |
| 5,301,400 A * | 4/1994 | Boulanger ............ | B29C 51/004 28/104 |
| 5,403,527 A | 4/1995 | West | |
| 5,413,849 A * | 5/1995 | Austin ..................... | D04H 1/54 28/104 |
| 5,525,397 A | 6/1996 | Shizuno et al. | |
| 5,534,330 A | 7/1996 | Groshens | |
| 5,593,533 A | 1/1997 | Groshens | |
| 5,707,710 A | 1/1998 | Zafiroglu | |
| 5,994,245 A | 11/1999 | Marier et al. | |
| 6,264,879 B1 | 7/2001 | Addie et al. | |
| 6,314,627 B1 * | 11/2001 | Ngai ........................ | B32B 5/26 28/104 |
| 6,790,797 B1 | 9/2004 | Benim et al. | |
| 6,881,288 B2 * | 4/2005 | Davies .................. | B29C 70/081 156/148 |
| 7,356,892 B2 * | 4/2008 | Barth ................ | A61F 13/15699 28/104 |
| 7,484,277 B2 | 2/2009 | Tanaka et al. | |
| 8,051,583 B2 | 11/2011 | Roether et al. | |
| 8,199,317 B2 | 6/2012 | Habel et al. | |
| 8,225,469 B2 * | 7/2012 | Bevan .................... | D04H 11/08 28/104 |
| 2007/0037462 A1 | 2/2007 | Allen et al. | |
| 2007/0128411 A1 * | 6/2007 | Kawai ...................... | B32B 5/08 428/170 |
| 2007/0271823 A1 | 11/2007 | Meschter | |
| 2008/0003908 A1 * | 1/2008 | Nguyen ................ | D04H 1/492 442/327 |
| 2008/0163469 A1 | 7/2008 | Tanaka et al. | |
| 2009/0303460 A1 | 12/2009 | Habel et al. | |
| 2010/0199406 A1 | 8/2010 | Dua et al. | |
| 2013/0226120 A1 * | 8/2013 | Van De Maele ... | A61F 13/5323 604/372 |
| 2013/0260629 A1 | 10/2013 | Dua et al. | |
| 2014/0134904 A1 | 5/2014 | Wang et al. | |
| 2015/0282565 A1 | 10/2015 | Kilgore | |
| 2019/0366680 A1 | 12/2019 | Dua et al. | |
| 2019/0387830 A1 | 12/2019 | Dua et al. | |
| 2019/0387831 A1 | 12/2019 | Dua et al. | |
| 2019/0387839 A1 | 12/2019 | Dua et al. | |
| 2020/0008512 A1 | 1/2020 | Dua et al. | |
| 2020/0008514 A1 | 1/2020 | Dua et al. | |
| 2020/0060377 A1 | 2/2020 | Dua et al. | |

FOREIGN PATENT DOCUMENTS

| | | |
|---|---|---|
| CN | 102933375 A | 2/2013 |
| CN | 103815619 A | 5/2014 |
| CN | 104334042 A | 2/2015 |
| CN | 104414023 A | 3/2015 |
| CN | 104473376 A | 4/2015 |
| CN | 104754976 A | 7/2015 |
| EP | 1978153 A1 | 10/2008 |
| EP | 2006444 A2 | 12/2008 |
| EP | 3112530 A1 | 1/2017 |
| EP | 3075277 B1 | 4/2019 |
| GB | 2132554 A | 7/1984 |
| JP | 2006055467 A | 3/2006 |
| WO | 2004049853 A1 | 6/2004 |
| WO | 2015126613 A1 | 8/2015 |
| WO | 2016138234 A1 | 9/2016 |
| WO | 20161382334 A1 | 9/2016 |

OTHER PUBLICATIONS

International Preliminary Report on Patentability dated Apr. 18, 2019 in International Patent Application No. PCT/US2017/064073, 7 pages.
International Search Report and Written Opinion dated Feb. 16, 2018 in International Patent Application No. PCT/US2017/064064, 14 pages.
International Preliminary Report on Patentability dated Apr. 25, 2019 in International Patent Application No. PCT/US2017/064064, 7 pages.
International Search Report and Written Opinion dated Feb. 16, 2018 in International Patent Application No. PCT/US2017/064068, 13 pages.
International Preliminary Report on Patentability dated Apr. 12, 2019 in International Patent Application No. PCT/US2017/064068, 7 pages.
International Search Report and Written Opinion dated Feb. 16, 2018 in International Patent Application No. PCT/US2017/064059, 13 pages.
International Preliminary Report on Patentability dated Apr. 25, 2019 in International Patent Application No. PCT/US2017/064059, 7 pages.

(56) References Cited

OTHER PUBLICATIONS

International Search Report and Written Opinion dated Feb. 16, 2018 in International Patent Application No. PCT/US2017/064042, 13 pages.
International Preliminary Report on Patentability dated Apr. 18, 2019 in International Patent Application No. PCT/US2017/064042, 7 pages.
International Search Report and Written Opinion dated Feb. 16, 2018 in International Patent Application No. PCT/US2017/064057, 13 pages.
International Preliminary Report on Patentability dated Apr. 25, 2019 in International Patent Application No. PCT/US2017/064057, 9 pages.
International Search Report and Written Opinion dated Feb. 16, 2018 in International Patent Application No. PCT/US2017/064065, 14 pages.
International Preliminary Report on Patentability dated Apr. 18, 2019 in International Patent Application No. PCT/US2017/064065, 7 pages.
International Search Report and Written Opinion dated Feb. 16, 2018 in International Patent Application No. PCT/US2017/064053, 15 pages.
International Preliminary Report on Patentability dated Apr. 25, 2019 in International Patent Application No. PCT/US2017/064053, 7 pages.
Non-Final Office Action received for U.S. Appl. No. 16/480,922, dated Jan. 6, 2020, 9 pages.
International Preliminary Report on Patentability for PCT/US2017/064012, dated Oct. 15, 2019.
International Search Report and Written Opinion for PCT/US2017/064012, dated Apr. 6, 2018.

\* cited by examiner

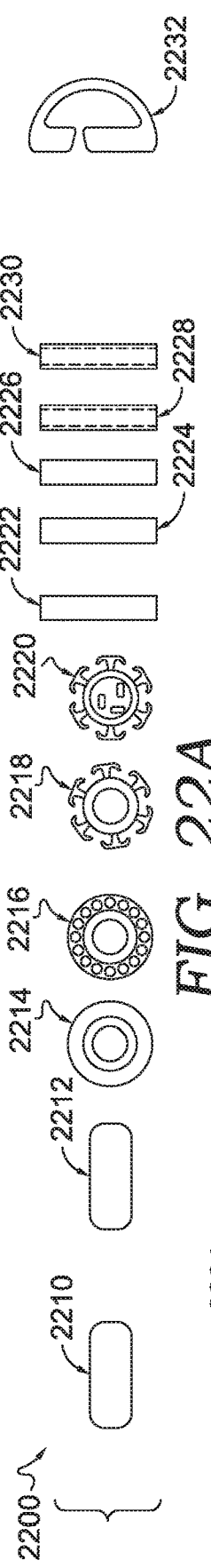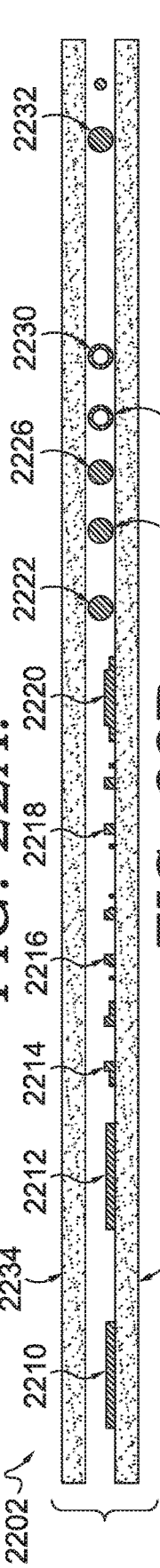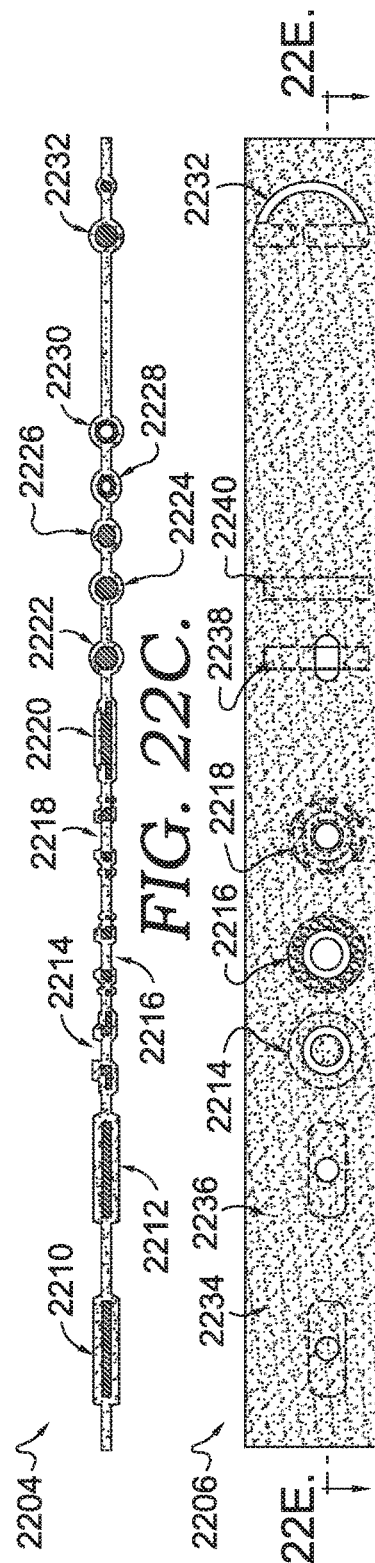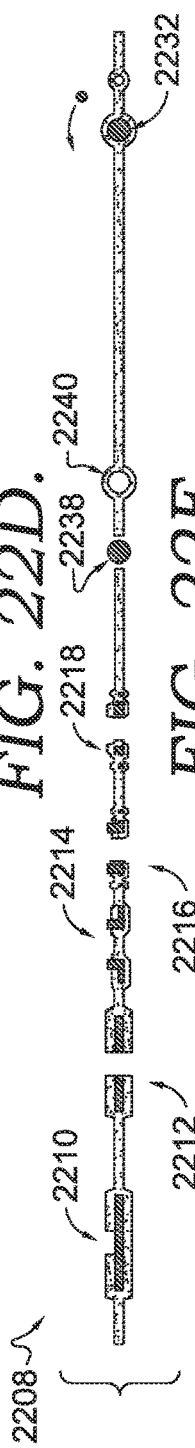
FIG. 22A. FIG. 22B. FIG. 22C. FIG. 22D. FIG. 22E.

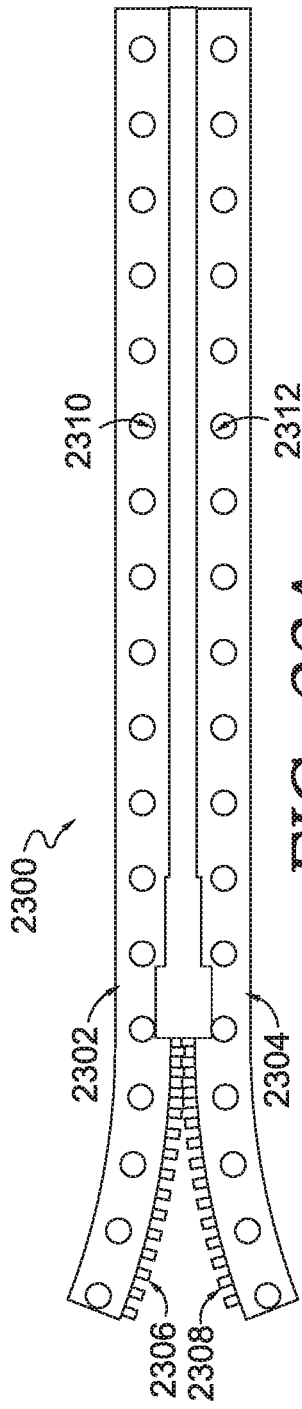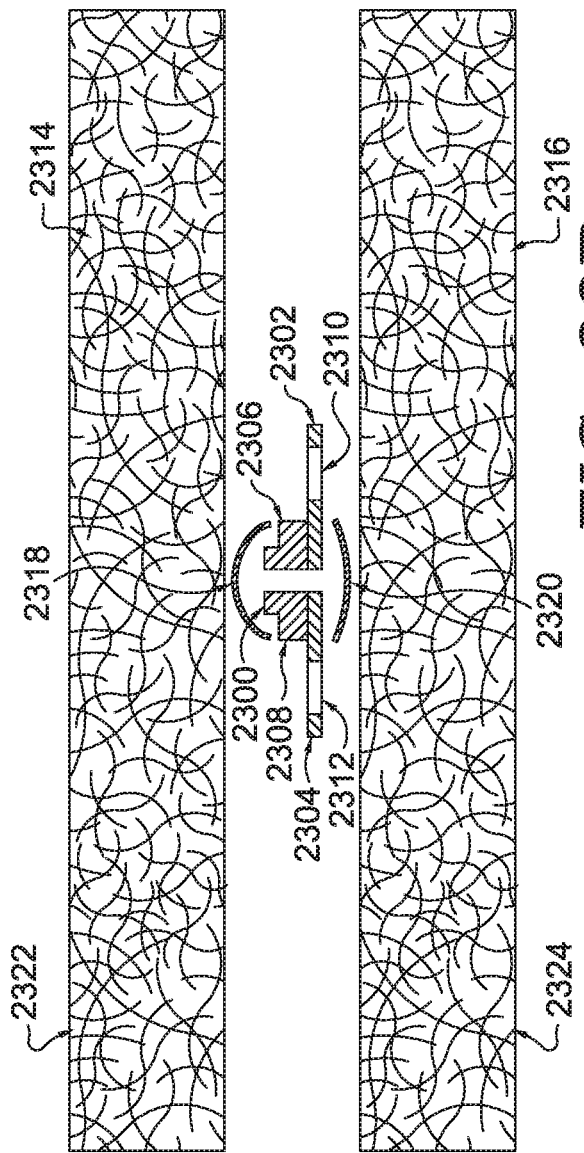

FIBER-BOUND ENGINEERED MATERIALS FORMED UTILIZING CARRIER SCREENS

CROSS-REFERENCE TO RELATED APPLICATIONS

This application is a 35 U.S.C. § 371 national stage application of PCT Application Number PCT/US2017/064053, filed Nov. 30, 2017, and entitled "FIBER-BOUND ENGINEERED MATERIALS FORMED UTILIZING CARRIER SCREENS", which claims the benefit of priority of U.S. Application 62/454,474, filed Feb. 3, 2017, and entitled "FIBERBOUND ENGINEERED MATERIAL", and also claims the benefit of priority of U.S. Application 62/548,239, filed Aug. 21, 2017, and entitled "FIBER BOUND ENGINEERED MATERIALS FORMED USING CONTINUOUS SCRIMS". The entirety of each of the aforementioned applications is incorporated by reference herein.

FIELD OF THE INVENTION

Aspects hereof relate to engineered textiles having fiber binding and methods of forming the same. Aspects further relate to engineered textiles formed utilizing carrier screens.

BACKGROUND OF THE INVENTION

Stock materials, such as rolled goods, traditionally have a uniform functional characteristic throughout the material. To form engineered articles from the stock materials, the stock materials may be cut into individual pieces and layered and/or combined to build the engineered article. The layering and combining of discrete pieces can increase costs, increase bulk, increase waste, and limit design options for the resultant engineered article.

SUMMARY OF THE INVENTION

Aspects hereof provide a fiber-bound engineered material, and methods of making the same, that provides an intended characteristic at an intended relative location. A fiber layer is entangled with additional fibers in a manner that creates a non-uniform engineered material. That is, a fiber layer is entangled with additional fibers in a manner that creates an engineered material having at least one non-uniform functional characteristic. Lack of uniformity in a fiber-bound engineered material may be accomplished through manipulation of the fibers forming the fiber layer, manipulation of additional fibers, and/or through fiber-binding a scrim. The fiber layer binds with additional fibers through entanglement such that a mechanical connection between the entangled fibers is created. This entanglement allows the fibers to bind without supplemental adhesives, interlacing, or connections. Variations in the fibers and/or inclusion of scrim materials prior to entanglement allows for an intended characteristic (e.g., a functional characteristic) at an intended relative location (e.g., a position determined by an article to be formed therefrom).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWING

Illustrative aspects hereof are described in detail herein with reference to the attached drawing figures, which hereby are incorporated by reference and wherein:

FIG. 22A depicts an assembly having a plurality of exemplary scrim elements, in accordance with aspects hereof;

FIG. 22B depicts a cross-section of the assembly of FIG. 22A, each exemplary scrim element being positioned between first and second fiber layers, in accordance with aspects hereof;

FIG. 22C depicts the assembly of FIG. 22B subsequent to entanglement of the first and second fiber layers, in accordance with aspects hereof;

FIG. 22D depicts a plan view of certain exemplary entangled elements subsequent to a trimming operation, in accordance with aspects hereof;

FIG. 22E depicts a cross-section of the exemplary assembly of FIG. 22D, in accordance with aspects hereof;

FIG. 23A depicts a schematic diagram of a zipper, in accordance with aspects hereof;

FIG. 23B depicts a cross-section of the zipper of FIG. 23A positioned between first and second fiber layers, in accordance with aspects hereof;

DETAILED DESCRIPTION OF THE INVENTION

Figure 1:
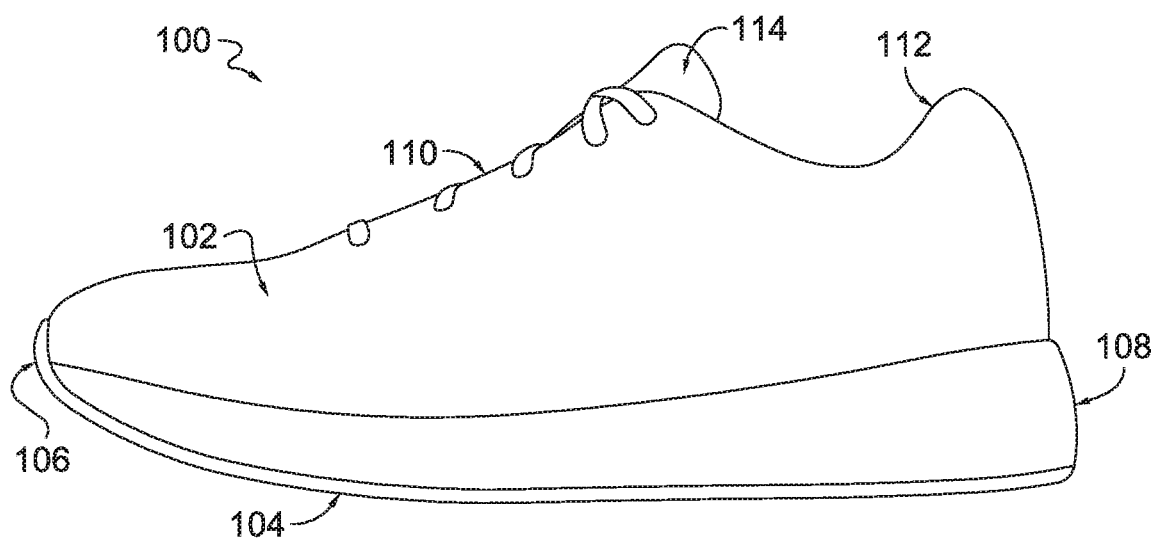
FIG. 1 is a schematic diagram depicting an exemplary article of footwear, in accordance with aspects hereof.

Fiber binding is a process in which fibers from one or more fiber layers are entangled to form a complex composite material that is engineered for an article. The engineered material may have structures entrapped within the fiber layers to achieve an engineered quality for a specific article, such as a shoe or piece of apparel. In the context of a sport shoe, the fiber-bound material may include, by way of example only, an entrapped high-tensile cable element to transfer lace loads from a throat to a sole, entrapped foam-structure elements that provide padding in a heel collar, entrapped fusible-material elements that form into a rigid heel stay and/or a water-resistant membrane in the toe box, and/or entrapped hardware elements that serve as a lacing structure. All of the elements/components are integral to the engineered material as they are entangled with and/or by the one or more fiber layers without additional cutting, fusing, or sewing operations being performed.

The one or more fiber layers serve as a platform and a binder onto which additional materials are secured to build a unique hybrid composite material that is consolidated into a single material through entanglement. The entanglement causes the fibers of the one or more fiber layers to physically interact with and lock in the additional materials to create a cohesive and complete material that can be formed into an article. The materials added to the fiber layer(s) and the materials forming the fiber layer(s) can be deliberately and/or strategically placed to achieve an intended functional characteristic at an intended relative location that allows for a highly engineered material to be formed as a complex composite that is consolidated into a single material through entanglement.

The resulting fiber-bound engineered material is light-weight, comfortable, customized, and efficient to manufacture. Fiber-bound engineered materials can be applied to an unlimited number of industries and articles. For example, in sport apparel, an engineered bra having fiber-bound clasps, rings, padding, and support elements may be formed as a single material that is light-weight, breathable, and comfortable. Fiber-bound engineered material also may be utilized, for instance, in footwear or apparel to create outer-facing layers and inner-facing layers having different properties, for instance, to create a moisture differential capable of transporting moisture away from the inner-facing layer. For instance, the content and/or linear mass density measurement (denier) of the polymers comprising the fibers on the outer-facing surface (first surface) and the inner-facing surface (second surface) of an article may be changed to alter the relative moisture-transport properties thereof. Fiber-bound engineered material also may form a shoe that has integral engineered characteristics, such as lock down, elasticity, breathability, traction elements, and padding. Fiber-bound engineered materials also may be processed into synthetic leather that maintains the engineered characteristics while further being classified as engineered synthetic leather. Therefore, this material that is highly efficient to manufacture and also has an infinite degree of custom engineering available, may replicate synthetic leather in an engineered material form.

Fiber-bound engineered materials have a signature look derived from the fiber layer(s) forming the fiber binding. Fiber transitions between integral elements of a fiber-bound engineered material contribute to this distinctive appearance. Regardless of top coats and post processes, a fiber-bound engineered material is distinctive in appearance due to the fiber binding that serves as a lattice maintaining elements that form or are entrapped within the fiber-bound engineered material.

Engineered materials are materials that provide an intended characteristic at an intended relative location for an article to be formed therefrom. This is in contrast to stock materials. A stock material merely provides characteristics without regard to intended location(s) of the characteristics within an article to be formed. As such, with a stock material the article to be formed is manipulated to obtain a chosen characteristic at an intended relative location for the article. This manipulation may include combining pieces of the stock material(s) in different orientations and locations to achieve an intended overall characteristic profile (e.g., a functionality fingerprint that is unique to the collection of elements and relative position of those elements). The combining of pieces of stock material(s) introduces waste from forming the pieces (e.g., cutting scrap), it inserts inefficiencies (e.g., additional manufacturing steps such as sewing and bonding and/or more opportunities for manufacturing errors to occur causing a higher scrap rate), it inserts unintended characteristics to the article (e.g., joints between combined materials that interrupt transitions between material characteristics), it limits article design options, and it limits comfort and fit of the resulting article.

Engineered materials can include at least knit manufactured materials, woven manufactured materials, braided manufactured materials, manufactured materials formed using tailored placement of fibers, deposition-formed manufactured materials, molded manufactured materials, injection-formed manufactured materials, compression-formed manufactured materials, expansion-formed manufactured materials, and reduction-formed (e.g., cutaway, dissolved or milled) manufactured materials. Each of the engineered materials can be formed utilizing different techniques, different processes, different materials, and/or different machines, which can impart different characteristics, uses, and costs. One engineered material may not be substituted for another engineered material in all use scenarios. This is, in part, a result of article design, needs, and usage. Therefore, while engineered materials are generally known, each engineered material provides its own advantages for specific implementations.

Aspects herein contemplate a fiber-bound engineered material. The fiber-bound engineered material is an engineered material that provides an intended characteristic at an intended relative location for an article to be formed therefrom.

Fiber-bound (or fiber-bind) refers to maintaining materials in a defined relative position with fiber binding. Fiber binding is a physical entanglement of fibers that generates a mechanical connection. Fiber binding may maintain a material in a defined relative position by entangling fibers of a fiber layer with fibers of the material to be maintained. Fiber binding also may maintain a material in a defined relative position by entangling fibers of a first fiber layer on a first side of the material to be maintained with fibers of a second fiber layer on a second side of the material to be maintained (e.g., encasing or entrapping the material to be maintained). Fiber binding further may maintain a material in a defined relative position by entangling fibers of a first fiber layer on a first side of the material to be maintained with fibers of both the material to be maintained and a second fiber layer on a second side of the material to be maintained. Similarly, fiber binding contemplates a multi-dimensional entanglement of fibers. Therefore, for the examples provided above wherein the fibers of a first fiber layer are entangled with another set of fibers, it is contemplated that the other set of fibers are also entangled with the fibers of the first fiber layer.

Fiber entanglement, the physical interaction of fibers that results in a mechanical connection between the entangled fibers, may be accomplished with a variety of techniques. Fiber entanglement may be accomplished through the physical movement of a first fiber into contact with a second fiber to cause a frictional and/or mechanical intertwinement. The physical movement may be accomplished with one or more barbs of a barbed needle, one or more sharp tips of a structured needle (e.g., in non-wovens), and/or a focused stream of fluid (e.g., liquid and/or gas).

Barbed-needle entanglement has a needle-like element comprised of one or more barbs that pass into or through a collection of fibers to cause an interlocking of the fibers. For example, a technique commonly referred to as needle felting relies on entanglement with barbed needles. In this example, a barbed needle (or plurality of barbed needles) moves up and down on a collection of fibers with the barbs of the needle(s) catching fibers and causing a physical interaction between the fibers. The up and down movements of the barbed needles are effective to move fibers upwards and downwards within the fiber collection causing a fiber at or near a first surface to move towards fibers at or near an opposite surface of the collection and vice versa. A traditional sewing needle not having barbs to intentionally cause a movement of fibers merely causes puncture of the fibers and does not result in entanglement as contemplated herein. For example, sewing of a fiber layer with a traditional sewing needle is joining through stitching and not joining through entanglement.

Structured needle entanglement includes a needle element having one or more sharp tips that create a particular structure as the tip(s) pass into or through a collection of fibers. For instance, a structured needle may create a diamond structure or a loop structure upon entanglement. In structured needle entanglement, the profile of the needle element is such that while the needle element is passed through a collection of fibers, a structure is also created, the shape of the structure being based on the profile of the needle tip(s). By way of example only, a structured needle may comprise a fork-like structure having two prongs with a gap there between wherein upon passing through the collection of fibers, at least a portion of the collection of fibers aligns with the gap permitting formation of a structure coincident with the profile of the needle elements.

Fluid entanglement relies on high-pressure jets (e.g., streams) of liquid (e.g., water) to pass into or through a collection of fibers and physically move portions of one or more fibers. The liquid jet stream may pass in a single direction or the stream may pass in multiple directions to achieve different entanglements. Additionally, the fluid stream conditions and parameters can be altered to change the resulting entanglement. For example, adjustment of pressure, stream size, direction, speed, number of interactions, stream shape, and the like can be adjusted to alter the resulting entangled fibers. For example, increases in stream pressure can result in splitting one or more fibers during the entanglement process which can generate greater entanglement surfaces and a change in fiber properties. Additionally, fluid entanglement may be effective to incorporate one or more structures or textures into the entangled fiber layer. For example, a drum about which entanglement may occur may have one or more textures or structures that help define a resulting texture or structure resulting from entanglement about the drum. The drum may include a plurality of apertures that cause formation of apertures in the fiber layer(s) during entanglement. Also, the drum may include a variable surface that imparts a texture to the fiber layer(s) as part of the entanglement process. Fluid entanglement also may be referred to as spunlacing, in an exemplary aspect. One exemplary form of fluid entanglement wherein streams of water are utilized commonly is referred to as hydroentanglement.

The entanglement process may be performed uniformly or it may be performed zonally. In a first exemplary aspect, entanglement applies a common entanglement condition across an entire collection of fibers. This uniformity may provide a simplified entanglement process. As will be described hereinafter, it is contemplated that other variables (e.g., materials, position of materials, relative position of materials, and size, thickness, weight, and/or density of materials) may be adjusted to achieve an engineered material while still implementing a uniform entanglement process.

A variable entanglement process may include a zonally-controlled entanglement. For example, a first area of a collection of fibers may receive entanglement having a first set of parameters (e.g., duration, pressure and/or cycles) while a second area of the same collection of fibers may receive entanglement having a second set of parameters. The resulting engineered material may have different characteristics formed by fiber entanglement in the first area than those formed by fiber entanglement in the second area. For instance, at a first area of a collection of fibers, a hydroentanglement characteristic may be at a high pressure and duration that is effective to split the fibers while in a second area of the collection of fibers the pressure and duration may be reduced such that the fibers do not split. In this example, the first area may have higher tear strength, greater fineness, and lesser loft relative to the second area, for example.

The variability in entanglement characteristics may be manually controlled by an operator of an entanglement machine and/or the variability in entanglement characteristics may be automated based on computer-controlled entanglement equipment. For example, it is contemplated that a vision system or other identification device may be used to identify a component and to determine an appropriate variable entanglement to provide. In this example, a position orientation, size, and article type may be determined by the vision system or other identification device and used to control the characteristics of the entanglement and position of the entanglement relative to the article. A computer may store one or more programs having pre-determined instructions for implementing a variable entanglement process based on a determined article and/or position of the article.

Another variable that may be adjusted to achieve a difference in entanglement characteristics is the barbed needle utilized for barbed-needle entanglement. The number of needles, the size of the needle(s), the shape of the needle(s), and the barb size/shape/number on a particular needle also may be adjusted for different materials and/or locations. For example, different needle types/sizes/shapes may be used on a common collection of fibers to achieve different entanglement results. For instance, the selection of a needle may depend, at least in part, on the material, construction, and/or size of a scrim (i.e., an element maintained in a relative position by one or more fiber layers as a fiber-bound element, as more fully described below) placed at a given location of a collection of fibers. Therefore, in a first location of the collection of fibers, the first location including a first scrim having a first characteristic, a first barbed needle may be selected. In a second location of the collection of fibers, the second location including a second scrim having a second characteristic, a second barbed needle may be selected. The difference in the first and second barbed needles may be to achieve a different entanglement, to improve entanglement efficiency, and/or to improve manufacturability (e.g., limit needle breakage while still minimizing needle size). Further yet, it is contemplated that a collection of barbed needles may be bundled as a common entanglement tool. How and in what combination the barbed needles are bundled also may contribute to zonal manipulation of the fibers through entanglement.

In a specific example, it is contemplated that a needle entanglement machine may have a collection of barbed needles extending along a material width. The needles may be varied in one or more characteristics (e.g., diameter, barb size, barb direction and/or barb number) depending on a relative location along the material width. For example, a repeating pattern of needle characteristics may be used to form a recurring striation of entanglement patterns along the material width. In practice, this may be used such that each width-wise striation reflects an area in which an article is to be formed. For example, along a single striation, a toe-end on a right portion of the striation and a heel-end on a left portion of the striation may have different entanglement characteristics based on scrim selection and/or fiber selection at the relative location. As such, a rolled good may be formed with zonal attributes resulting from entanglement along a roll width through varied barbed needle characteristics.

Yet another variable that may be adjusted to achieve a difference in entanglement characteristics is the profile of the needle element(s) utilized for structured-needle entanglement. The number of needles, the profile of the needle element(s), and the needle element size/shape/number on a particular needle also may be adjusted for different materials and/or locations. For example, different needle elements/sizes/shapes may be used on a common collection of fibers to achieve different entanglement results. For instance, the selection of a structured needle (and, thus, its structured needle elements) may depend, at least in part, on the material, construction, and/or size of a scrim (i.e., an element maintained in a relative position by one or more fiber layers as a fiber-bound element, as more fully described below) placed at a given location of a collection of fibers. Therefore, in a first location of the collection of fibers, the first location including a first scrim having a first characteristic, a first structured needle may be selected. In a second location of the collection of fibers, the second location including a second scrim having a second characteristic, a second structured needle may be selected. The difference in the first and second structured needles may be to achieve a different entanglement, to improve entanglement efficiency, and/or to improve manufacturability (e.g., limit needle breakage while still minimizing needle size). Further yet, it is contemplated that a collection of structured needles may be bundled as a common entanglement tool. How and in what combination the structured needles are bundled also may contribute to zonal manipulation of the fibers through entanglement.

Fiber Layer

A fiber is a slender and significantly elongated natural or synthetic pliable material. A fiber, in an exemplary aspect, has a length that is at least 100 times a width/diameter of the fiber. However, it is contemplated that the ratio of diameter/length may be less than 1:100. For example, in some instances a fiber may be formed from a cut segment where prior to being cut, the at least 100 times length-to-diameter ratio was satisfied, but subsequent to cutting the original fiber, a smaller multiple is measured. An example may be protein-based strand-like materials, such as animal hide/skin, which may have a smaller ratio, but still may be considered a fiber. Other natural or bio-synthetic fibers are contemplated, such as polymeric fibers from plant, animal, and/or microbial sources. Polypeptide polymers are protein-based fibers. Examples of polypeptides include, but are not limited to, collagen, keratin, silk, wool, cashmere, and soy-based fibers. Other contemplated natural fibers include, but are not limited to, polysaccharide polymers such as cotton, rayon, ramie, and other cellulosic-derived compounds. In an additional example, a fiber is an extruded composition comprising a hydrocarbon-based polymer. For example, a thermoplastic may be extruded as continuous filaments that are fibers for purposes of the present application. A composition forming a fiber may consist essentially of, or be comprised of, any of the following non-limiting examples: thermoplastic polyurethane (TPU), polyurethane, polyesters, polyamides, polyolefins, polycarbonates, and/or co-polymers thereof. Additional materials are contemplated as well, such as aramids, glass, cellulosic materials, carbon, metals, minerals, polyacrylonitriles, and the like. Further, it is contemplated that a fiber may consist essentially of any of the contemplated materials, or a fiber may be a composition comprising the contemplated materials in combination with additional materials (e.g., protein-based with a polymer coating), such as additives, fillers, coatings, treatments, and the like. An additional listing of suitable "polymers" from which a fiber, fiber layer, scrim, scrim element, and the like may be formed is included hereinafter.

A fiber may be interpreted to include filament, yarn, thread, string, cord, strand, and the like. Stated differently, a "fiber layer" may be formed from yarn, thread, cord, strand, and the like and still be a fiber layer for purposes of the present application. The fiber may be a continuous fiber or a staple fiber. Additionally, it is contemplated that a fiber may be a macro fiber or a micro fiber. For example, a fiber may have a linear mass density measurement expressed as denier per filament ("dpf") of 1 to 9 dpf. Alternatively, a fiber may have a linear mass density measurement expressed as a denier (or denier per filament) of 0.001 to 0.999 dpf. In some examples, a fiber may have a first dpf when formed into a collection of fibers (e.g., a batting layer) and the fiber may have a much smaller dpf subsequent to entanglement (e.g., chemical or mechanical fibrillation). For instance, the fiber may split into a greater number of fibers during entanglement. A fiber may be an island-in-the-sea construction such that a trigger (e.g., chemical, heat, light, and/or water) may be applied to dissolve the sea portion or otherwise break up the original fiber. For example, a staple fiber may start at a size between 1 and 9 dpf and end with a size of between 0.005 and 0.1 dpf, in some examples. The reduction may be accomplished though dissolution of the sea by solvent reduction or solubilizing portions, such as polyvinyl alcohol dissolved with water. Additionally, segmented pie construction may be leveraged to achieve a reduction in fiber size. It is contemplated that the fibers may reduce from 3 dpf to 0.05 dpf. This too may be accomplished through techniques like solvent reduction. This change in fiber count and/or dpf may be useful to change one or more characteristics of the collection of fibers. For example, microfibers too fragile to form into a batting may result from the reduction in dpf (e.g., by splitting and/or reaction) that is desired in the final article.

Additionally, it is contemplated that a fiber may be measured at a cross-section in a traverse direction relative to a longitudinal length of the fiber. The cross-sectional width in the traverse direction is hereinafter referred to as a "fiber width." It is contemplated that suitable fibers may have a fiber width of any range, but in an exemplary aspect a fiber has a fiber width of 200 microns to 100 nanometers. Another contemplated fiber width range includes 100 microns to 100 nanometers. Yet another contemplated range for fiber width is 25 microns to 0.01 microns. Another contemplated fiber width range is 10 microns to 0.01 microns. A macro fiber has a fiber width range of 10 microns to 200 microns. A micro fiber has a fiber width range of 10 microns to 1 micron. A nano fiber has a fiber width that is less than 1 micron (e.g., 0.9999 microns to 100 nanometers). Exemplary materials contemplated may have fiber widths such as a cotton fiber at about 20 microns, a wool fiber between 10 and 25 microns, a nylon fiber between 12 and 16 microns, an apparel polyester fiber between 12 and 25 microns, and a glass fiber at about 150 microns.

A collection of fibers may be comprised of a variety of fibers. The variety of fibers may be different based on any characteristic, such as material composition, dpf, fiber width, size, cross-sectional shape in the traverse direction (e.g., round, ovoid, triangular, rectilinear, lobed, dogbone, or hollow), a longitudinal profile (e.g., flat, straight, wavy, crimped, smooth, scaled, branched, or irregular) and/or length. The collection of fibers may be a non-uniform distribution of different fibers (e.g., a zonal distribution for the collection) or a relatively consistent distribution (e.g., a homogeneous collection of different fibers). Further, a collection of fibers may vary based on position in an X-Y plane and/or in a Z direction. For example, it is contemplated that a first fiber may be located at a first position of a batting layer through the thickness of the batting layer and a second fiber that is different from the first fiber may be located at a second position of the batting layer through the thickness of the batting layer. In an alternative example, it is contemplated that a first stratum of a batting material includes a first fiber and a second stratum of the batting layer includes a second fiber that is different from the first fiber. It is contemplated that both X-Y position and stratum variations in fiber type may be implemented to achieve an engineered material.

The fibers may be constructed into a variety of forms, such as a nonwoven material. A nonwoven fiber material may be referred to as batting in some examples. A nonwoven material is a material that is neither woven nor knit. Instead, a collection of fibers are held together through mechanical and/or chemical interactions. An example of a nonwoven material includes felt. Felt is neither woven nor knit. Instead, felt is a material where a collection of fibers are mechanically manipulated to form a mat-like material. However, felt is not an engineered material in that traditional felt has uniform characteristics and it is unable to provide an intended characteristic at an intended relative location for an article to be formed therefrom. For example, when forming an article with felt, the orientation, position of a portion of the felt from a greater collection of the felt, or other functional characteristics of the felt are not accounted for when forming the article as the felt is substantially constant in its characteristics.

A plurality of fibers, as described above may be homogenous or heterogeneous, and may be formed as a nonwoven material that is sometimes referred to as batting. Batting may be formed from a plurality of strata. Each stratum may have a different or a similar composition of fibers. Batting may be formed as a continuous material (e.g., a rolled good) or it may be formed as a discrete element (e.g., batch goods). Therefore, as described throughout the present application, a fiber layer may include a continuous material (e.g., a rolled batting layer) or a discrete material (e.g., a cut batting layer).

A continuous batting layer formed from a fiber layer may have different characteristics in a width direction (e.g., traverse to a longitudinal direction of the continuous batting layer). The continuous batting layer may also or alternatively have varied characteristics in the longitudinal direction. For example, a repeating pattern of characteristics in the longitudinal direction is contemplated for forming a plurality of similar articles in a non-batch process. Alternatively, a gradient change in characteristics is contemplated in both the traverse and the longitudinal directions. This transitional characteristic change may avoid binary transitions in characteristics for a resulting article. Similarly, it is contemplated that variations may occur in the longitudinal and/or traverse directions at any stratum (e.g., in the Z direction). The characteristics of the continuous batting layer may include, without limitation, fiber composition, fiber characteristic, batting thickness, and the like.

A batch batting layer formed from a fiber layer may have different characteristics in an X, Y, and/or Z direction. Changes in characteristics of the batch batting layer may be binary in nature (e.g., an identifiable change from a first characteristic to a second characteristic) or gradual in nature. The characteristics of the batch batting layer may be, without limitation, fiber composition, fiber characteristic, batting thickness, fiber density in a stratum, and the like.

Another fiber layer concept is a net-shape fiber layer. A net-shape fiber layer is a minimal waste fiber layer that substantially constitutes the entire article perimeter to be formed. As a result, following entanglement, trimming and cutting operations may be minimized resulting in minimized waste generation. Net-shape fiber layers may include one or more manufacturing portions. Manufacturing portions are elements that exceed a true net-shape, but provide handling and material movement capabilities to manipulate the parts. For example, tabs or other elements may be included to allow for positioning, picking, identifying, and/or finishing. In aspects, and as more fully described below with reference to FIGS. 32 through 34, a net-shape fiber layer may be utilized with a reusable carrier screen during manufacturing.

The fiber selection also is contemplated to include a reflective material. For example, a mylar or other material having reflective surfaces may be incorporated to provide heating and/or cooling characteristics. Reflectivity of a material may be incorporated at any level of a fiber-bound engineered material (e.g., fiber level, batting level, scrim level, or top coating level).

It is also contemplated that one or more macro additives may be incorporated into a fiber layer. For example, a particulate or powder form of any material provided herein may be incorporated with one or more fiber layers. For example, acrylic polymers that are expandable may be incorporated with a fiber layer before or after entanglement. The incorporation of the particulate/powders materials can be used to supplement the characteristics of the fibers. For example, a lower-cost fiber may be used that can be enhanced with particulate integration relative to a higher-cost fiber having a similar characteristic without a supplemental particulate. The particulate contemplated includes at least the polymers listed herein.

It is contemplated that an engineered material may be formed through variations in characteristics of a fiber layer. The variations in characteristics may be determined, at least in part, through fiber selection and position, entanglement characteristics, and/or the combination thereof. Further, as will be described in greater detail hereinafter, additional processing to the engineered fiber layer may create intended characteristics at an intended relative location of the fiber layer for an article to be formed therefrom. For example, application of a trigger (e.g., thermal energy, light (UV, IR, or visible), sonic, plasma, E beam, radio frequency, chemicals, and/or water) to specific portions of the fiber layer may generate an engineered material. Alternatively, application of a trigger to substantially the entire fiber layer may cause a change in specific fibers (or other additives) that have been non-uniformly (e.g., intentionally) placed with respect to the fiber layer. An example of the former includes selective application of one or more liquid chemistries (e.g., a hardener) to achieve a different characteristic in the fiber layer at the location of application relative to locations in which a liquid chemistry is not applied. An example of the latter includes selectively placing fibers able to melt (or soften) at a given temperature in a first area and fibers that do not melt (or soften) at the same temperature in the second area. As the entire fiber layer is exposed to the given temperature, only those locations comprising the fiber that melts (or softens) at the given temperature take on a different characteristic resulting from the melting (or softening) of the fibers, in this example. As will be provided throughout, additional triggers, materials, placements, and combinations will be described and are applicable to aspects hereof.

Fusible fibers, such as thermoplastic polymer fibers having at least one of a melt temperature and a softening temperature below at least one of a melt temperature, a softening temperature, and a decomposition temperature of other materials forming the fiber-bound engineered material, may be leveraged to adjust characteristics of a fiber layer. Application of the fusible fibers may be through integral incorporation (e.g., blending of fibers) with the fiber layer or it may be through overlaying portions of the fiber layer with fusible fibers that subsequently are entangled therewith. Fusible fibers may be used to form a transparent or translucent portion of a fiber-bound engineered material. For example, heat may be applied to a fiber layer subsequent to entanglement to form the translucent or transparent window portion, which may visually expose a scrim (e.g., having a particular coloration and/or structure) or other underlying element while still binding the underlying element. Fusible fibers also may be varied to provide different measures of flexibility. For example, a type of fusible fiber may be selected based on location. Fusible nylon, when formed or activated, may remain flexible whereas polyester when fused may become stiff. Therefore a base fiber, such as a microsplit fiber, may be combined in a first region (e.g., a shoe toe region) with fusible nylon to form a flexible portion and with fusible polyester in a second region (e.g., a shoe heel region) to form a relatively rigid portion.

Once the fusible fibers are activated (e.g., fused), a distribution of fusible fibers can be determined to allow a change in overall porosity (e.g., throughout a thickness of the fiber layer) or just a surface porosity. This determination in fusible fiber distribution allows for formation of portions that are water resistant, water repellant, wind resistant, abrasion resistant, and the like. For example, fusible fibers proximate a first surface of a fiber layer may join together and make a continuous, less permeable amalgamation to increase resistance to water penetration or the first layer may have a fusible fiber distribution that forms a discontinuous, more porous amalgamation that is more susceptible to air and water permeability.

Characteristics of a fiber, such as modulus of elasticity, are measured pre-entanglement. Once entangled, measures of individual fibers are affected by the entanglement process and/or mechanical connections with adjoining fibers.

Scrim

A scrim is an element maintained in a relative position by one or more fiber layers as a fiber-bound element. A scrim may be a textile (e.g., knit, woven, braided, embroidered, nonwoven, or direct-fiber placed structure), a non-fibrous material (e.g., film, sheet, extruded element, molded element, deposition formed, expansion formed, or compression formed material), and/or a component (e.g., a zipper, snap, buckle, hook, loop, sensor, wire, fiber optic, bladder, tube, cord, or cable component). A scrim may be formed from a variety of materials as indicated hereinafter in detail and by example immediately following. The materials contemplated include organic and synthetic materials. For example, a scrim may be formed from any of the following non-limiting materials including polypeptide-based materials (e.g., animal hide, wool, or feathers), plant or cellulosic-based materials (e.g., cotton or hemp), carbon, minerals, aramids, glass, metals, TPU, PU, polyesters, polyamides, polyolefins, polypheneylens, polystyrenes, polyvinyls, ABS, and/or polycarbonates, as well as co-polymers of the polymers. A scrim may be formed from recycled or repurposed scrap, for instance, forming a sheet from which the scrim may be formed. Further, a scrim may be in the form of a tape or strip (a tape generally being more continuous than a strip of similar or different material).

A scrim may be a discrete element or it may be a collection of elements. For example, a first scrim may be a homogeneous material (e.g., a polymer film) that when incorporated with at least one fiber layer, as will be described hereinafter, forms an engineered material. Alternatively, a second scrim may be an engineered textile (e.g., a knit material having at least one intended characteristic at an intended location of the knit material) that when entangled and/or encased with or by one or more fiber layers forms an engineered material. Further yet, it is contemplated that multiple (and potentially different) scrims may be used in combination to form an engineered material when entangled, entrapped and/or encased with or by one or more fiber layers.

As will be described in greater detail hereinafter, any combination of the fiber(s), fiber layer(s), and scrim(s) may be manipulated to generate an engineered material. Exemplary manipulations may include, but are not limited to, selection of material, position, construction, order, secondary processes, and the like. As such, aspects herein contemplate using fiber layer(s) and scrim(s) in any number, in any position, and/or in any combination to form a fiber-bound engineered material. Further, a fiber-bound engineered material may be used to form any article. For example, manipulations contemplated herein may be applied to form an article of apparel (e.g., shirts, pants, shorts, under garment pants, bras, or socks), outerwear (e.g., coats, hats, or gloves), equipment (e.g., catching gloves, padding, protective equipment, or footwear inserts), footwear (e.g., shoes, sandals, boots, slides, mules, or loafers), and the like. Similarly, fiber-bound engineered material may be used in additional industries (e.g., automotive, aerospace, medical, safety, packaging, furnishings, and the like). Specific aspects hereinafter will describe articles of footwear, but it is understood that the concepts provided herein are not limited in application to footwear, but instead may be applied across articles and industries.

A scrim may be described as a continuous scrim, a partial scrim, a zonal scrim, an engineered scrim, a foundation scrim, or an element scrim. A specific scrim, as incorporated into a fiber-bound engineered material, may be classified as one or more of the different scrims. For example, a continuous scrim may also be an engineered scrim. A continuous scrim may have a shape, size, and/or configuration that extends between two or more portions of the article to be formed. For example, a continuous scrim, as used in a component forming an article of footwear, may extend from a medial side to a lateral side of the article of footwear, in an exemplary aspect.

A partial scrim may have a shape, size, and/or configuration for a discrete portion of the article to be formed. For example, a partial scrim as used in a component forming an article of footwear may be positioned in a toebox, a heel counter, a medial quarter region, a lateral quarter region, a tongue, or the like.

A zonal scrim is a compounding of scrims, such as overlapping or overlaying of multiple scrims. For example, a scrim having specific characteristics in a single direction may overlay another scrim having a characteristic in a single but different direction to achieve one or more multi-directional characteristics. As used herein, overlaid scrims include adjacent scrims such that one or more layers may intervene but share a common X and Y position regardless of Z-directional offset. Overlay does not, however, require all X and Y positions to be shared between the overlaid materials (e.g., they may be of different sizes and/or shapes). By way of example and not limitation, a macro mesh scrim may overlap a fine mesh scrim allowing a first side of a fiber-bound engineered material to have a macro texture and the opposite side associated with the fine mesh to have a more uniform texture. It is also contemplated that different scrims of different materials may be overlaid. For example, a high tenacity material for limiting stretch may be overlaid with a foam material for providing cushioning.

An engineered scrim is a scrim that provides an intended characteristic at an intended location of the scrim. For example, an engineered scrim may be of a knit, woven, braided, nonwoven, extruded, molded, cast, deposited, expanded, reductions-formed, embroidered, tailored-fiber-placed, 3D-printed, film, sheet, or the like construction that has variable characteristics based on a location of the scrim and a location at which the scrim is or will be incorporated into a fiber-bound engineered material or article. For example, an engineered scrim may change materials and/or construction based on location to achieve intended characteristics at the intended location.

A foundation scrim is a non-zonal scrim that has uniformity among one or more characteristics on the scrim. Examples may include non-engineered textiles, non-engineered films/sheets, extrusions (e.g., thermoplastic or adhesive netting), or cast filament matrices that are not specific to a location and/or direction of where the scrim will be incorporated with a fiber-bound engineered material. An exemplary foundation scrim may be formed from a composition comprising a thermoplastic material having at least one of a melt temperature and a softening temperature that is lower than at least one of a melt temperature, a softening temperature, and a decomposition temperature of one or more fiber layers with which the foundation scrim is entangled.

An element scrim is an element or collection of elements that are traditionally incorporated into a textile with bonding mechanisms different from fiber binding (e.g., sewing, chemical adhesion, or fusing). Examples include, but are not limited to, zippers, hooks and/or loops, snaps, rings, electrical sensors, electrical components, lights, wires, fiber optics, fluid bladders, tubes, reinforcements, and the like.

A scrim also may function as a structural carrier. For instance, when utilized in the manufacture of an article of footwear, a scrim may include one more lace apertures extending there through such that the resultant fiber-bound manufactured article will have enhanced structural support surrounding the aperture locations.

A scrim also may function as a non-structural carrier. For instance, a scrim may function as a carrier for a plurality of particulates, for instance, foam beads. In aspects, an adhesive (e.g., temporary adhesive) may be applied to a scrim uniformly or in a desired pattern, shape or configuration. A plurality of foam beads may be placed (strategically or at random) on the adhesive. Excess foam beads may be removed (for instance, by blowing or the like). The scrim then may be entangled with one or more fiber layers such that the foam beads remaining on the adhesive are entrapped or encased by the fiber binding. The resultant manufactured article will have a "bumpy" appearance with the surface thereof being raised at the locations of the encased or entrapped foam beads when viewed relative to the surrounding surface.

In aspects, a carrier scrim may include indents or wells at the location(s) at which fiber binding of particulates is desired. In such aspects, the Z-directional offset resulting from fiber binding of the particulates may be controlled. Such Z-directional offset additionally may be controlled by the size of the particulates utilized. For instance, in aspects, foam beads having a diameter of approximately three to five millimeters may be utilized, while in other aspects, foam beads having a diameter of 0.5 millimeters or less may be utilized. Any and all such variations, and any combination thereof, are contemplated to be within the scope of aspects hereof.

It is understood that particulates formed of materials other than foam may be utilized (e.g., a solid polymeric material). It is further understood that foam beads may be applied in a pre-foamed state and activated pre- or post-entanglement, or may be applied already foamed. Still further, it is understood that although the particulates described herein are discussed as having a diameter, particulates having a shape other than spherical (e.g., oval, disc-like) may be utilized.

Figure 26:
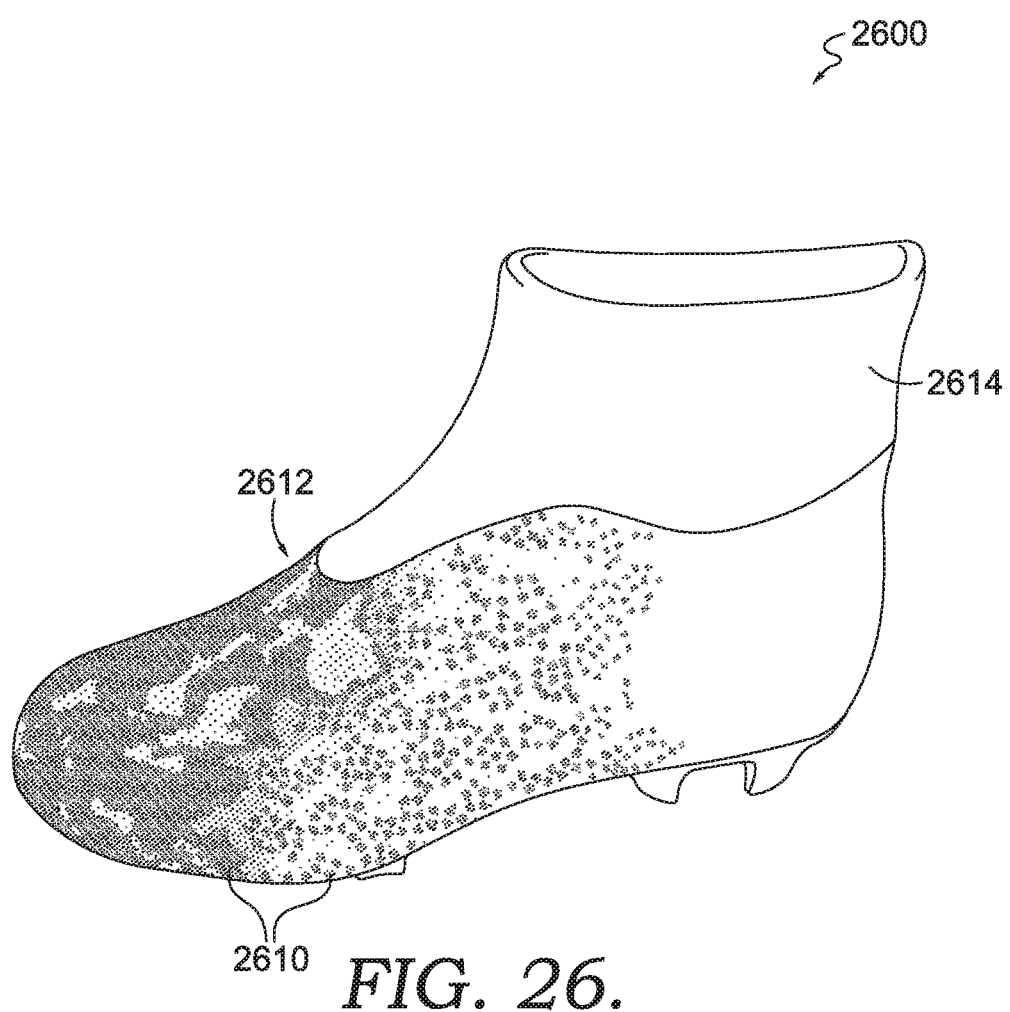
FIG. 26 depicts an exemplary article of footwear formed, at least in part, by fiber-binding particulates in a desired pattern between two fiber layers, in accordance with aspects hereof.

In aspects, a carrier scrim may not be utilized but rather particulate may be applied directly to a fiber layer to be entangled with a scrim or other fiber layer. FIG. 26 illustrates an exemplary article of footwear 2600 formed, at least in part, by fiber-binding particulates in a desired pattern 2610 between two fiber layers. A similar result may be obtained utilizing a carrier scrim.

Figure 28:
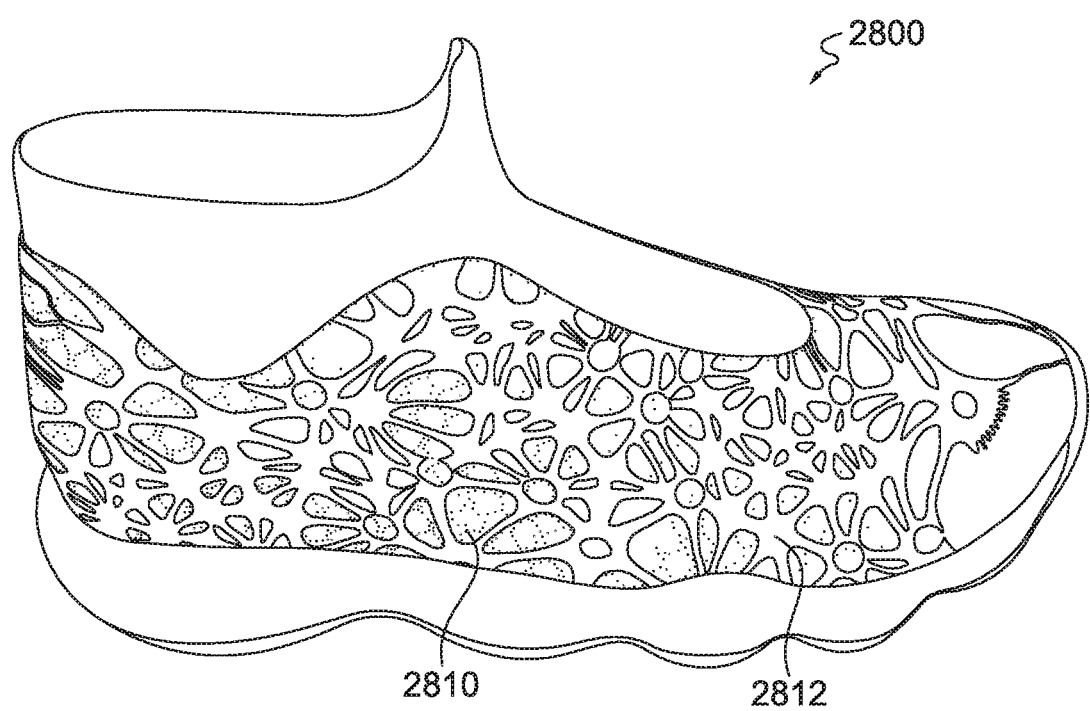
FIG. 28 depicts a laser or die-cut film scrim that imparts a desired design to a manufactured footwear article, in accordance with aspects hereof.

A scrim also may function as a non-structural element. For instance, a scrim (such as a piece of foam material) may be die-cut or laser-cut into a particular pattern (e.g., a lattice pattern) and strategically placed and entangled with one or more fiber layers such that the resultant fiber-bound manufactured article will at least tactilely exhibit the scrim pattern. FIG. 28 depicts an article of footwear formed from a first mesh scrim and colored second mesh scrim (the scrims differing, for instance, in color), as well as a laser or die-cut film scrim. As illustrated, the film scrim imparts a desired pattern to the article of footwear formed from the fiber-bound component.

Scrims may be formed from a variety of materials and/or techniques. It is contemplated that different scrims, as will be described hereinafter, may be combined in an overlapping manner to achieve an intended characteristic. For example, a macro mesh scrim may overlap a fine mesh scrim allowing a first side of a fiber-bound engineered material to have a macro texture and the opposite side associated with the fine mesh to have a more uniform texture. It is also contemplated that different scrims of different materials may be overlaid. For example, a high tenacity material for limiting stretch may be overlaid with a foam material for providing cushioning.

Coloration may be integral with a fiber-bound engineered material. For example, fibers of one or more fiber layers may have a color profile that is imparted into the material as entanglement consolidates the fibers. A scrim may have a color profile. The scrim may affect a perceived coloration of the fiber-bound engineered material as the scrim shows through the fiber binding. In some examples a fiber binding may form a transparent or translucent structure through use of low-melt fibers that become transparent or translucent to depict an underlying coloration. Similarly, one or more colored fibers having a melt temperature, softening temperature, or degradation temperature above the low-melt fibers may become encased/entrapped or suspended in a low-melt fiber amalgamation. Still further, it is contemplated that as a trimming or unmasking operation occurs, one or more underlying materials may be exposed along with their associated coloration. Further yet, because different materials may be formed as a continuous and cohesive hybrid material, some materials may be colored with a coloration technique while other materials may not be able to be colored with the same coloration technique. This discrepancy in propensity to accept coloration can lead to hybrid coloration from a uniform application of coloration. As can be appreciated, a variety of coloration alterations may be achieved through material selection, placement, and/or processing.

In aspects, scrims may be coupled with another component of the article to be manufactured prior to entanglement. For instance, a scrim intended to be utilized to form an upper of an article of footwear may be adhered (e.g., stitched) to a secondary element (e.g., a knit ankle collar) prior to entanglement. In this instance, the scrim would no longer be planar but rather would extend in the Z-direction at the location of the secondary element. In aspects, the knit collar (secondary element) then may be masked over (e.g., with tape) and a fiber layer placed over the masked scrim/secondary element assembly and the assembly and the fiber layer entangled. Depending on the location of the masking, the fiber entanglement may effectively hide the stitched seam making it difficult to ascertain from appearance alone how the secondary element was attached. The stitched seam also may be reinforced through entanglement making the connection more robust and less susceptible to failure.

Figure 29:
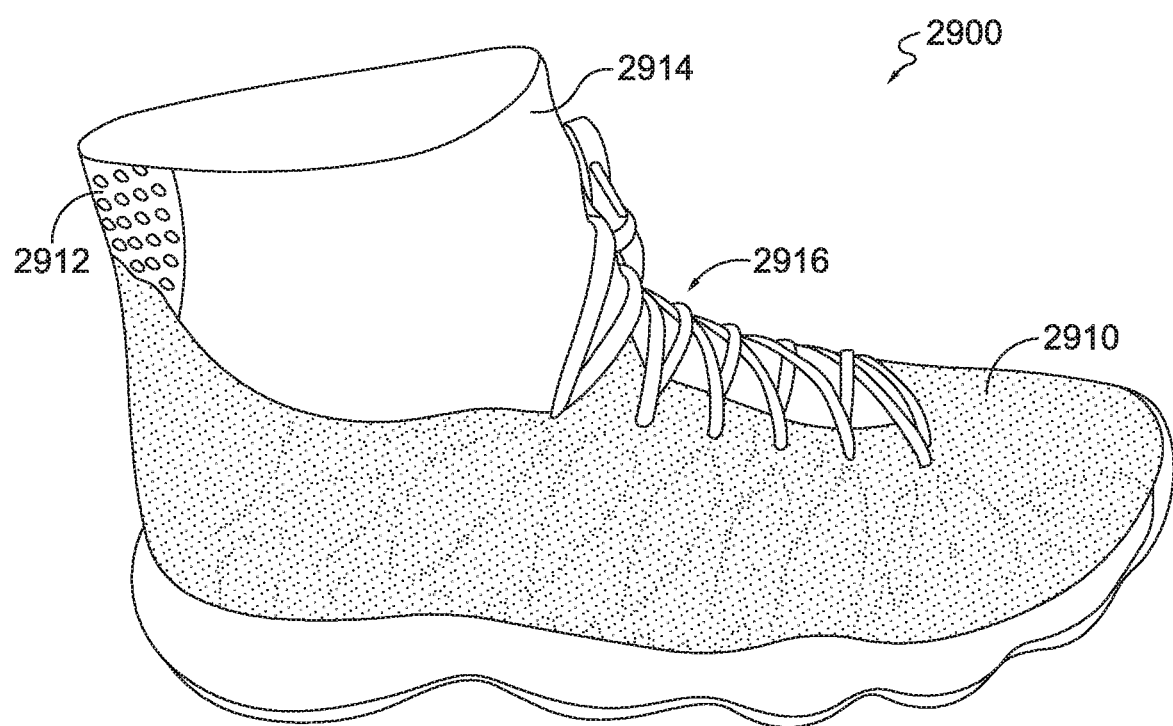
FIG. 29 depicts a knit collar being attached to a footwear upper during entanglement, in accordance with aspects hereof.
Figure 30:
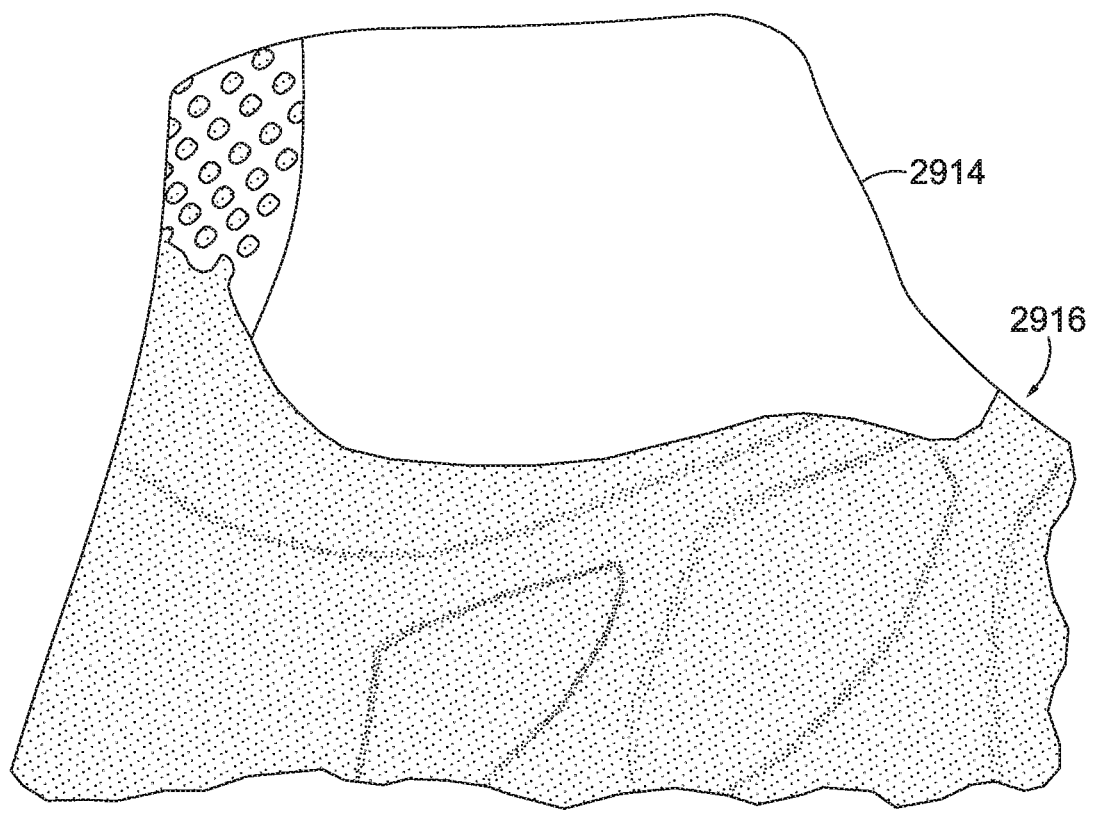
FIG. 30 depicts a close-up view of the connection between the knit collar and the upper of FIG. 29, in accordance with aspects hereof.

In aspects, secondary elements formed from processes other than fiber entanglement may be coupled with one another and/or a fiber-bound element via fiber binding. For instance, FIG. 29 illustrates an exemplary article of footwear 2900 having an upper 2916 formed utilizing a laser or die-cut foam scrim 2910, along with a mesh scrim 2912. The knit collar component 2914 has been attached to the rest of the upper 2916 during entanglement, rather than by stitching. FIG. 30 illustrates a close-up view of the connection between the upper 2916 and the knit collar 2914.

Figure 31:
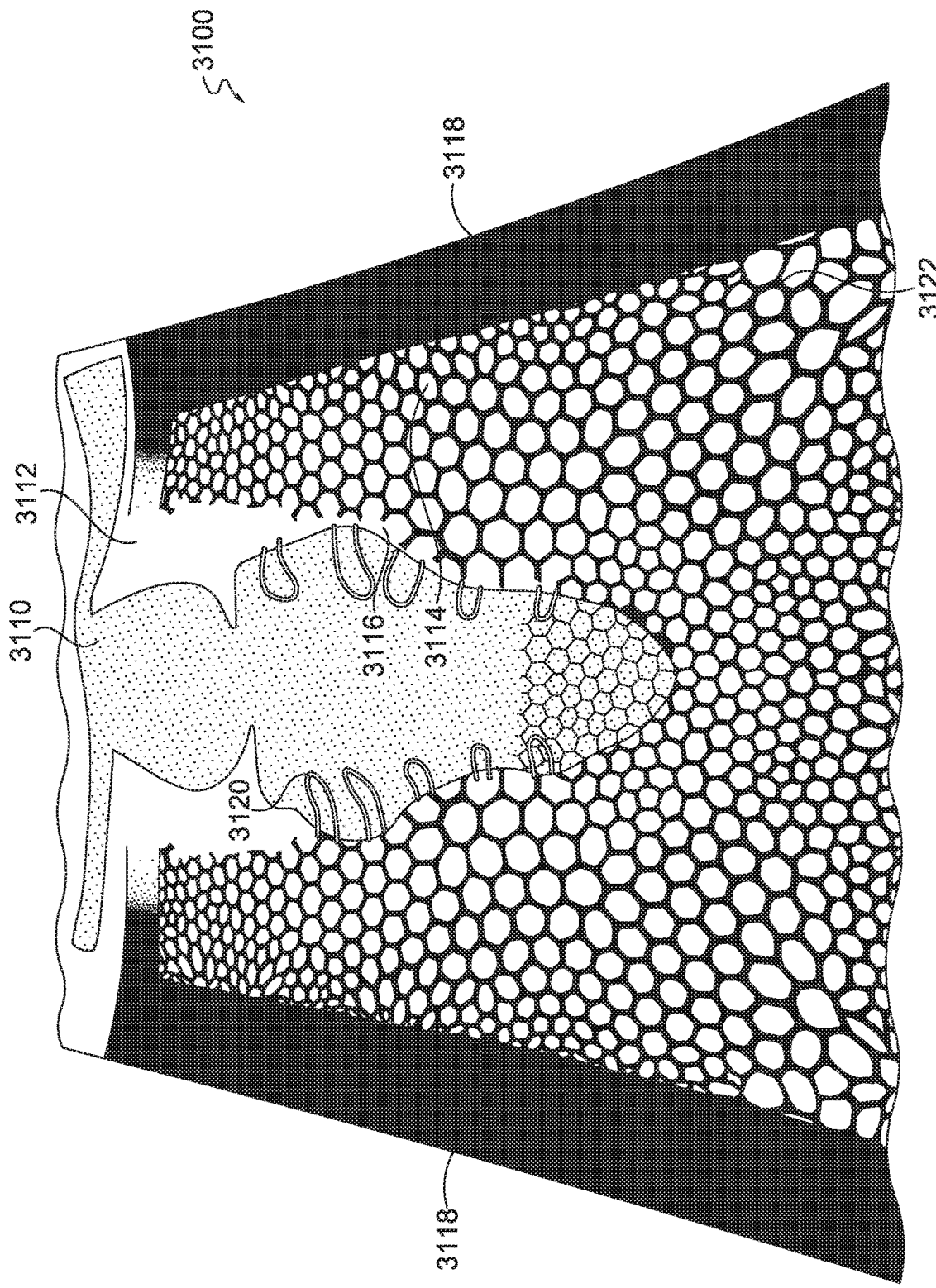
FIG. 31 depicts a variety of scrims and elements being fiber-bound together to create a desired manufactured footwear component, in accordance with aspects hereof.

Various scrims and fiber layers may be strategically placed with respect to one another to create a variety of desired effects, the boundaries of which are limited only by the imagination. For instance, FIG. 31 illustrates a fiber-bound flat upper component 3100 of an article of footwear which has not yet been cut and assembled to form a three-dimensional upper. The fiber-bound component 3100 includes a mesh scrim entangled with regions of first fibers, regions of second fibers 3212, regions of third fibers 3214, and regions of a mixture of first and second fibers 3216 on the surface that will be the exterior-facing surface of the three-dimensional footwear article. Fly-wire cables 3218 are entangled along what will become the medial and lateral sides of the upper. Loops of cables 3220 for use as lace supports have been left un-entangled, as has a region of the mesh scrim. In the illustrated upper component, a silicone material 3220 has been screen printed over portions of the upper, for instance, to provide abrasion resistance.

In aspects, entanglement may occur in two directions (e.g., fibers of a first fiber layer extending into (i.e., not all the way through) or through and entangling with fibers of a second fiber layer and fibers of the second fiber layer extending through and entangling with fibers of the first fiber layer). Such two-directional entanglement may result in a relatively uniform appearance of the resultant fiber-bound article (assuming substantial uniformity of the fiber layers and the scrim, if present). In other aspects, entanglement may occur in only one direction, for instance, fibers of a first fiber layer extending through and entangling with fibers of a second fiber layer where fibers of the second fiber layer do not extend through to entangle with fibers of the first fiber layer. This single-directional entanglement also may result in a relatively uniform appearance of the resultant fiber-bound article (assuming substantial uniformity of the fiber layers and the scrim, if present). However, where the fiber layers exhibit different properties from one another (for instance, different coloration), strategic use of single-directional and two-directional entanglement for a single fiber-bound article may result in a desired pattern being formed on the resultant fiber-bound article. For instance, in the article shown in FIGS. 29 and 30, some portions of the mesh scrim have only been entangled in one direction so that fibers of the first fiber layer show through and appear as polka dots on some areas on the upper.

Overview

A fiber-bound engineered material provides an intended characteristic (e.g., elasticity, cushioning, stiffness, air permeability, moisture control, tenacity, feel, or insulation) at an intended relative location for an article to be formed therefrom using entangled fibers to maintain or create the intended characteristic at the intended location. For example, a first fiber layer comprised of a first plurality of fibers, a scrim, and a second fiber layer comprised of a second plurality of fiber may be formed as a component of an article of footwear. The component is at least formed by entangling the first plurality of fibers with the second plurality of fibers. This entanglement maintains the scrim in an intended relative location with respect to the first and second fiber layers.

In some examples the scrim itself is formed from material that allows for mechanical engagement with one or more fibers from at least one of the first and second plurality of fibers. The mechanical engagement may be an entanglement where fibers forming at least a portion of the scrim entangle with fibers of the first and/or second plurality of fibers. The mechanical engagement may include one or more fibers from the first and/or second plurality of fibers passing into (i.e., not all the way through) or through a portion of the scrim. For example, if the scrim includes an aperture (e.g., a negative space), fibers from the first and second pluralities of fibers may entangle around and through the aperture. Mechanical engagement may include one or more fibers from the first and/or second plurality of fibers extending into the scrim and physically interacting with the scrim. For example, the scrim may be comprised of a foam material that allows penetration or mechanical engagement of one or more fibers from the first and/or second plurality of fibers during an entanglement operation. An interstitial space between adjacent fibers may provide additional or alternative locations for interlocking of fibers and a scrim.

In some examples, the scrim is maintained in a position without being entangled with the fibers. For example, in a first aspect, the scrim may be impenetrable and the plurality of fibers may be entangled around the scrim, but not through the scrim. If the scrim is of an appropriate shape (e.g., tubular or round), the scrim element may be able to rotate or be moved within the defined location encasing the scrim. In alternative aspects, if the scrim is of an appropriate shape (e.g., non-symmetrical or discrete elements), the scrim element may be maintained in the specified location and may be non-movable within the encasement position.

Subsequent to entangling the one or more fiber layers to maintain the scrim, through encasement and/or mechanical engagement, a fiber-bound engineered material is formed that provides an intended characteristic at an intended relative location for a component of an article of footwear. The component may be a discrete element of the article of footwear or the component may be a whole portion (e.g., a shoe upper) of the article of footwear. In an example where the component is a shoe upper, the location of the intended characteristic(s) may be relative to the shoe upper. As such, specific characteristics may be formed at locations of a shoe upper to be formed from a fiber-bound engineered material.

Additional materials may be integrated or included. For example, a film, such as a metallic film, may be applied to one or more portions of a fiber-bound engineered material. The metallic coating may provide reflective features, such as heat retention or heat reflection relative to an article formed with the metallic coating. Additional coatings are contemplated that achieve supplemental engineered characteristics, such as water repellency, abrasion resistance, coloration, and the like. The coating may be applied universally to the material or zonally to the material.

Footwear

Turning to FIG. 1 illustrating an exemplary article of footwear, a shoe 100, in accordance with aspects hereof. An article of footwear is referred to as a shoe herein for simplicity, but it is understood that an article of footwear may include a sandal, a slipper, a dress shoe, a cleat, a running shoe, a tennis shoe, a loafer, a boot, a slide, a mule, and the like. The shoe 100 is exemplary in nature to illustrate relative terminology and it is not intended to be limiting in scope of concepts provided herein. It is understood that a component of an article of footwear may or may not include the elements illustrated with the shoe 100. Further it is understood that alternative configurations, styles, and relative sizes from those illustrated in connection with the shoe 100 may be implemented in a component for an article of footwear.

The shoe 100 is comprised of an upper 102 and a sole 104. The upper 102 is a foot-securing portion of the shoe 100. The upper 102 traditionally forms a foot-receiving cavity into which a wearer inserts his/her foot to be secure to the sole 104. The sole 104 is a ground contacting surface of the shoe 100. The sole 104 may comprise an outsole, a midsole, and/or an insole. The outsole, when present, forms the ground contacting portion of the sole 104 and is typically abrasion resistant or adapted for the surface on which the shoe 100 is intended to be worn. The midsole, when present, may provide impact attenuation for the shoe 100, in an exemplary aspect. The insole, when present, may provide a foot-facing portion of the sole 104. It is understood that one or more portions of the sole 104 may be combined without differentiation or distinction. Additionally, it is contemplated that the specific portions of the sole 104 may be omitted altogether, in some aspects.

Figure 2:
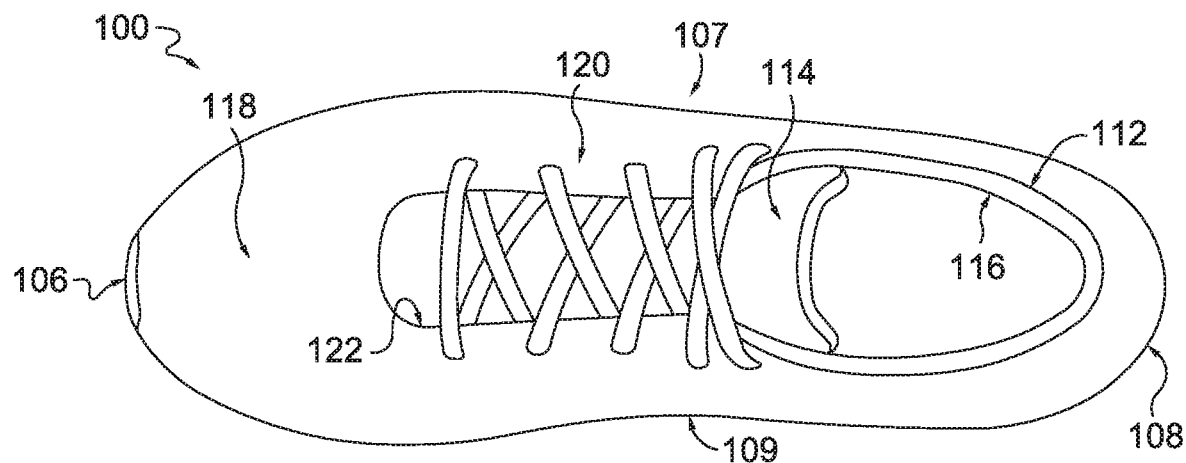
FIG. 2 depicts a plan view of the exemplary article of footwear of FIG. 1, in accordance with aspects hereof.

The shoe 100 has a toe end 106, a heel end 108, a forefoot opening 110, an ankle opening 112, and a tongue 114. As best seen in FIG. 2 depicting a plan view of the shoe 100, in accordance with aspects hereof, the shoe 100 is further comprised of a medial side 109 and a lateral side 107. Further the shoe 100 is comprised of a vamp portion 118, a quarter portion 120, a throat edge 122, and an internal surface 116.

The shoe 100 may be described based on the relative position of the various portions. For example, the quarter portion 120 extends generally from the throat edge 122 down toward the sole 104 on the lateral side 107. Similarly, the shoe 100 is comprised of a reciprocal quarter portion on the medial side 109. Further, a heel portion extends between the medial side 109 and the lateral side 107 around the heel end 108. The shoe 100 has a toe box region that extends from the vamp 118 toward the toe end 106 between the medial side 109 and the lateral side 107. The throat edge 122 extends around the forefoot opening 110 (FIG. 1) on the medial side 109 and the lateral side 107 across the vamp 118, in this example. A lace structure may extend across the forefoot opening 110 (FIG. 1) to tighten the upper 102 (FIG. 1) about a wearer's foot. The tongue 114 may extend from the vamp 118 through the forefoot opening 110 (FIG. 1) toward the ankle opening 112 and provide support to the shoe 100 and/or cushioning for the wearer as the lacing mechanism extends over the wearer's forefoot, in an exemplary aspect.

Fiber-Bound Engineered Material Construction

FIGS. 3A through 6B depict a sequence for constructing an exemplary fiber-bound engineered material, in accordance with aspects hereof. (Additionally, FIGS. 32-34, discussed more fully below, depict a configuration for constructing an exemplary fiber-bound engineered material utilizing carrier screens, in accordance with aspects hereof.

Figure 3A:
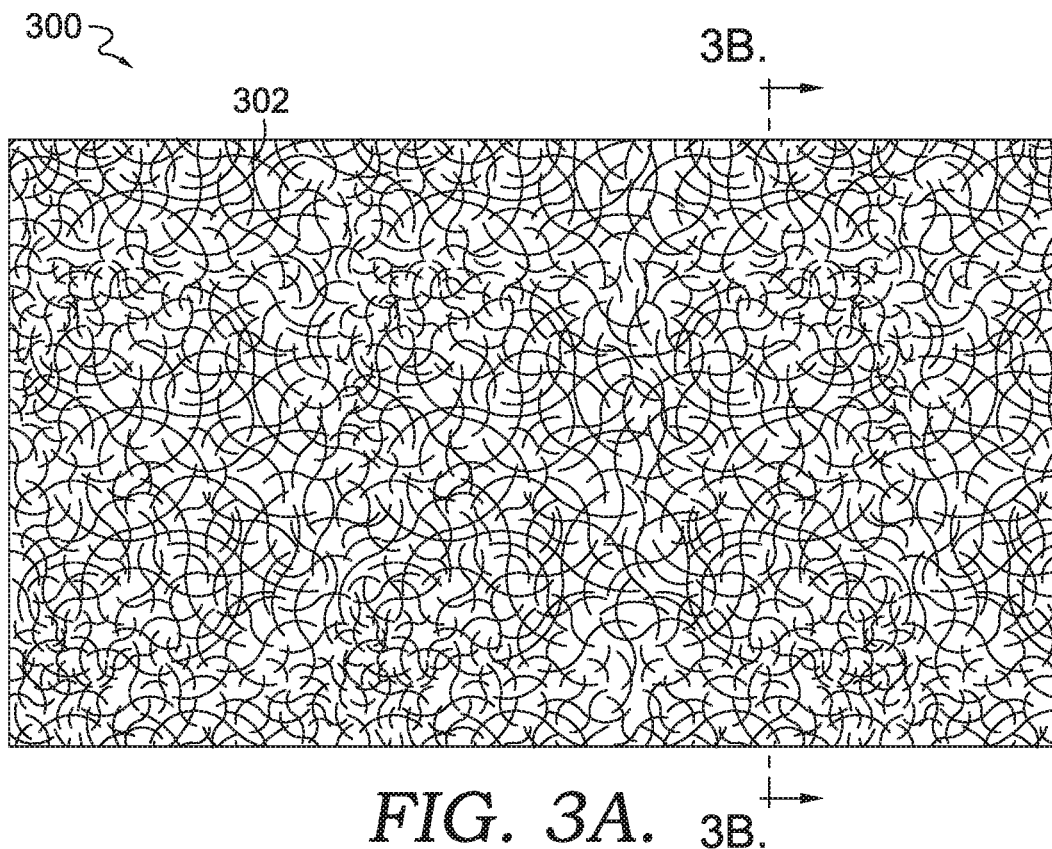
FIG. 3A depicts an exemplary fiber layer, in accordance with aspects hereof.

FIG. 3A depicts a cut fiber layer 300 comprised of a plurality of fibers 302 as a non-woven structure. The fibers 302 are depicted for illustration purposes, but it is understood that the fibers 302 may have different concentrations, densities, sizes, interactions, and forms from that which is illustrated in schematic style in FIG. 3 and other FIGS. hereinafter. Additionally, while the cut fiber layer 300 is depicted as a batch style element, it is merely representative in nature and instead could be depicted as a continuous element (e.g., a rolled good). Therefore, the cut fiber layer 300 is merely exemplary in nature and is not limiting as to size, shape, or configuration as to aspects provided herein.

Figure 3B:
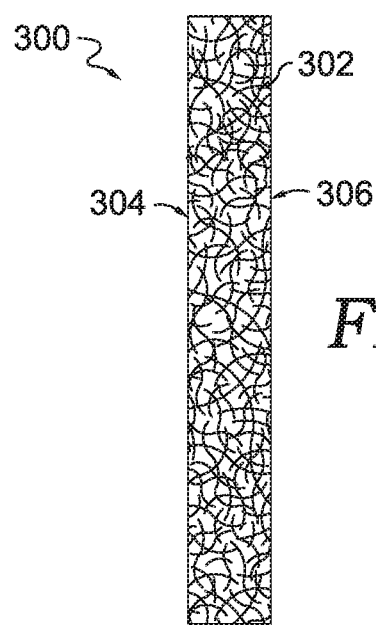
FIG. 3B depicts a cross-section of the exemplary fiber layer of FIG. 3A, in accordance with aspects hereof.

FIG. 3B depicts a cross-sectional view of the cut fiber layer 300 along cutline 3B of FIG. 3A, in accordance with aspects hereof. The cut fiber layer 300 has a first side 304 and a second side 306. While depicted as a single stratum formed from the fibers 302, it is contemplated that the cut fiber layer 300 may be comprised of a plurality of discrete or transitional strata, as described hereinabove. The cut fiber layer 300 is depicted as having a thickness extending between the first side 304 and the second side 306. However, the thickness depicted is for illustration purposes and is not limiting in nature.

Figure 3C:
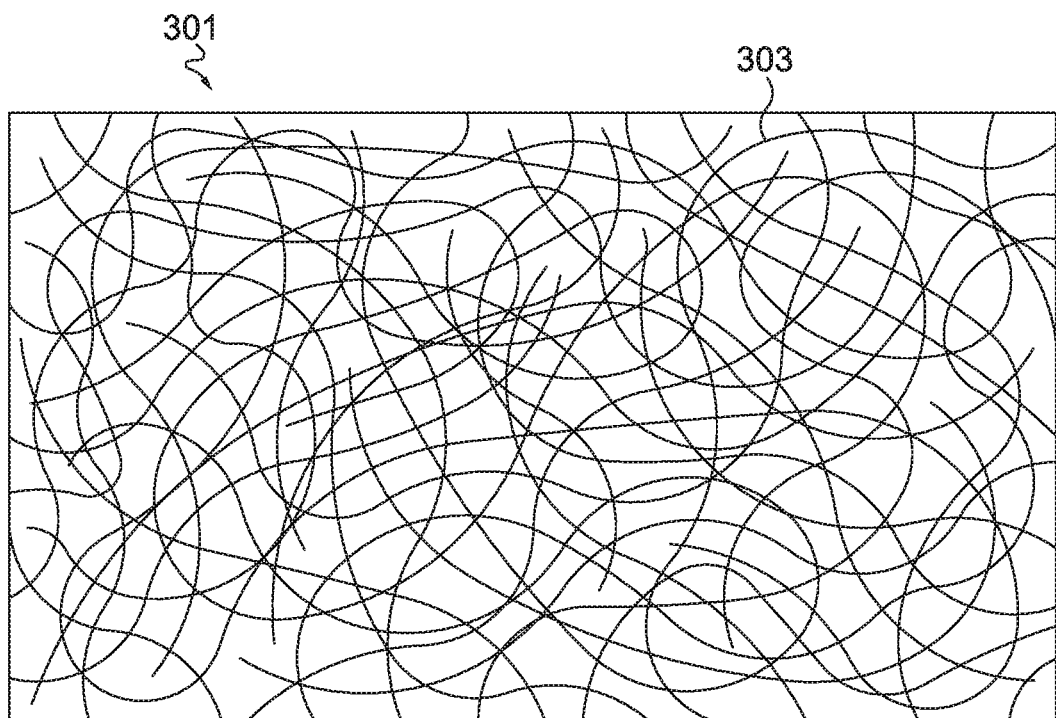
FIG. 3C depicts an exemplary fiber layer formed from continuous fibers, in accordance with aspects hereof.

FIG. 3C depicts a fiber layer 301 much like FIG. 3B; however, the fibers 303 of the fiber layer 301 are "continuous" fibers, in accordance with aspects hereof. A continuous fiber is a fiber having a length that is greater than 200 times a traverse width of the fiber. Aspects herein contemplate fiber layers having cut fibers and/or continuous fibers.

Figure 3D:
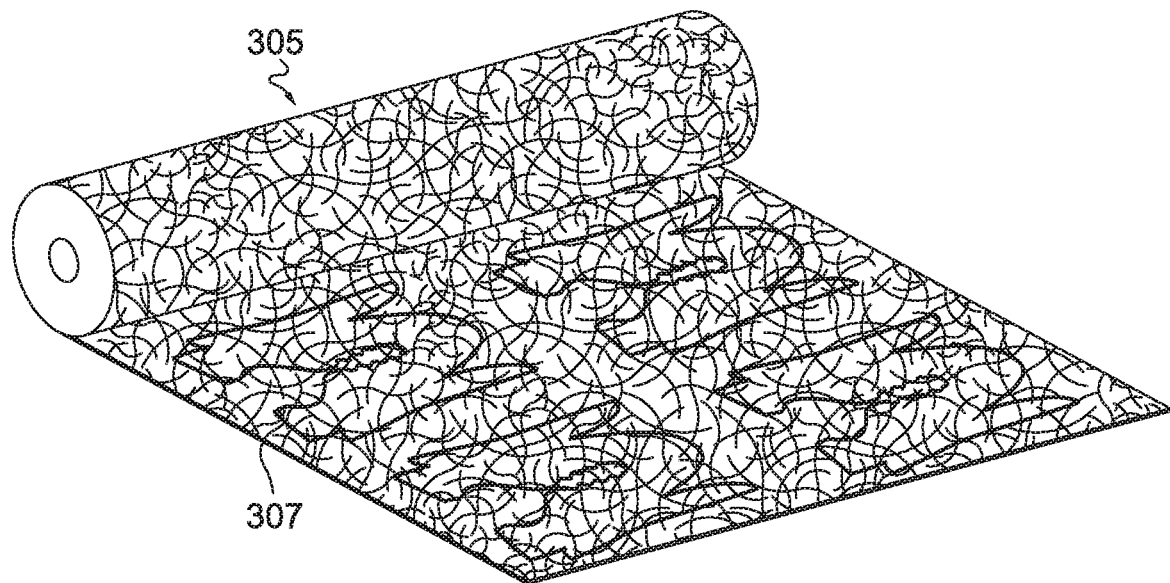
FIG. 3D depicts an exemplary continuous fiber layer roll having a plurality of article profiles placed thereon, in accordance with aspects hereof.

FIG. 3D depicts a continuous fiber layer 305 forming a fiber layer as a rolled good, in accordance with aspects hereof. As described herein, a fiber layer may be a batch layer having a discrete size or the fiber layer may be a continuous textile, as depicted in FIG. 3D. As also depicted, one or more article profiles 307, such as an upper pattern profile, may be formed on the continuous fiber layer 305. It is contemplated that a single scrim may span across multiple articles to be formed. For example, a scrim may be applied to a rolled good fiber layer such that the scrim extends across a traverse direction or a longitudinal direction to be incorporated within multiple footwear uppers. For example, the article profiles 307 depicted include multiple shoe uppers in the longitudinal direction. A common scrim may be placed in a longitudinal direction such that one scrim is incorporated into multiple shoe uppers when removed from the continuous roll.

Figure 4A:
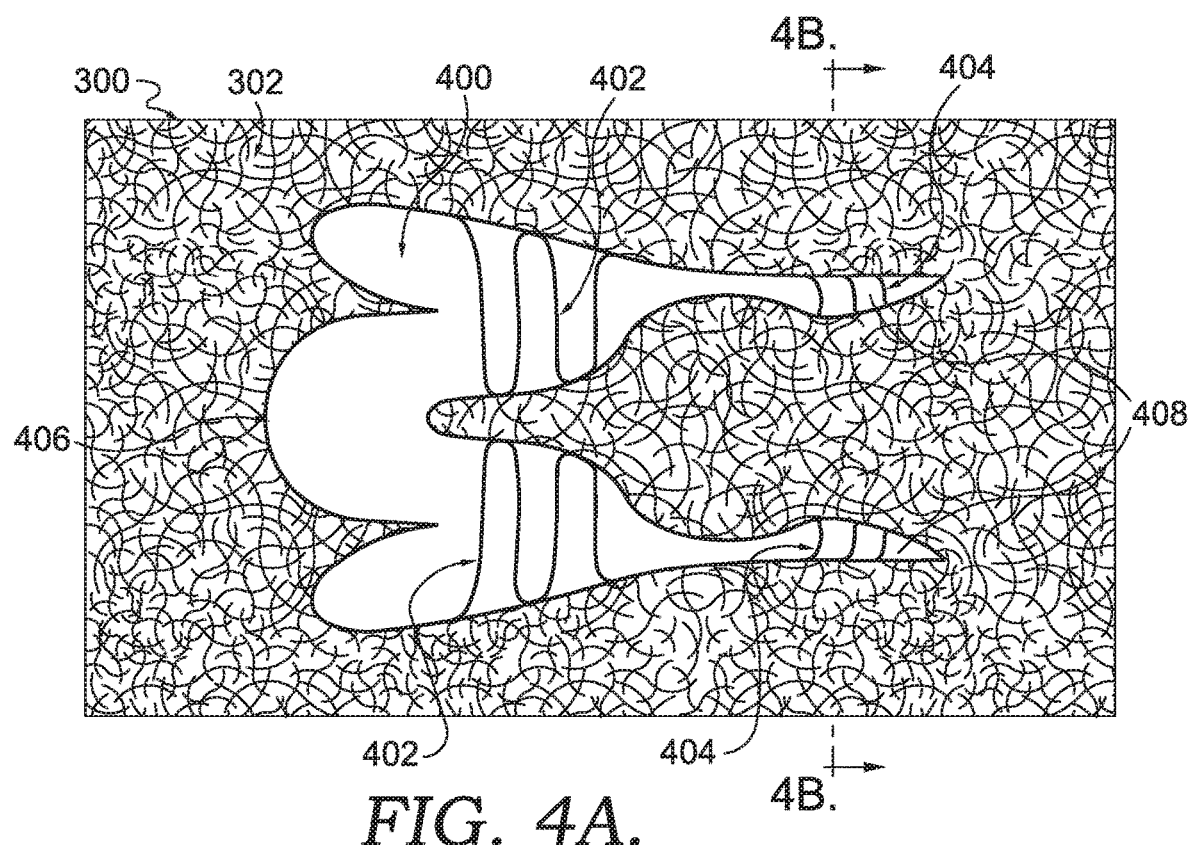
FIG. 4A depicts the exemplary fiber layer of FIG. 3A having a scrim placed thereon, in accordance with aspects hereof.

FIG. 4A depicts a scrim 400 positioned on the fiber layer 300, in accordance with aspects hereof. The scrim 400 is exemplary in nature and is not limiting. The scrim 400 is a continuous and engineered scrim. The scrim 400 forms, in part, an upper for an article of footwear having a toe end 406 and a heel end 408. The scrim 400 further is comprised of midfoot engineered elements 402, such as a high tenacity (e.g., low stretch) material effective to transfer a lace load from a throat opening towards a sole structure when formed as a shoe upper. The scrim 400 also includes heel end engineered elements 404. The heel end engineered elements 404 may be stiffening members to reinforce a heel region when formed into a shoe upper, in aspects hereof.

The scrim 400 may be formed as a knit, woven, nonwoven, braided, embroidered, tailored fiber placement, deposition formed, film, sheet, cast, extruded, molded, expanded, reductions-formed, 3-D printed, and the like material, as previously described.

The scrim 400 may be formed from synthetic and/or organic materials, such as polypeptide-based materials, cellulose-based materials, protein-based materials, aramids, glass, minerals, carbon, metallic and/or polymers, for example. As provided throughout, any material and/or formation technique may be implemented as contemplated herein in regard to other scrims.

Figure 4B:
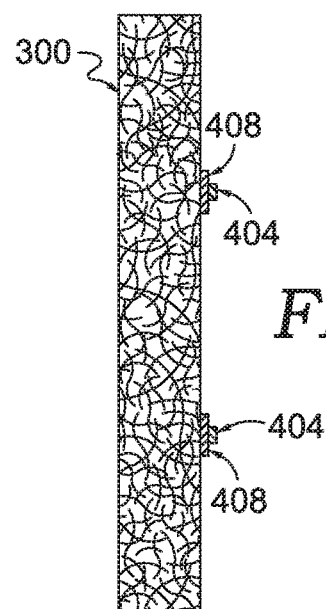
FIG. 4B depicts a cross-section of the exemplary fiber layer/scrim assembly of FIG. 4A, in accordance with aspects hereof.

FIG. 4B depicts a cross-sectional view along cut line 4B of FIG. 4A, in accordance with aspects hereof. The relative position of the heel end 408 of the scrim and the heel end engineered elements 404 is illustrated.

Figure 5A:
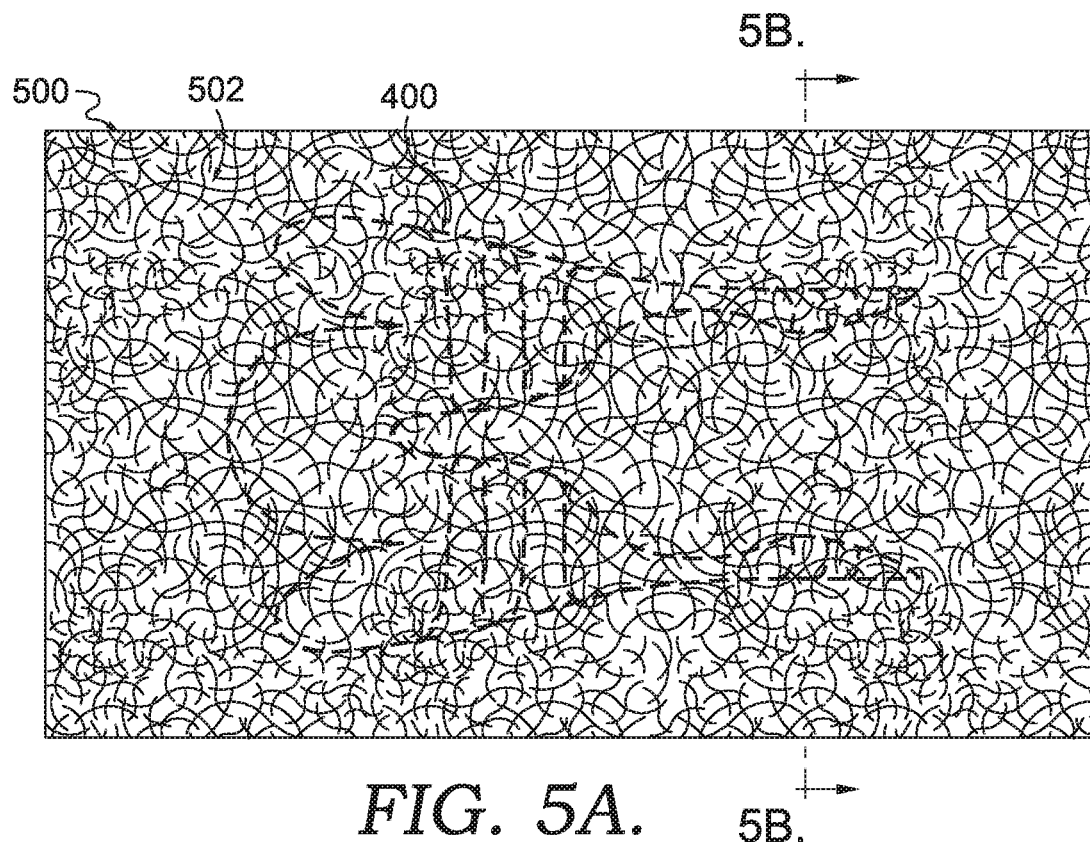
FIG. 5A depicts the exemplary fiber layer/scrim assembly of FIG. 4A having an additional fiber layer placed thereon, in accordance with aspects hereof.

FIG. 5A depicts a second cut fiber layer 500 comprised of a second plurality of fibers 502 overlaying the assembly depicted in FIG. 4A, in accordance with aspects hereof. The second cut fiber layer 500 may be similar or different to the cut fiber layer 300 of FIG. 3A. For example, different fiber characteristics may be associated with the second plurality of fibers 502 than the plurality of fibers 302 (e.g., the second plurality of fibers 502 may have a melting temperature (or a softening temperature or a decomposition temperature) that is lower than a melting temperature (or a softening temperature or a decomposition temperature) of the plurality of fibers 302). While the second cut fiber layer 500 is depicted, it is contemplated that a single fiber layer be used in exemplary aspects to form a fiber-bound engineered material. As will be described in greater detail hereinafter, while the second cut fiber layer 500 is depicted as overlaying the entirety of the cut fiber layer 300, it is contemplated that only a portion of the cut fiber layer 300 may have a corresponding second cut fiber layer 500. Instead two or more different fiber layers may be positioned to correspond with the cut fiber layer 300 to provide engineered characteristics to the fiber-bound engineered component by way of the alternative fiber layers and positions of the various fiber layers.

Figure 5B:
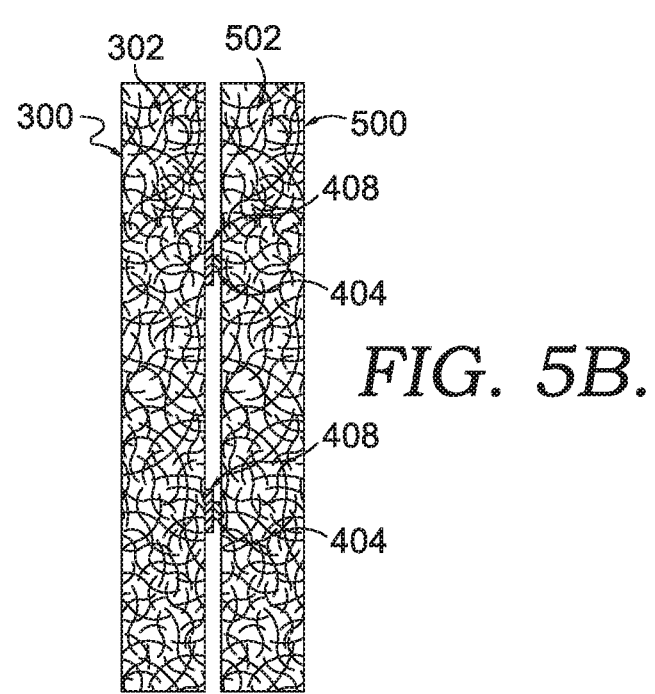
FIG. 5B depicts a cross-section of the exemplary fiber layer/scrim/fiber layer assembly of FIG. 5A, in accordance with aspects hereof.

FIG. 5B depicts a cross-sectional view along cut line 5B of FIG. 5A, in accordance with aspects hereof. The relative position of the heel end 408 of the scrim 400 and the heel end engineered elements 404 is illustrated.

Figure 6A:
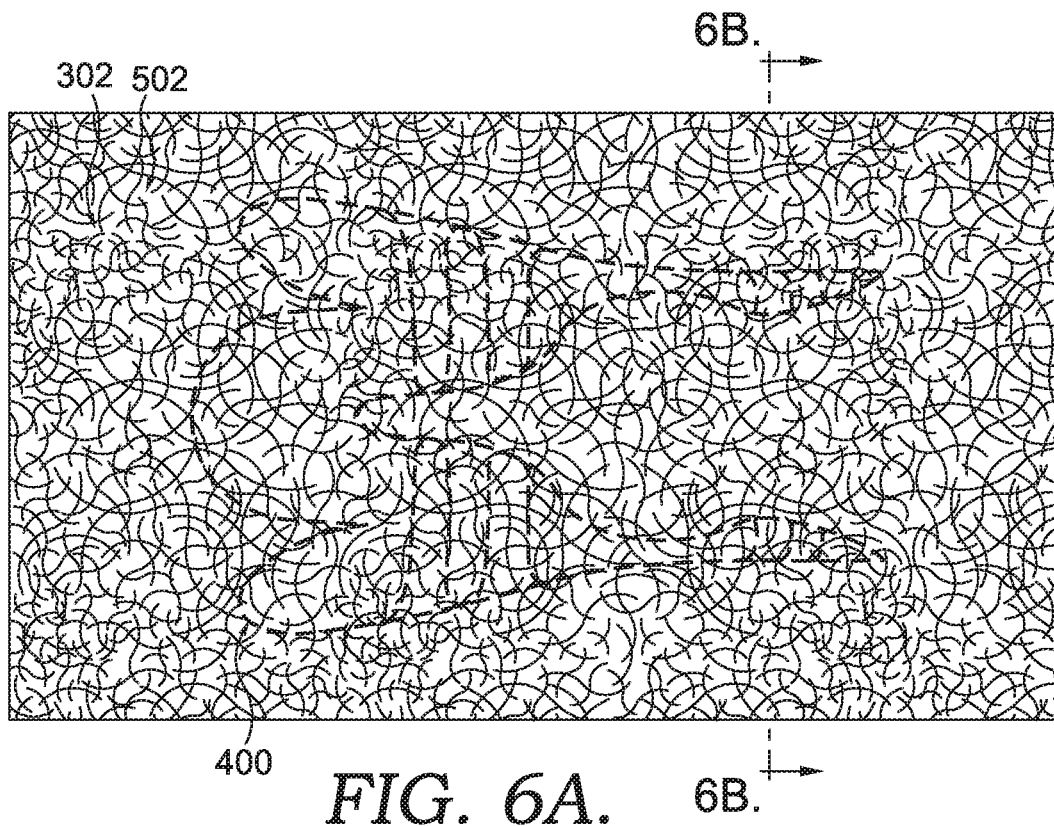
FIG. 6A depicts the exemplary fiber layer/scrim/fiber layer assembly of FIG. 5A subsequent to entanglement, in accordance with aspects hereof.

FIG. 6A depicts the assembly of FIG. 5A subsequent to entanglement, in accordance with aspects hereof. Entanglement causes an intermixing and mechanical engagement between the plurality of fibers 302 and the second plurality of fibers 502. As previously described, the entanglement may be achieved by a variety of mechanisms, such as needle entanglement (e.g., barbed or structured needle entanglement) or fluid entanglement (e.g., hydroentanglement). It is also contemplated that one or more portions of the scrim 400 (as best seen in FIG. 6B) also may be entangled with one or more of the plurality of fibers 302 and the second plurality of fibers 502.

Figure 6B:
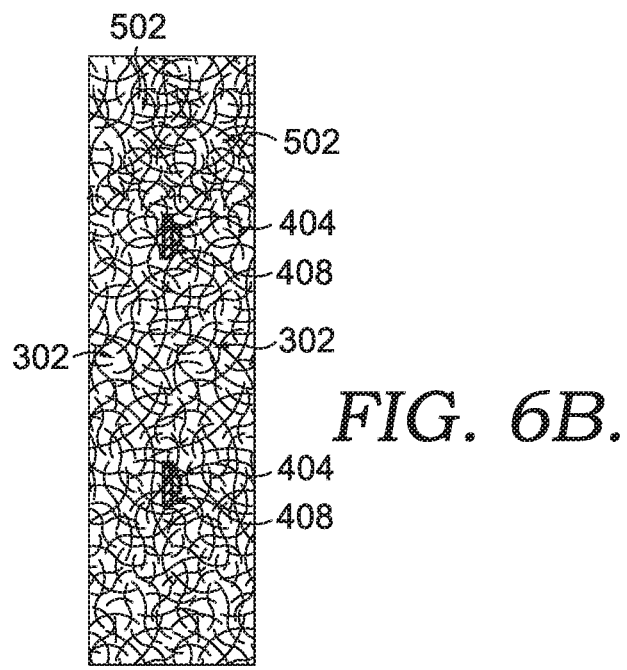
FIG. 6B depicts a cross-section of the exemplary entangled assembly of FIG. 6A, in accordance with aspects hereof.

FIG. 6B depicts a cross-sectional view of the assembly of FIG. 6A along cut line 6B, in accordance with aspects hereof. As depicted, the plurality of fibers 302 and the second plurality of fibers 502 are not confined to their respective fiber layers. Instead the entanglement has moved one or more fibers from each fiber layer into the alternative fiber layer to cause the entanglement and resulting binding to occur. Entanglement results in a consolidation of fibers. The consolidation of fibers may be fibers from different fiber layers and/or scrim(s) into a cohesive hybrid material that is a complex composite. As a result, the scrim 400 is fiber-bound and a fiber-bound engineered material is formed that can be used to form an article (e.g., a shoe upper) with minimal additional processing (e.g., cutting, sewing, and/or gluing).

The scrim 400 may be removed from the entangled fiber layers at the scrim 400 perimeter with the fibers entangled around and/or through the scrim 400. Depending on the various fibers forming the now-entangled fiber layers, waste from the removal process may be recycled. For example, if the plurality of fibers 302 and the second plurality of fibers 502 have similar compositions, they may be recycled to form another fiber layer. The ease of recycling fibers may drive manufacturing efficiencies, in some examples.

It is contemplated that the resulting fiber-bound engineered material from FIG. 6A subsequently may be formed into a shoe. For example, the assembly resulting from FIG. 6A may be joined at the heel and along the toe. The joined portions subsequently may be placed on a cobbler's last where underfoot portions may be joined to form a receiving cavity into which a foot eventually may be received. Additionally, one or more processes may be implemented at any point, such as prior to removing the assembly from the excess fibers, subsequent to lasting, subsequent to closure, and the like. The processes may include, by way of example and not limitation, customizing to order, preparing for market by application of energy (e.g., thermal, light, radio wave, sonic, plasma, E beam, or vibrational energy), application of liquid chemistries, cutting, sewing, welding, pressing, heating, expanding, shrinking, printing, dipping, spraying, rolling, perforating, filling, emptying, painting, and/or applying a sole.

Figure 7A:
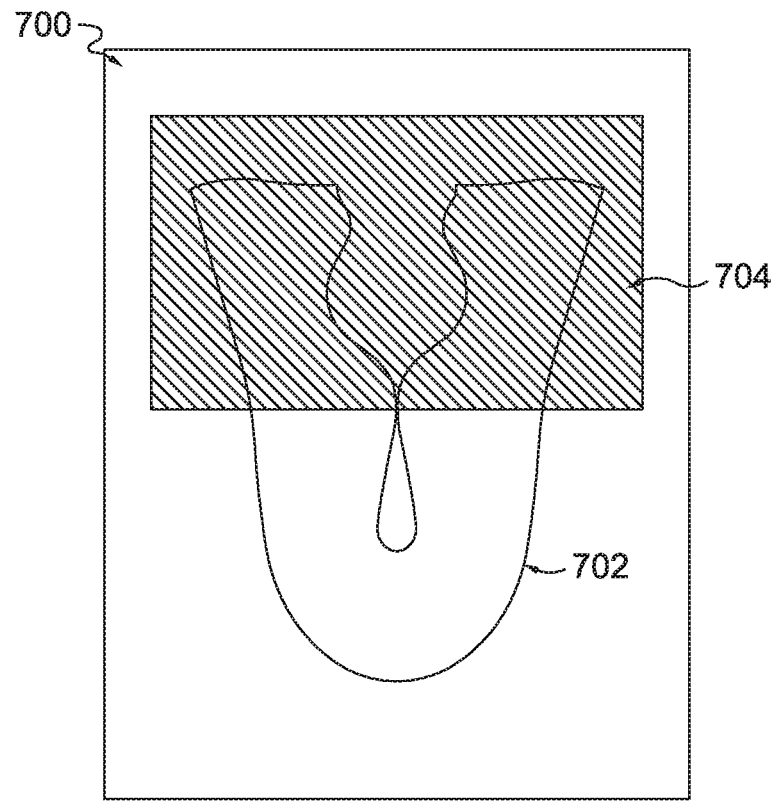
FIG. 7A depicts an exemplary multiple fiber layer arrangement, in accordance with aspects hereof.

FIGS. 7A through 10C illustrate exemplary fiber layer constructions for forming a fiber-bound engineered material, in accordance with aspects hereof. FIG. 7A depicts a first fiber layer 700, a perimeter 702 of a shoe upper, and a second fiber layer 704, in accordance with aspects hereof. As used throughout, unless specifically indicated to the contrary, the first fiber layer 700 and any other fiber layer (e.g., the second fiber layer 704) may be comprised of any fiber or combination of fibers. As previously described, the fibers may be organic (e.g., wool, cotton, protein-based, or cellulose-based), synthetic (e.g., polymer or aramids), and/or engineered (e.g., carbon fiber, or glass). Additionally, the first fiber layer 700 and any other fiber layer (e.g., the second fiber layer 704) described herein, unless specifically indicated to the contrary, may be comprised of additional materials. For example, the additional materials may include, by way of example only, binders, colorants, reactive chemistries, fillers, primers, foaming materials, particles, powders, and the like. As provided herein, any material listed throughout in connection with a fiber is contemplated.

The upper perimeter 702 may represent a distinct material, such as a scrim, and/or it may represent a perimeter defining a portion to be removed from the assembly. In the latter, the upper perimeter 702 may be merely representative for illustration purposes and to provide context to the figure (e.g., the upper perimeter 702 may not be a physical demarcation that is visible) or the upper perimeter 702 may be a visible indication/marking (and/or may include one or more visible markings for sizing, alignment and/or registration). In the former, where the upper perimeter 702 is a distinct material, it is contemplated that specific aspects (e.g., engineered materials) have been omitted for illustration purposes. However, it is contemplated that the upper perimeter 702, when a distinct material, may be comprised of one or more elements provided herein. Additionally, for aspects where the upper perimeter 702 is a distinct material, like other scrims described herein, the upper perimeter 702 may be formed from a variety of techniques (e.g., knit, woven, nonwoven, braided, embroidered, tailored fiber placement, deposition-formed, reductions-formed, cast, extruded, expanded, 3D-printed, or film techniques) and it may be formed from a variety of materials or combinations of materials. Additional upper perimeters will be depicted throughout this application in a generic manner similar to upper perimeter 702, but it is understood that they too are merely depicted in a simplified manner for illustration purposes and the above description of the upper perimeter 702 is equally applicable.

Figure 7B:
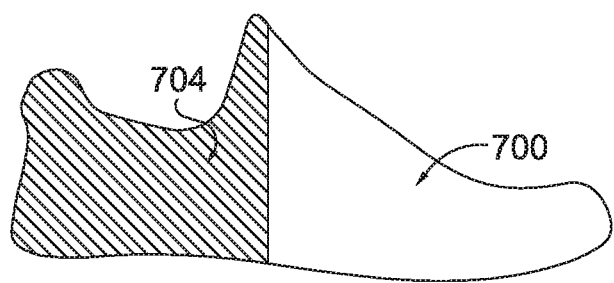
FIG. 7B depicts an article formed from the exemplary multiple fiber layer arrangement of FIG. 7A, in accordance with aspects hereof.

FIG. 7B depicts an upper formed from the assembly of FIG. 7A, in accordance with aspects hereof. Specifically, the first fiber layer 700 forms a toe end portion and part of a midfoot portion. The second fiber layer 704 forms a heel portion and a part of the midfoot portion. In this example, two concepts are explored and depicted.

First, it is contemplated that a single fiber layer may be used to form a portion of the article. For example, if the upper perimeter 702 is a scrim, the first fiber layer 700 may entangle with the upper perimeter 702 and/or the first fiber layer 700 may entrap portions of the upper perimeter 702 as the first fiber layer 700 self-entangles. In this example, the scrim may be on an interior or exterior surface relative to the single fiber layer. Depending on the purpose of the scrim, the interior or exterior selection may be adjusted. For example, if the scrim provides structural integrity but is not as desirable from a hand-feel perspective relative to the fiber layer, the scrim may be positioned on the exterior surface of the fiber layer. Alternatively, if the scrim material has better moisture movement characteristics relative to the fiber layer, the scrim may be positioned on the interior surface of the fiber layer to be more effectively positioned proximate a wearer's body, for example. Therefore, while the upper perimeter 702 is depicted on an exterior surface of the formed article in FIG. 7B, alternative positions also are contemplated.

The second aspect explored in FIGS. 7A and 7B is the generation of an engineered material by layering of fiber layers. The layering of fiber layers, as will be explored throughout, may be effective to impart engineered characteristics to a fiber-bound material. For example, the additional fiber layers forming strata of an assembly may be comprised of varied materials, in varied relative orientations, and/or in specific relative locations, to achieve an intended characteristic at an intended relative location that is not uniform across the assembly. For example, the second fiber layer 704 may comprise a composition having a melt temperature or softening temperature that is below a melt temperature (or a softening temperature or a decomposition temperature) of the first fiber layer 700. Therefore, energy may be applied to the assembly in FIG. 7B to melt (or at least initiate a state change of the composition) causing flow and/or bonding of the entangled fibers at the location of the second fiber layer 704. This alteration in state may provide increased resilience, rigidity, moisture protection, visual characteristics (e.g., converting the second fiber layer to transparent or translucent), and/or the like in the portion of the article incorporating the second fiber layer 704, in this example.

Figure 8A:
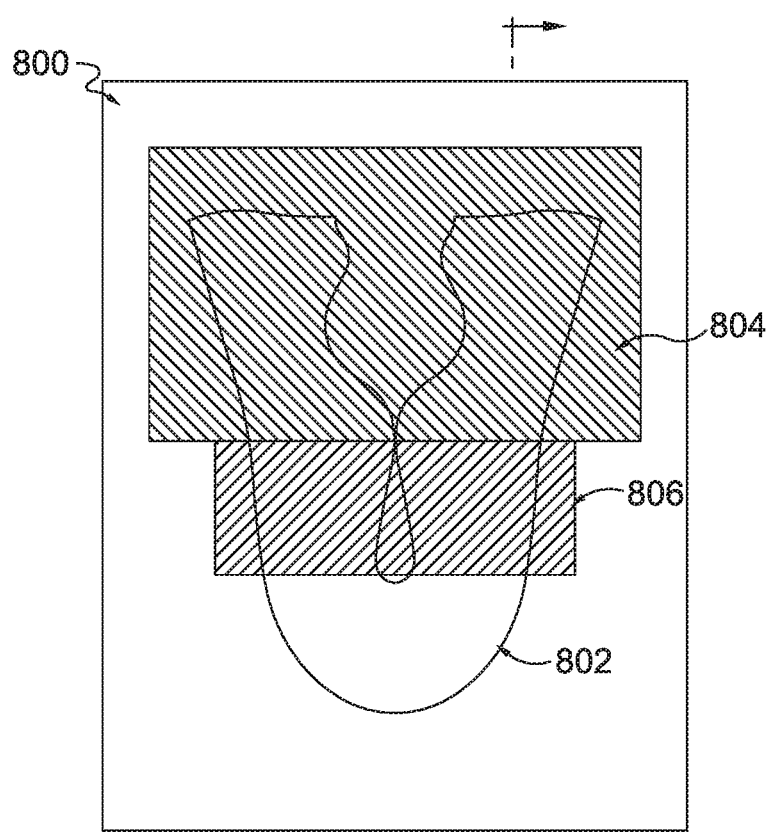
FIG. 8A depicts a second exemplary multiple fiber layer arrangement, in accordance with aspects hereof.

FIG. 8A depicts a first fiber layer 800, a perimeter 802 of a shoe upper, a second fiber layer 804, and a third fiber layer 806, in accordance with aspects hereof. As previously described, the elements depicted in FIG. 8A are merely exemplary in nature and are not limiting. It is understood that any of the elements may be formed from a variety of techniques and materials, as previously described in connection with FIG. 7A.

Figure 8C:
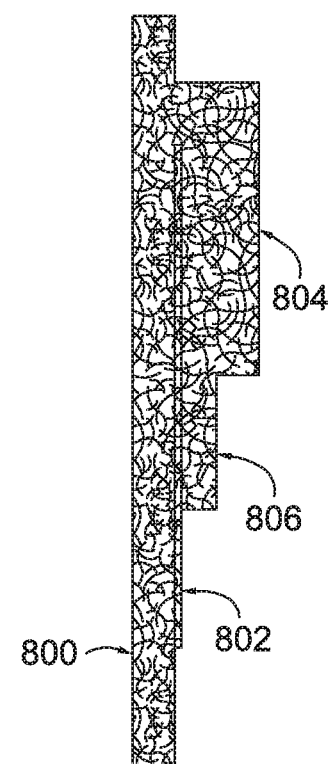
FIG. 8C depicts a cross-section of the second exemplary multiple fiber layer arrangement of FIG. 8A, in accordance with aspects hereof.
Figure 8B:
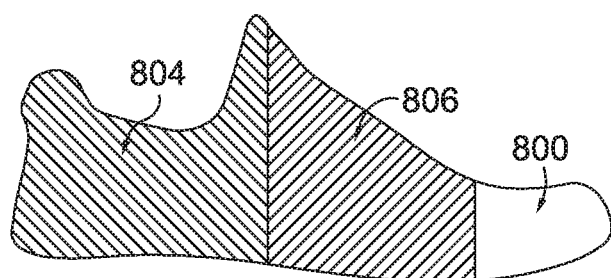
FIG. 8B depicts an article formed from the second exemplary multiple fiber layer arrangement of FIG. 8A, in accordance with aspects hereof.

FIG. 8B depicts an upper component formed from the assembly of FIG. 8A, in accordance with aspects hereof. The layering of fiber layers is further emphasized in this example where the first fiber layer 800 forms a toe portion, the second fiber layer 804 forms a heel portion exterior surface, and the third fiber layer 806 forms a midfoot portion exterior surface. However, as depicted in FIG. 8C, a cross-sectional view along cut line 8C of FIG. 8A, the assembly includes overlapping layers that form a compound construction that has a tapered profile. A tapered profile may provide a transition or gradation from a first region to a second region. For example, the heel portion is comprised of the first fiber layer 800, the upper perimeter 802 (e.g., a scrim in this example), the second fiber layer 804, and the third fiber layer 806. As also depicted in FIG. 8C, the various fiber layers are entangled forming a bonded assembly. For example, fibers from the first fiber layer 800 extend into (and potentially through) the third fiber layer 806 forming a bond between the first fiber layer 800 and the third fiber layer 806. Similarly, fibers from the third fiber layer 806 extend into and entangle with fibers of the first fiber layer 800. Fibers from the first fiber layer 800 also may extend into the second fiber layer 804. In some examples, entanglement through multiple layers may occur depending on entanglement characteristics (e.g., availability and freedom of fibers to move, technique, duration, and/or pressure) and fiber characteristics (e.g., longitudinal length, longitudinal shape, traverse size, traverse shape, fiber length, strength, and bending modulus). The reciprocal may also be true. Fibers forming the second fiber layer 804 may extend into (and potentially through) the third fiber layer 806 to form a fiber-bound assembly. The upper perimeter 802 may be entangled (as depicted) with one or more fibers of the different fiber layers 800, 804, 806. For example, if the upper perimeter 802 is formed from a fiber-based structure, the fibers of the upper perimeter 802 and the fibers of the fiber layers 800, 804, 806 may interact to entangle and bond. Additionally or alternatively, the upper perimeter 802 may be encased by the fibers of the various fiber layers 800, 804, 806. For example, if the upper perimeter 802 is formed from an entanglement impervious material (e.g., a polymer sheet with hydroentanglement), the fiber layers 800, 804, 806 may entangle around, but not through, the upper perimeter 802, in an exemplary aspect.

Figure 9A:
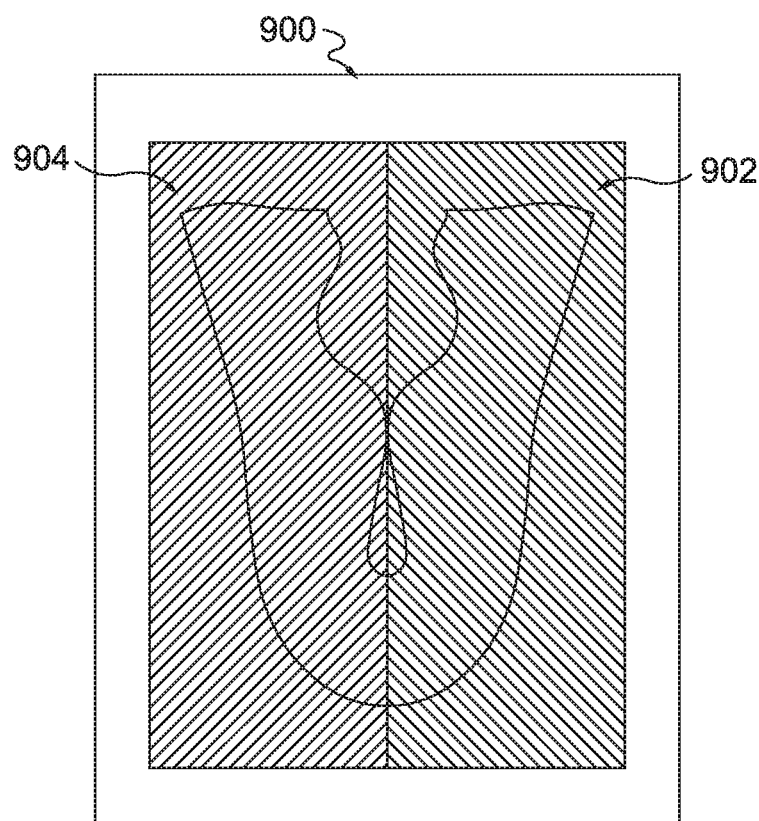
FIG. 9A depicts a third exemplary multiple fiber layer arrangement, in accordance with aspects hereof.
Figure 9B:
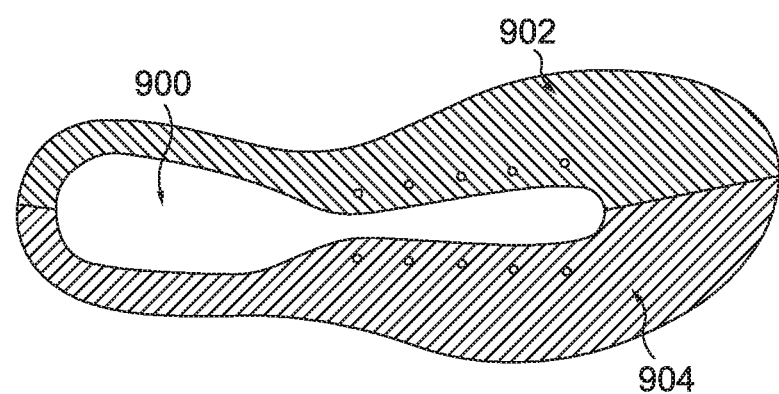
FIG. 9B depicts an article formed from the third exemplary multiple fiber layer arrangement of FIG. 9A, in accordance with aspects hereof.

FIG. 9A depicts an alternative multi-fiber layer assembly, in accordance with aspects hereof. A first fiber layer 900 is overlaid with a second fiber layer 902 and a third fiber layer 904 to form an assembly. In this example, the second fiber layer 902 and the third fiber layer 904 are coplanar and non-overlapping. Therefore, as depicted in FIG. 9B, illustrating an article formed from the assembly of FIG. 9A, a medial side may be formed from the second fiber layer 902 and a lateral side may be formed from the third fiber layer 904. As such, it is contemplated that a first portion of a formed article may be engineered in a first manner with a first fiber construction and a second portion of the formed article may be engineered in a second manner with a second fiber construction such that the first and second fiber constructions do not interact (other than at a boundary there between, if one exists). While the fiber placement of FIG. 9A depicts a midline split between the second fiber layer 902 and the third fiber layer 904, it is contemplated that a split may occur in any location, orientation (e.g., traverse or biased), and/or shape (e.g., organic shape, linear shape, or an island not sharing a boundary with neighboring coplanar materials), and the like. As can be appreciated, different portions of an article may have different functional needs. For example, an article of footwear may be designed to have variability in medial and lateral portions thereof to respond to greater sheer forces experienced by a lateral portion during a cutting movement.

Figure 10A:
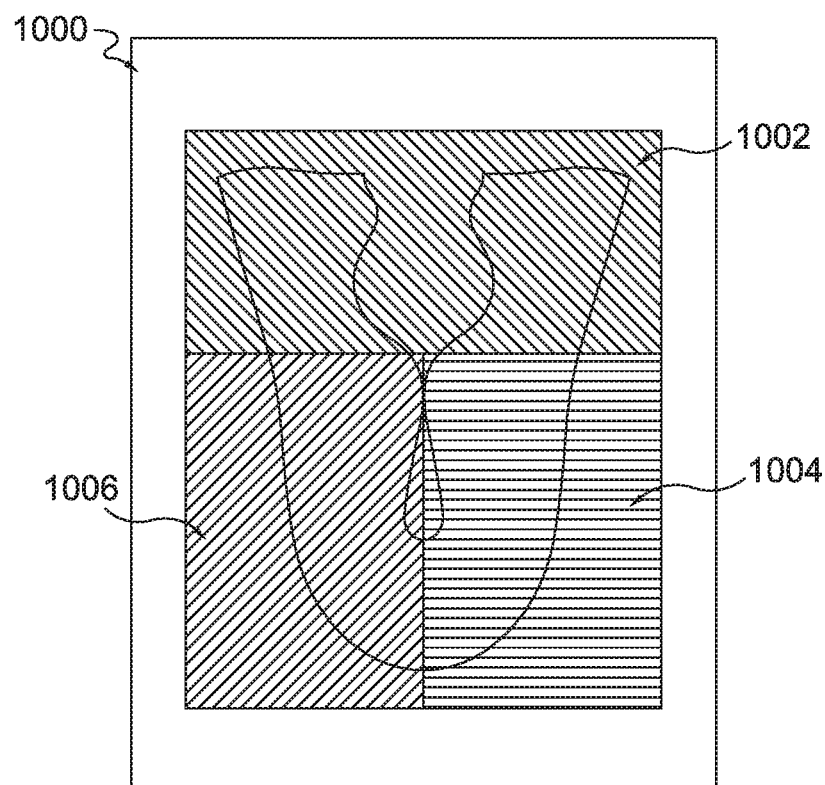
FIG. 10A depicts a fourth exemplary multiple fiber layer arrangement, in accordance with aspects hereof.

FIG. 10A depicts another co-planar fiber assembly, in accordance with aspects hereof. A first fiber layer 1000 has a plurality of fiber layers overlaying. As such, the first fiber layer 1000 may be a carrier fiber layer onto which engineered aspects are formed. In aspects, it is contemplated that a carrier fiber layer may be formed from a material having relatively neutral characteristics that would impart minimal engineered qualities to the article as a whole when formed. In other aspects, the carrier fiber layer is contemplated to be a relatively inexpensive material, such that it can be formed as a rolled good for use in a continuous manufacturing process, in an exemplary aspect. Additionally, it is contemplated that a carrier fiber layer may be formed from a material that is able to be recycled. Further yet, it is contemplated that a carrier fiber layer may be formed from a characteristics-appropriate material. For example, an article of footwear may be formed such that the carrier material is a sock liner, underfoot portion, and/or interior surface of an article of footwear. In this example, the carrier fiber layer may be formed from a soft, non-abrasive fiber composition that has a higher abrasion resistance, a higher pilling resistance, or higher melt, softening, or decomposition temperature than typically experienced during manufacturing or wear, for example. Stated differently, it is contemplated that fiber-bound engineered materials may include an underfoot portion for an article of footwear. The fiber-bound engineered materials also may have an interior surface that serves as a sockliner, which allows for omission of a typical additional material layer to serve as a sock liner. Therefore, the fiber-bound engineered material can form a lighter, more form-fitting shoe than traditional materials.

Figure 10B:
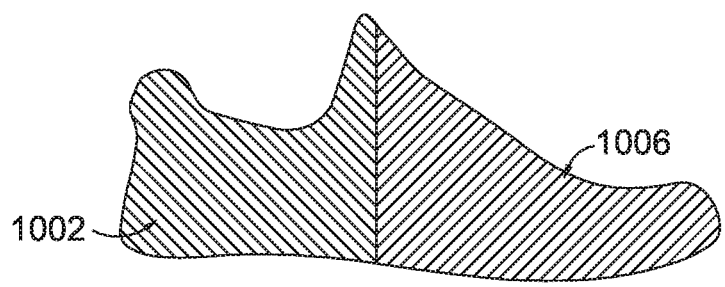
FIG. 10B depicts a lateral perspective view of an article formed from the fourth exemplary multiple fiber layer arrangement of FIG. 10A, in accordance with aspects hereof.
Figure 10C:
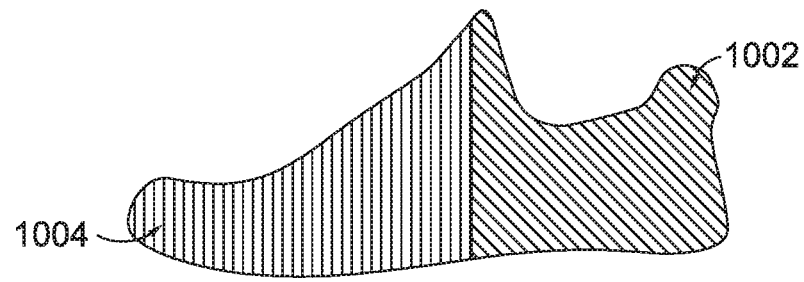
FIG. 10C depicts a medial perspective view of an article formed from the fourth exemplary multiple fiber layer arrangement of FIG. 10A, in accordance with aspects hereof.

A second fiber layer 1002, a third fiber layer 1004, and a fourth fiber layer 1006 are all depicted as coplanar fiber layers overlaying an upper perimeter. In this exemplary arrangement, a heel end on both medial and lateral sides is formed with the second fiber layer, as depicted in FIGS. 10B and 10C. The medial side, inclusive of the toe portion, is formed from the third fiber layer 1004 (as depicted in FIG. 10C). The lateral side, inclusive of the toe portion, is formed from the fourth fiber layer 1006 (as depicted in FIG. 10B). As such, it is demonstrated in FIGS. 10A through 10C that a variety of coplanar arrangements may be implemented to achieve an engineered material through manipulation of the fiber layer(s).

FIGS. 11A through 14B provide examples of multiple scrims and relative position and/or characteristic differences, in accordance with aspects hereof. Specifically, FIGS. 11A through 14B depict a variety of configurations based on the interaction of fiber layer(s) with one or more scrims, material selection and resulting entanglement and/or entrapment/encasement of the scrim(s), and relative position of multiple scrims with respect to one another.

Figure 11A:
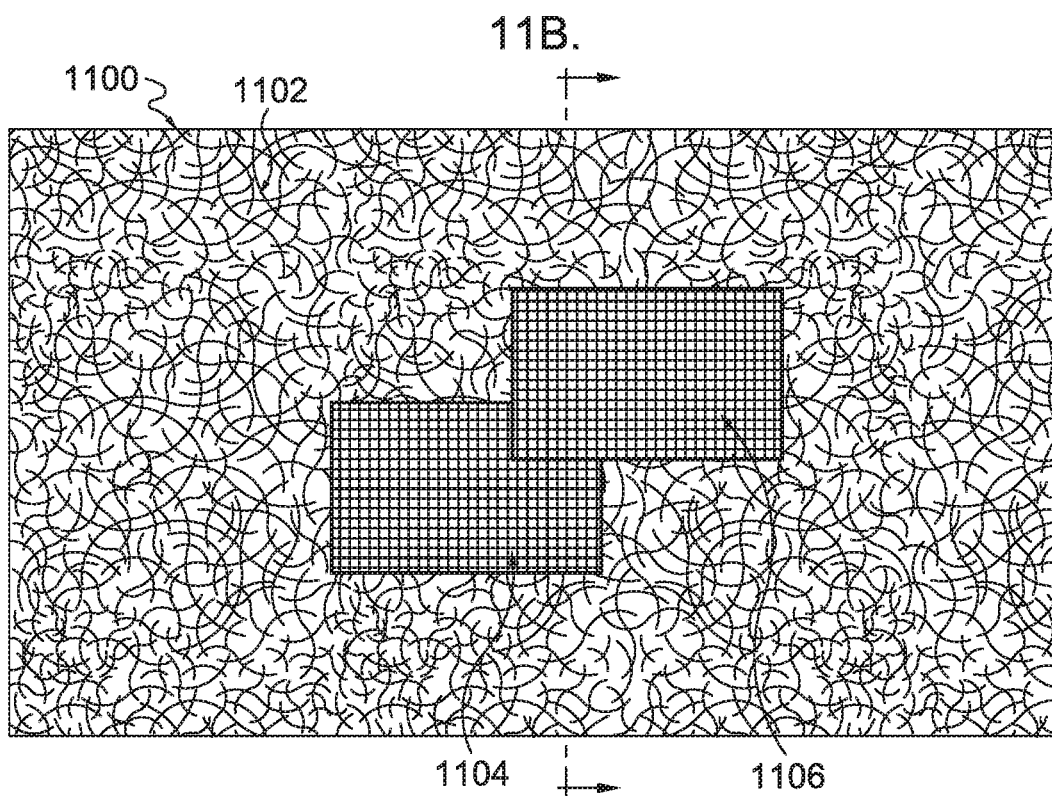
FIG. 11A depicts an exemplary scrim assembly, in accordance with aspects hereof.

FIG. 11A depicts a first fiber layer 1100 comprised of a plurality of fibers 1102, in accordance with aspects hereof. As previously provided, it is contemplated that the first fiber layer 1100 (or any fiber layer, unless explicitly indicated to the contrary) may be formed from any combination of fibers. The first fiber layer 1100 may be uniform or variable in fiber composition. As such, it is contemplated that the first fiber layer 1100 may be engineered or stock in exemplary aspects. A first scrim 1104 and a second scrim 1106 also are depicted in FIG. 11A. The first scrim 1104 and the second scrim 1106 may be any material or construction (e.g., knit, woven, nonwoven, braided, tailored fiber placement, embroidered, deposition-formed, reductions-formed, molded, cast, expanded, 3D-printed, sheet, film, etc.); however, in aspects, they are contemplated as a textile-like material as depicted. As previously provided, the exemplary scrims depicted in the figures, unless indicated to the contrary, may be comprised of any material composition, formation technique, size, shape, and/or orientation.

Figure 11B:
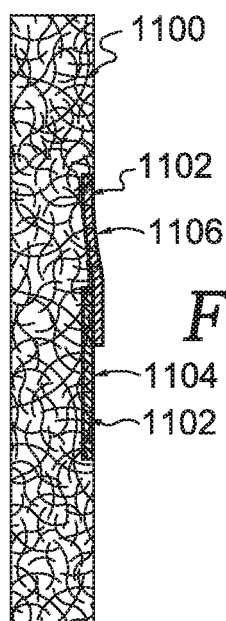
FIG. 11B depicts a cross-section of the exemplary scrim assembly of FIG. 11A, in accordance with aspects hereof.

FIG. 11B depicts a cross-sectional view along cutline 11B of FIG. 11A, in accordance with aspects hereof. As depicted, a plurality of fibers 1102 extends through and entangles with the first scrim 1104 and second scrim 1106. In this example, the first fiber layer 1100 serves as the sole fiber binder of the first scrim 1104 and the second scrim 1106. For example, no active binder other than the fibers 1102 may be used to couple one or more of the scrims together or to the fiber layer 1100. For example, adhesives, mechanical fasteners, or the like may be omitted. Omission of these alternative binders prevents the binders from inserting characteristics or limitations into the assembly. For example, an adhesive may limit stretch, increase rigidity, reduce air permeability, and the like, in one or more portions for which that characteristic is not intended. Further, the non-fiber binding options may increase thickness, weight, cost, and/or manufacturing processes. Therefore, aspects herein contemplate omitting alternative binders altogether, or limiting their implementation in other aspects. Fiber binding is an effective binding solution that works to form an engineered material. It is also contemplated that the fiber layer may be formed with fibers of a material (e.g., a fusible material) that may bond with scrim materials through means other than entanglement. For example, the fiber layer may be formed having one or more fusible fibers from a first fusible material and a scrim may be formed to include at least a portion having the first fusible material as well. Subsequent to (or prior to) entanglement, the first fusible material may be activated (e.g., energy may be applied thereto) causing a bond between the fiber layer and the scrim to be enhanced relative to that achieved from mere entanglement alone, in an exemplary aspect.

The first scrim 1104 is overlapped by a portion of the second scrim 1106. This provides an example of how multiple scrims (engineered or stock) may be combined and bound in relative position by fiber entanglement. Therefore, if a first scrim has a first characteristic and a second scrim has a second characteristic, the combination of the first characteristic and the second characteristic may be achieved with fiber binding to result in an engineered textile. Depending on an entanglement technique implemented, the entanglement may occur from a first side only or from both sides of the assembly. In this example, since a fiber layer is only on a single side, an entanglement process that is capable of bringing fibers through the scrims may be leveraged. An example may include barbed-needle entanglement where barbs of the needle are effective to push and pull on fibers to encourage entanglement. Additionally, fluid entanglement from at least a back side of the assembly is contemplated. Fluid enanglement from both the back and a front sides of the assembly is effective to achieve a different (e.g., a potentially stronger) binding between the scrims as the fibers are forced both forwards and backwards.

Figure 12A:
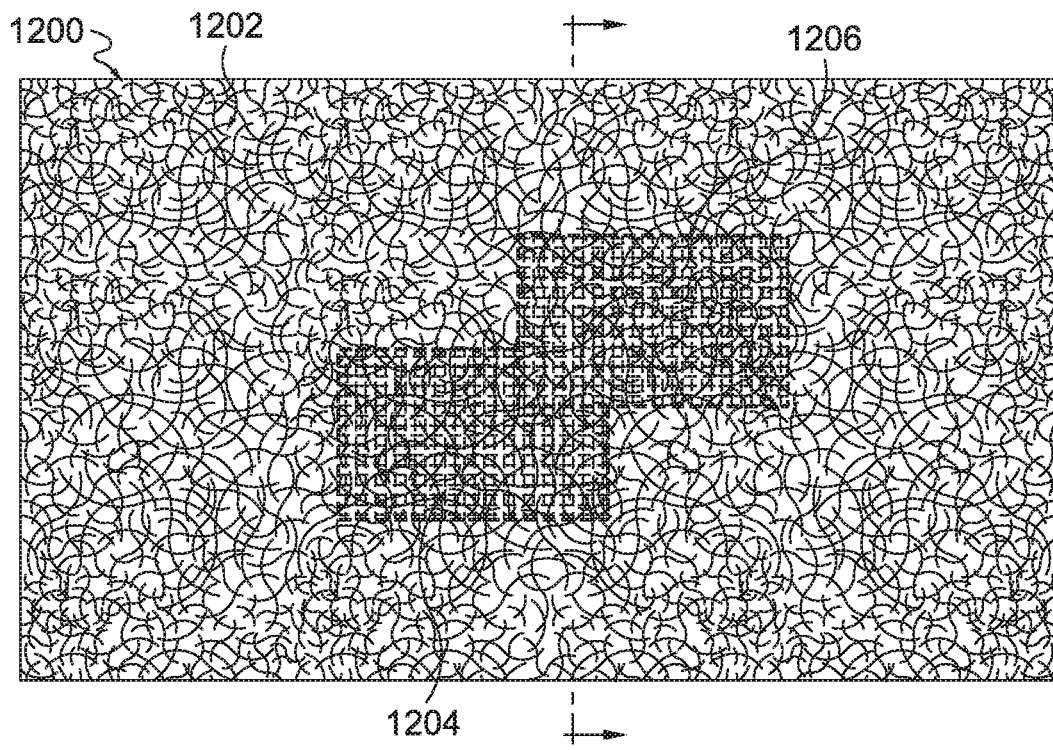
FIG. 12A depicts a second exemplary scrim assembly, in accordance with aspects hereof.
Figure 12B:
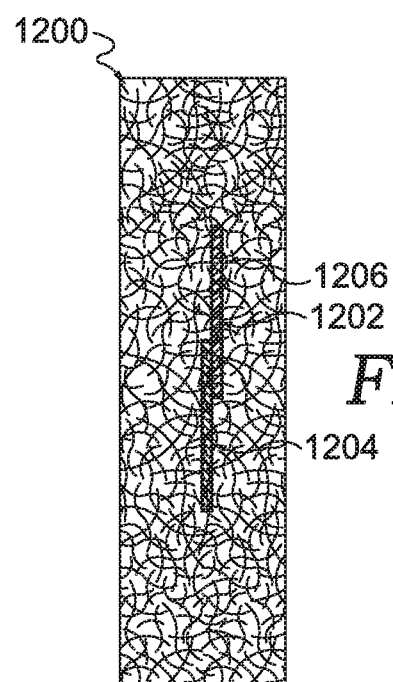
FIG. 12B depicts a cross-section of the second exemplary scrim assembly of FIG. 12A, in accordance with aspects hereof.

FIG. 12A depicts a fiber layer 1200 comprised of a plurality of fibers 1202, in accordance with aspects hereof. A first scrim 1204 and a second scrim 1206 also are depicted. As best seen in the cross-sectional view along cutline 12B and represented in FIG. 12B, the first scrim 1204 and the second scrim 1206 are encased within the fiber layer 1200. The encasement can be achieved by starting with at least a first fiber layer on a first side of the scrims 1204, 1206 and at least a second fiber layer on an opposite second side of the scrims 1204, 1206 and then entangling the first and second fiber layers to result in the fiber layer 1200. As depicted in FIG. 12B, one or more of the plurality of fibers 1202 also extend through and entangle with the first scrim 1204 and the second scrim 1206. The first scrim 1204 and the second scrim 1206 are fiber-bound by at least a portion of the plurality of fibers 1202 and form a fiber-bound engineered material where the scrims 1204, 1206 are encased within the fibers.

Figure 13A:
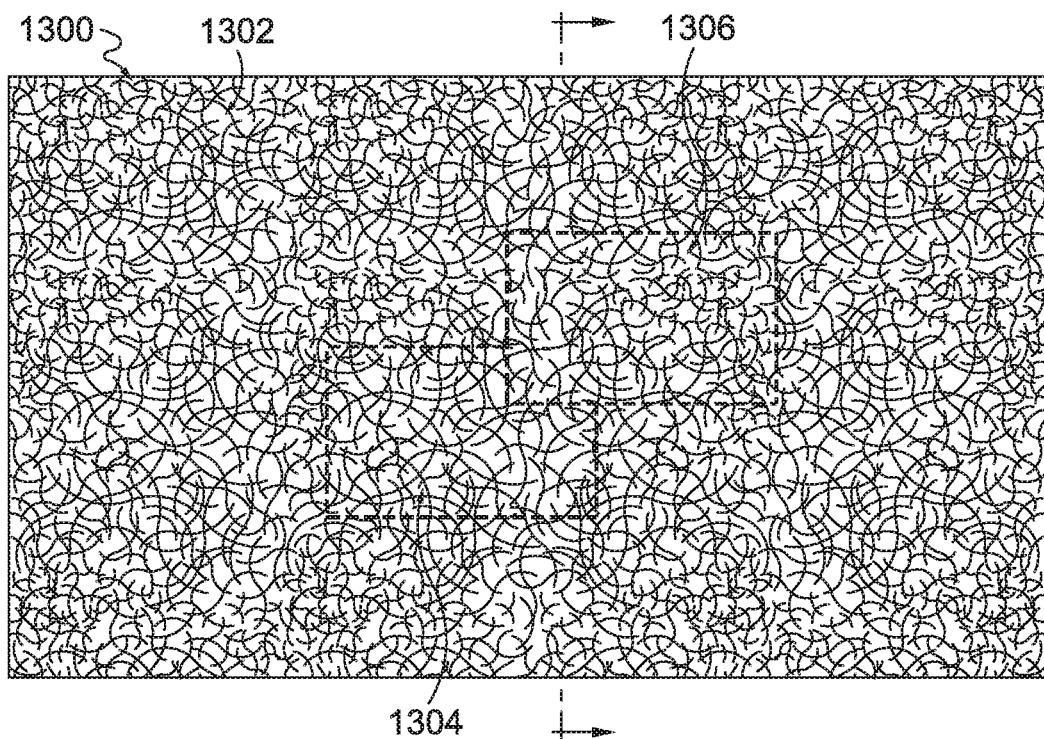
FIG. 13A depicts a third exemplary scrim assembly, in accordance with aspects hereof.

FIG. 13A depicts a fiber layer 1300 comprised of a plurality of fibers 1302, in accordance with aspects hereof. A first scrim 1304 and a second scrim 1306 are encased within the fiber layer 1300 in a manner similar to FIGS. 12A and 12B. However, the first scrim 1304 and the second scrim 1306 are formed from an impervious material. An impervious material is a material through which fibers do not extend as a result of the entanglement process. A substantially impervious material is a material that while entanglement occurs, the fiber bonds created are of insufficient strength to resist minor agitation. For purposes throughout, impervious materials also may include substantially impervious materials, unless indicated otherwise. Examples may include film or sheet-like materials.

Figure 13B:
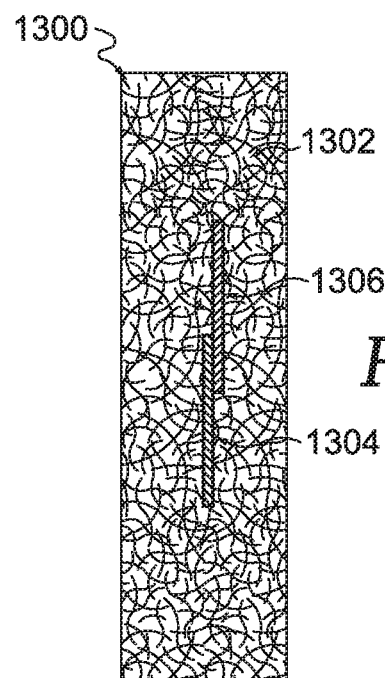
FIG. 13B depicts a cross-section of the third exemplary scrim assembly of FIG. 13A, in accordance with aspects hereof.

As depicted in FIG. 13B, a cross-sectional view along cutline 13B of FIG. 13A, the plurality of fibers 1302 do not extend through the first scrim 1304 nor the second scrim 1306. In this example, the scrims are maintained through perimeter entanglement between the plurality of fibers 1302 and not through entanglement between the plurality of fibers 1302 and the scrims 1304, 1306 themselves. Therefore, as will be described hereinafter, if the fiber layer 1300 is manipulated (e.g., slit) proximate one of the scrims, the scrim may be removed or dissolved and a volume previous filled with the scrim will remain as a pocket within the fiber layer 1300. Therefore, use of an impervious material allows for creation of voids or other cavities within a fiber layer, in an exemplary aspect. As will be described hereinafter with respect to entrapped scrims or components, an impervious material may allow for binding while still allowing for movement within the formed fiber case.

Figure 14A:
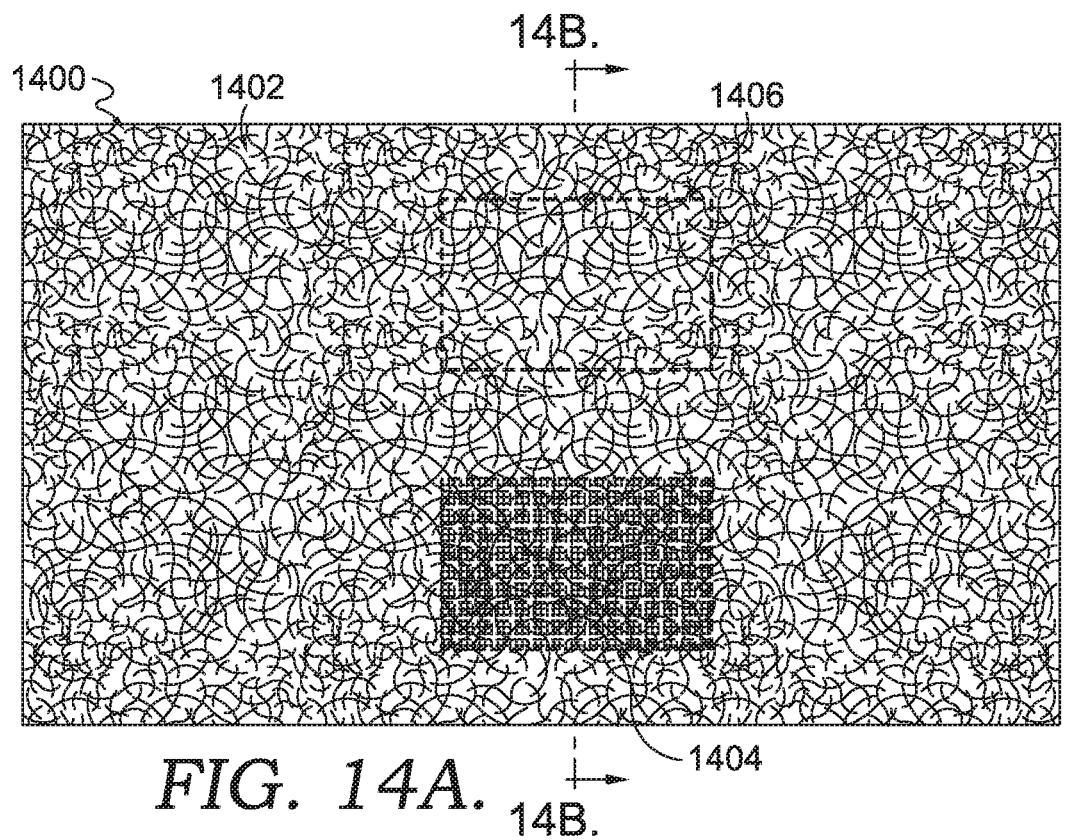
FIG. 14A depicts a fourth exemplary scrim assembly, in accordance with aspects hereof.
Figure 14B:
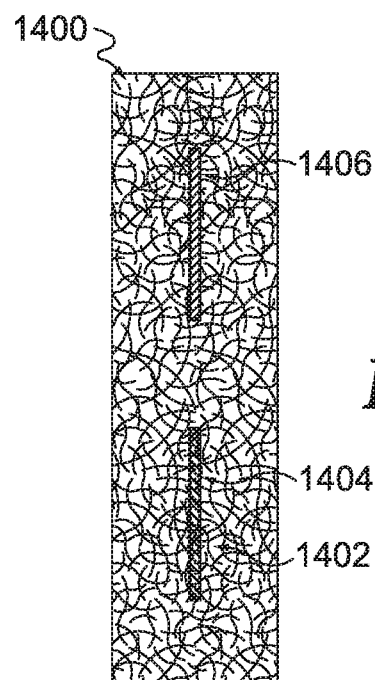
FIG. 14B depicts a cross-section of the fourth exemplary scrim assembly of FIG. 14A, in accordance with aspects hereof.

FIG. 14A depicts a fiber layer 1400 with a plurality of fibers 1402, in accordance with aspects hereof. A first scrim 1404 is formed from a material that can be entangled (e.g., a textile) and a second scrim 1406 is formed from an impervious (relative to fibers) material (e.g., a polymer sheet or film). Further, for exemplary purposes, the first scrim 1404 and the second scrim 1406 are non-overlapping scrims. As depicted in FIG. 14B, the first scrim 1404 and the second scrim 1406 are coplanar scrims, but it is contemplated that they may be offset in a Z directional placement (non-coplanar) in alternative aspects. For example, one or more fiber layers may be positioned between the scrims in the Z-direction prior to entangling the fiber layers. In this example, the assembly would be comprised of multiple scrims that are non-coplanar. In this example, it is further contemplated that Z-directional offset scrims may overlap in whole or in part in the X or Y directions.

Returning to FIG. 14B, the plurality of fibers 1402 pass through and entangle with the first scrim 1404. The plurality of fibers 1402 do not, however, pass through or entangle directly with the second scrim 1406. Instead, as previously described, the plurality of fibers 1402 self-entangle and form a case that entraps (encases) the second scrim 1406.

Figure 15:
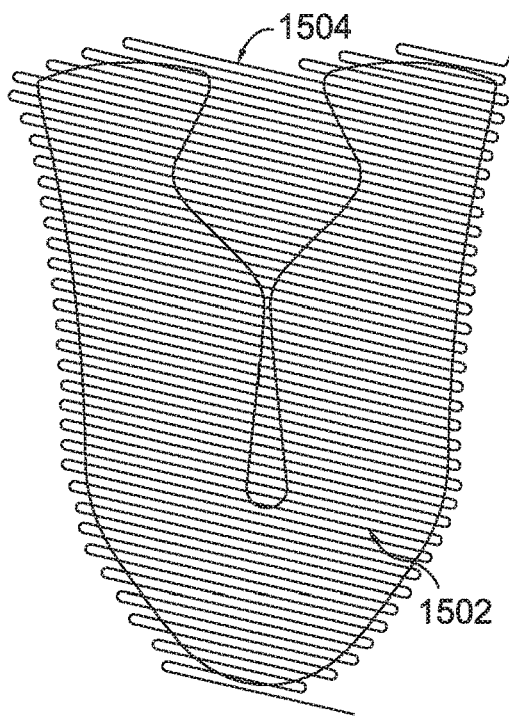
FIG. 15 depicts an exemplary engineering-element scrim, in accordance with aspects hereof.
Figure 16:
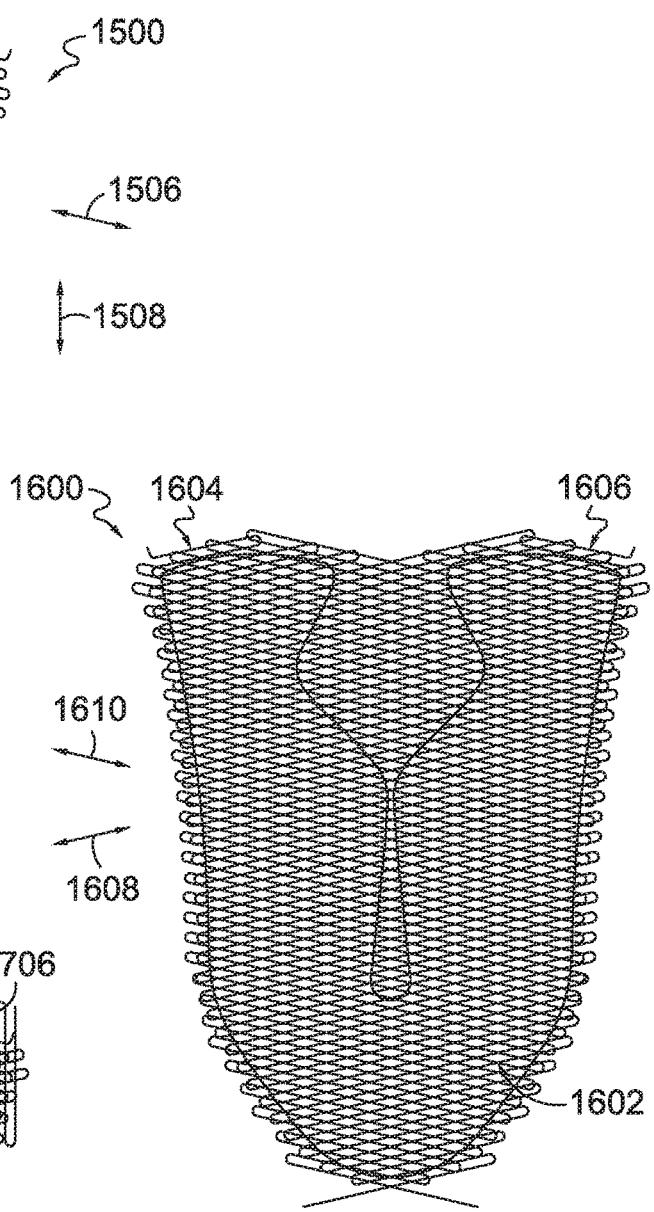
FIG. 16 depicts a second exemplary engineering-element scrim, in accordance with aspects hereof.
Figure 17:
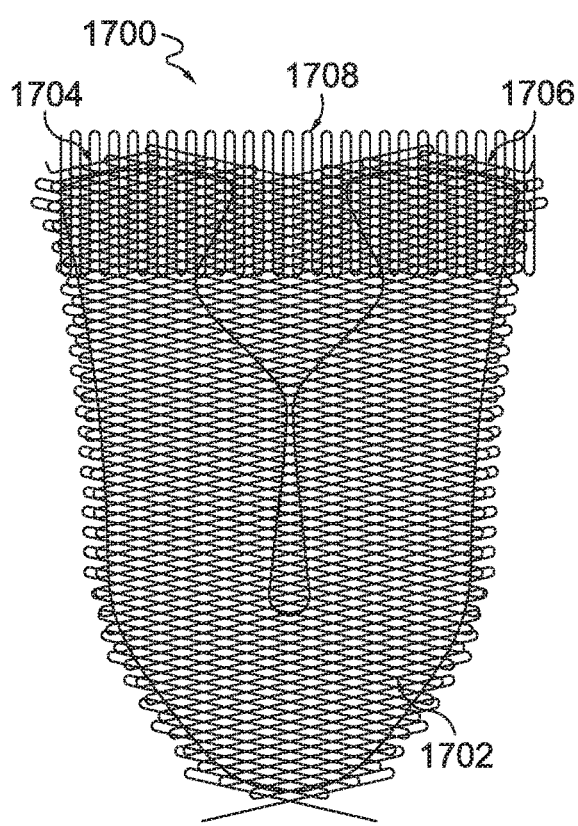
FIG. 17 depicts a third exemplary engineering-element scrim, in accordance with aspects hereof.

FIGS. 15 through 17 depict scrims having direction engineering accomplished through one or more engineering elements, such as high-tensile strength (e.g., low stretch) relative to an associated fiber layer.

FIG. 15 depicts an article 1500 comprised of an article perimeter 1502 and a first engineering element 1504. The first engineering element 1504 may be (or may become through subsequent processing) a high tenacity, high tensile strength, low stretch material, such as a cord, wire, molded matrix, deposited matrix, filament, thread, roving, and the like. The measured characteristics (stretch, tenacity, and tensile strength) may be relative to an associated fiber layer serving as a fiber binder to the first engineering element 1504. The illustrated article perimeter 1502 represents a shoe upper configuration. As with previous descriptions herein, an article perimeter, such as the article perimeter 1502, may exist visually on a fiber layer, in theory for illustration purposes, or as a physical element (e.g., as a scrim having that shape). A toe-to-heel direction is represented by arrow 1508. A biased medial-to-lateral direction is represented by arrow 1506. With the arrangement of the first engineering element 1504, a stretch is limited in the direction of arrow 1506 as that is substantially parallel with a direction of placement of the first engineering element 1504. However, a stretch in the direction of arrow 1508 is minimally if at all affected by the first engineering element 1504. As such, article 1500 demonstrates how orientation of engineering materials serving as a scrim can impart engineered characteristics to a fiber layer to be a fiber-bound engineered material. In this example, the first engineering element 1504 may be a tailored fiber placement, which may have a locking stitch, such as an embroidery stitch, maintaining the fiber in a specified location of an underlying material. The locking stitch may be formed from any material, even a fugitive material that is later dissolved. Alternatively, it is contemplated that a locking stitch with a discrete thread is omitted. Instead, an entanglement process may be used as the element (e.g., roving) is applied to an underlying substrate, such as a scrim. For example, as the element is placed, one or more barbed needles may entangle the element with a fiber layer. Other means of entanglement (e.g., fluid entanglement and/or structured-needle entanglement) may be implemented.

FIG. 16 depicts an article 1600 comprised of an article perimeter 1602, a first engineering element 1604, and a second engineering element 1606. The first engineering element 1604 and the second engineering element 1606 each may be (or may become through subsequent processing) a high tenacity, high tensile strength, low stretch material, such as a cord, wire, roving, and the like. The article perimeter 1602 represents a shoe upper configuration. The first engineering element 1604 limits stretch in a direction represented by an arrow 1608 and the second engineering element 1606 limits stretch in a direction represented by an arrow 1610. Further, following an entanglement processes, it is contemplated that the first engineering element 1604 and the second engineering element 1606 work in summation as an intersection of the elements 1604, 1606 form common points of bonding, in an exemplary aspect. Therefore, the resulting characteristics of the scrim formed by the first engineering element 1604 and the second engineering element 1606 may be different than if each of the engineering elements 1604, 1606 was to be measured individually.

FIG. 17 depicts an article 1700 comprised of an article perimeter 1702, a first engineering element 1704, a second engineering element 1706, and a third engineering element 1708. Each of the first engineering element 1704, the second engineering element 1706, and the third engineering element 1708 may be (or may become through subsequent processing) a high tenacity, high tensile strength, low stretch material, such as a cord, wire, roving, and the like. The illustrated article perimeter 1702 represents a shoe upper configuration. It is contemplated that the engineering elements 1704, 1706, 1708 may be the same, similar, or different. The engineering elements 1704, 1706, 1708 may be different in material, construction, size, and/or the like. As provided in FIG. 17, it is contemplated that a zonal configuration for the engineering elements 1704, 1706, 1708 may be formed. For example, in a heel end of the article perimeter 1702, the third engineering element 1708 limits stretch in the heel-to-toe direction of the article perimeter 1702. When constructed into a three-dimensional shoe upper, the third engineering element 1708 is effective to limit stretch around a heel end in a medial-to-lateral direction. Therefore, FIG. 17 contemplates and explores zonally placing engineering elements to achieve a variable (e.g., zonally applied) engineered characteristic. While depicted in the heel area, it is contemplated that one or more alternative or additional zones may have an engineering element. Further, while the engineering elements are described with respect to a limitation in stretch, additional (or alternative) characteristics also may be achieved by engineering elements. For example, an engineering element may be a foam elongated portion that is integrated to provide impact attenuation or other cushioning characteristics.

FIGS. 18A through 21B depict different upper configurations and potential scrim positions, in accordance with aspects hereof. While certain upper configurations are depicted with specific scrim placements, it is contemplated that an upper configuration may be combined with the intended result of a depicted scrim. For example, a scrim configured to add engineering characteristics to a heel section may be of a first shape for a first upper configuration and the scrim may be of a different shape (or may be comprised of multiple scrims) for a different upper configuration. Therefore, a contemplation of a location of a scrim allows for a translation between scrim shapes, sizes, and positions to be effective for a similar purpose on alternative upper configurations. Stated differently, discrete elements described and depicted herein demonstrate principles that may be implemented and are not limiting. Instead, the principles provided are guiding to combinations that may be formed.

Figure 18A:
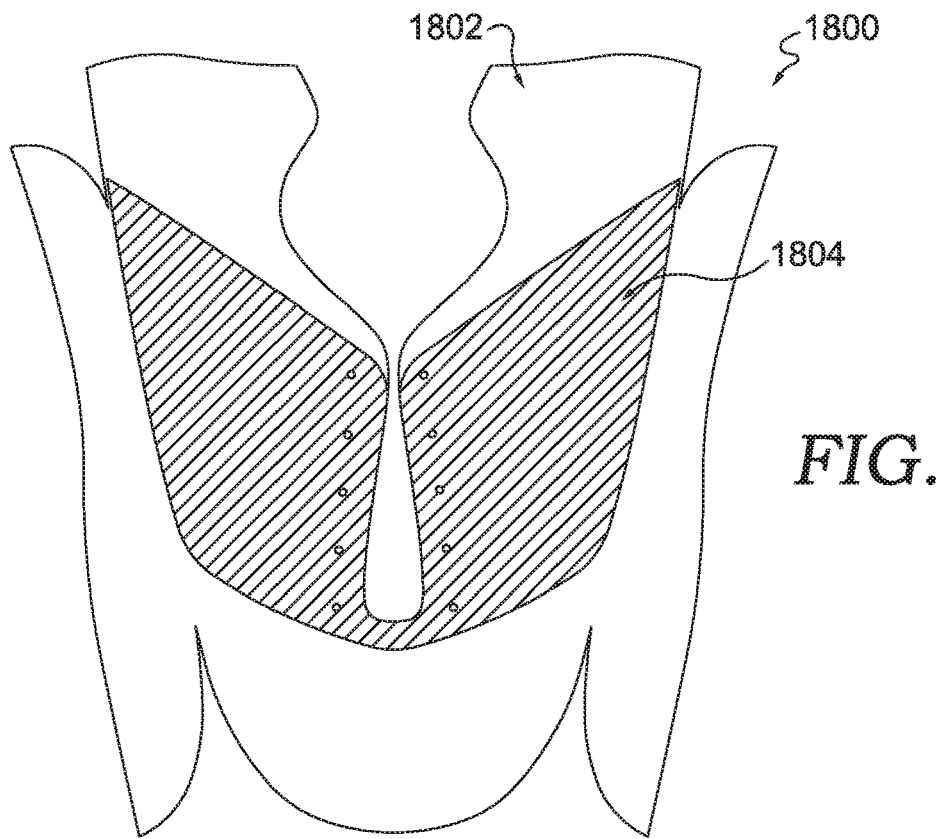
FIG. 18A depicts an exemplary scrim configuration, in accordance with aspects hereof.
Figure 18B:
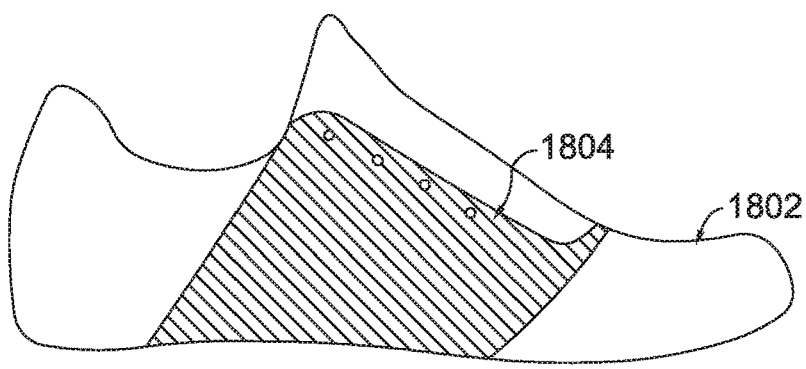
FIG. 18B depicts a medial perspective view of an article formed from the exemplary scrim configuration of FIG. 18A, in accordance with aspects hereof.
Figure 18C:
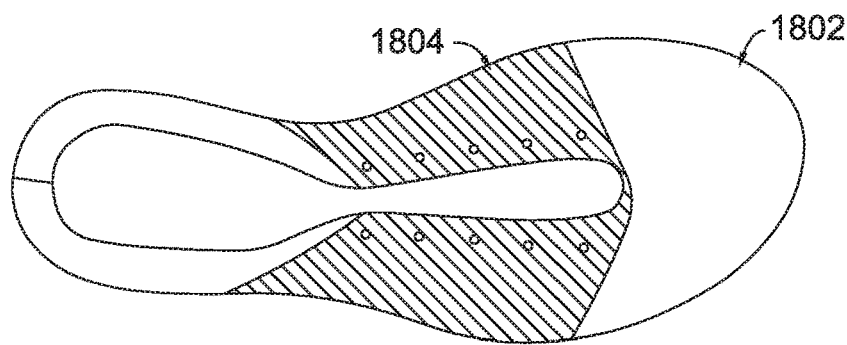
FIG. 18C depicts a plan view of the article illustrated in FIG. 18B, in accordance with aspects hereof.

FIG. 18A depicts a planar upper 1800 having a base portion 1802 and a scrim 1804, in accordance with aspects hereof. A base portion may be a fiber layer and/or a scrim. As provided herein, the base portion and the scrim(s) may be formed from a variety of materials (e.g., organic or synthetic) with a variety of techniques (e.g., knit, woven, nonwoven, embroidered, tailored fiber placement, deposition-formed, reductions-formed, expanded, 3D-printed, molded, or extruded). The scrim 1804 provides engineering characteristics to a midfoot region on both a medial and a lateral side extending around a throat portion toward a sole coupling location, as seen in FIGS. 18B and 18C. In this example, a continuous scrim extends across multiple portions of the article and may be effective for a variety of engineering characteristics. A continuous scrim is an unbroken whole that is without interruption, in an exemplary aspect. For example, the scrim 1804 may be effective to transfer a lace load from the throat region toward the sole more effectively than the base portion 1802 alone. For example, the scrim 1804 may have a lower modulus of elasticity than the base portion 1802.

In another example, the scrim 1804 (or any scrim provided herein) may be formed to have a plurality of openings, such as a knit large mesh. In this example, when a fiber layer is entangled about the plurality of openings, a texture is created. Depending on a size of the apertures and the characteristics of the fibers, the fibers may not obscure the apertures and instead entangle around the positive portion of the scrim and leave the negative space substantially negative. Therefore, in the example of FIGS. 18A through 18C, a high air permeable portion may be formed in the location of the scrim 1804. In this regard, the scrim may be effective to form a macro texture that is exposed, in part, through an entanglement process. This concept may be applied to any scrim provided herein.

Figure 19A:
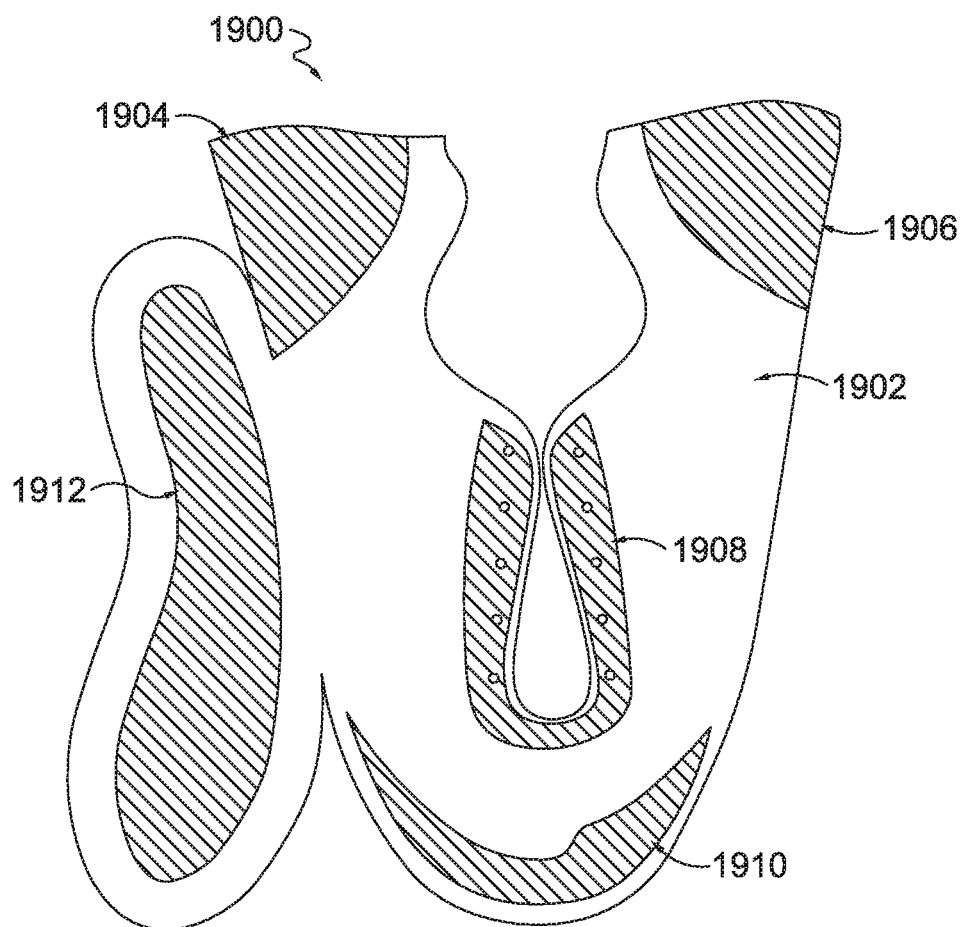
FIG. 19A depicts an exemplary scrim collection, in accordance with aspects hereof.

FIG. 19A depicts a planar upper 1900 having a base portion 1902, a first scrim 1904, a second scrim 1906, a third scrim 1908, and a fourth scrim 1910, in accordance with aspects hereof. While a specific combination of scrims is depicted and will be described, it is understood with FIG. 19A and the other FIGS. that one or more depicted elements may be omitted or altered. Further, it is contemplated that one or more scrims may be added.

Figure 19B:
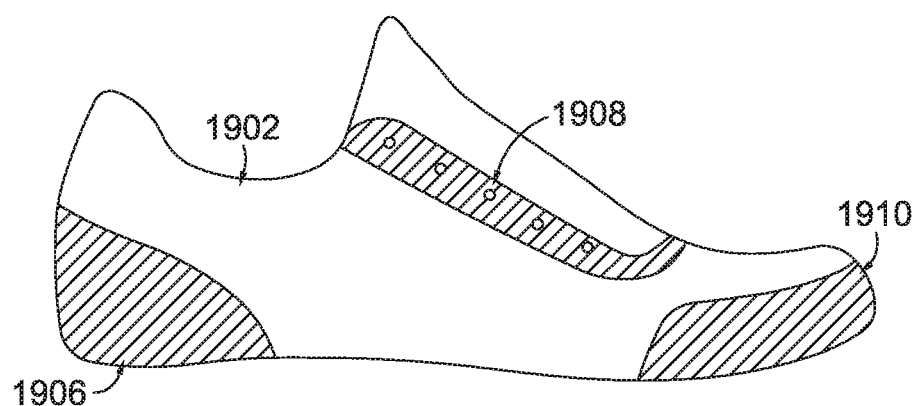
FIG. 19B depicts an article formed from the exemplary scrim collection of FIG. 19A, in accordance with aspects hereof.

The first scrim 1904 is on a lateral portion of a heel region of the planar upper 1900 when in its dimensionally formed state (see FIG. 19B). The second scrim 1906 is on a medial portion of the heel region. The third scrim 1908 forms around a throat on the medial and lateral sides, as well as across a vamp portion. The fourth scrim 1910 extends from the medial and lateral sides across a toe box. A fifth scrim 1912 is depicted in the under-foot region. The fifth scrim 1912 may provide stability, cushion, fit, and/or the like. The fifth scrim 1912, while depicted as filling a substantial portion of the underfoot region, may instead be concentrated at a heel region, arch region, forefoot region, or toe region, in aspects hereof. The fifth scrim 1912 may provide underfoot engineering, such as arch support, cushioning, foot alignment, and the like. Each of the scrims 1904, 1906, 1908, 1910, 1912 may be formed from different materials, formed utilizing different techniques, and/or have different characteristics.

For example, the first scrim 1904 and the second scrim 1906 may serve to reinforce the heel region and to provide additional rigidity. Additionally or alternatively, the first scrim 1904 and the second scrim 1906 may serve as cushioning in the heel region, such as through a lofty or foamed material forming the respective scrims. The third scrim 1908 may be formed from a material that has a greater tear resistance than the base portion 1902. The greater tear resistance is incorporated around lace apertures that can expose the throat portion to concentrated tensile forces from securing the article to a wearer. The fourth scrim 1910 may be formed from a material and/or technique that provides abrasion resistance that is greater than the base portion 1902. A shoe may experience scuffs and scrapes at the leading toe edge that are not experienced as commonly elsewhere on the shoe. As a result, the fourth scrim 1910 is effective to engineer the abrasion resistance characteristic into the planar upper 1900.

FIG. 19B depicts the planar upper 1900 of FIG. 19A in a dimensionally formed state, in accordance with aspects hereof. FIG. 19B includes a tongue portion not depicted in FIG. 19A; however, it is contemplated that a tongue portion may be formed as part of an upper pattern or it may be formed separately and attached subsequently.

Figure 20A:
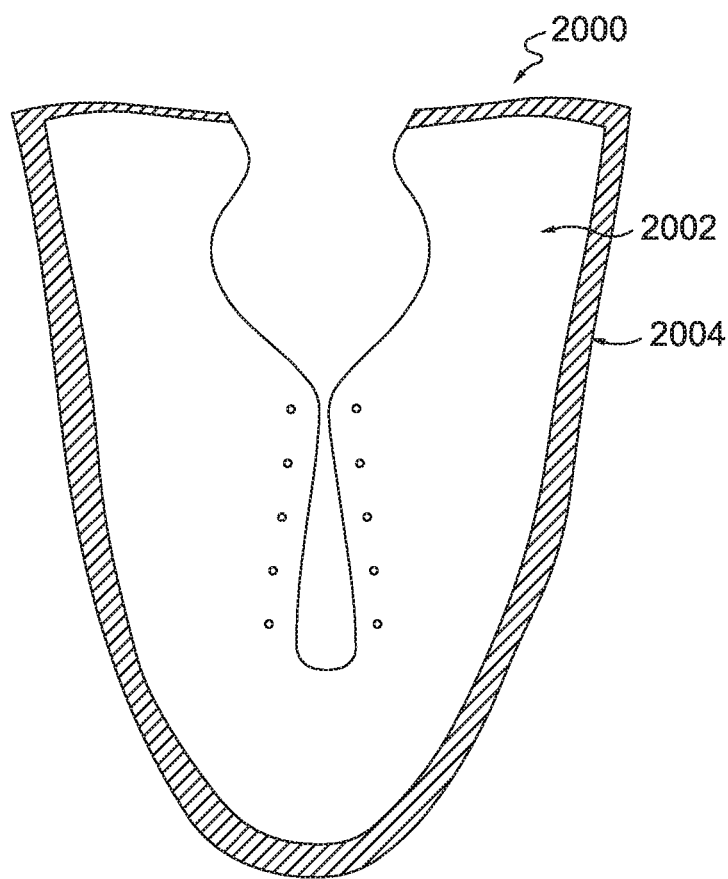
FIG. 20A depicts an exemplary perimeter scrim, in accordance with aspects hereof.

FIG. 20A depicts a planar upper 2000 having a base portion 2002 and a scrim 2004, in accordance with aspects hereof. While depicted as a single scrim, the scrim 2004 in actuality may be formed from two or more portions. The scrim 2004 is formed along a coupling perimeter of the planar upper 2000. A perimeter scrim may extend along any perimeter, such as an ankle collar, forefoot opening, and the like. A perimeter scrim may be continuous and/or discrete such that a bonding perimeter and/or a finished edge perimeter may be a common or discrete scrim.

The planar upper 2000 may be lasted and a strobel sock and/or board (sometimes referred to as a lasting board) may be joined with the planar upper 2000 to form a dimensional shoe. The joining may be accomplished through stitching (e.g., strobel stitch), adhesives, and/or other coupling techniques. The joining at a perimeter can expose the perimeter to concentrated tensile forces that may subject the upper material to tearing, ripping, or otherwise deforming when the base portion 2002 alone is used. As such, the scrim 2004 is effective to resist the negative results of joining along a perimeter, such as adding dimensional stability, greater tear resistance, and the like. The scrim 2004 may extend from the perimeter of the base portion 2002 to a point inside a biteline to prevent exposure of the scrim in a finished article. A biteline is a line formed at a transition between an upper and a sole.

Figure 20B:
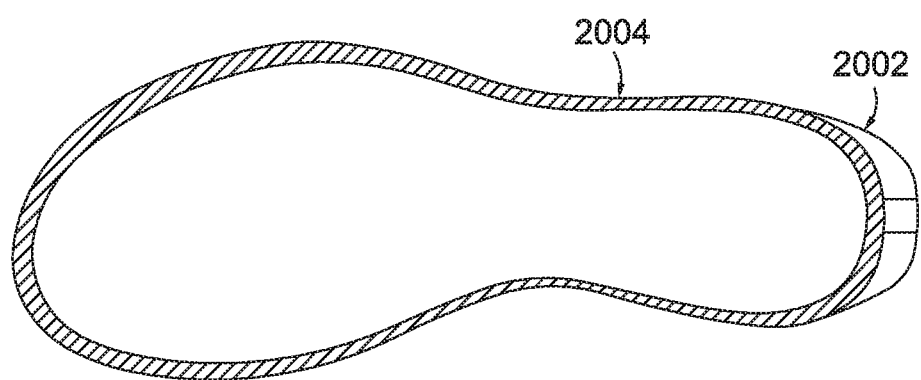
FIG. 20B depicts an article formed from the exemplary perimeter scrim of FIG. 20A, in accordance with aspects hereof.

FIG. 20B shows a bottom view of the planar upper 2002 having a strobel board joined at the perimeter. It is understood that a scrim may serve as a joining reinforcement alone or in combination with one or more other characteristics. For example, a discrete scrim may serve as a joining reinforcement or a scrim may include a portion for serving as a joining reinforcement.

Figure 21A:
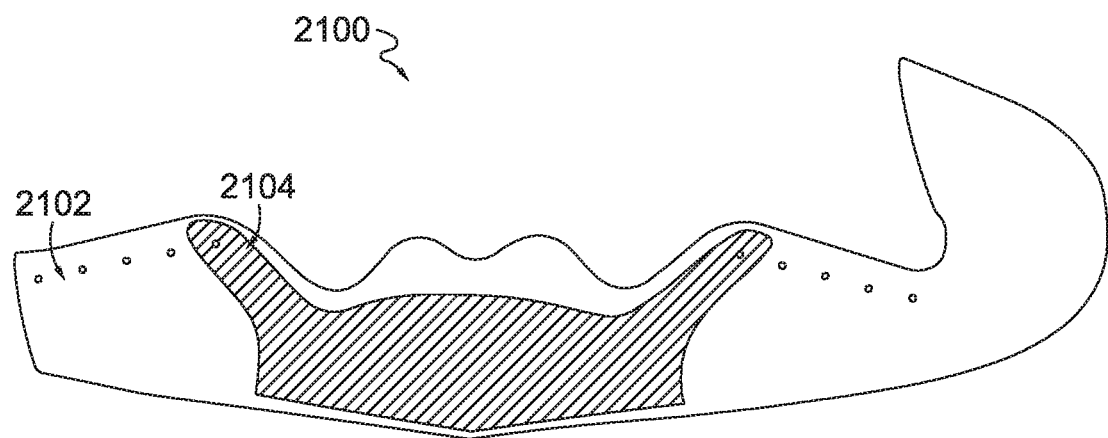
FIG. 21A depicts an exemplary heel-end scrim, in accordance with aspects hereof.
Figure 21B:
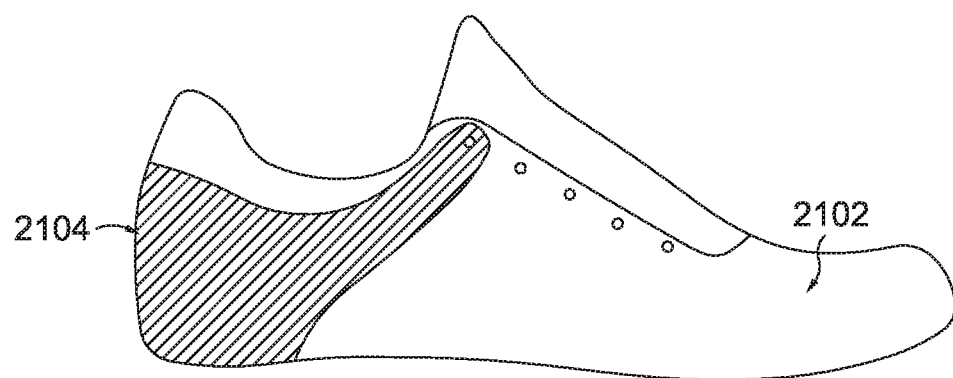
FIG. 21B depicts an article formed from the exemplary heel-end scrim of FIG. 21A, in accordance with aspects hereof.

FIG. 21A depicts a planar upper 2100 having a base portion 2102 and a scrim 2104, in accordance with aspects hereof. The scrim 2104 extends across a heel portion from both a medial side and a lateral side. The scrim 2104 also extends toward the throat to a first lace aperture on both of the medial and lateral sides in this example. The scrim 2104 may provide a transfer of tensile forces from the lace apertures heelwardly toward a sole portion to aid in securing the shoe to a wearer. The scrim 2104 also may provide rigidity and/or cushioning in the heel region. As provided herein, a scrim may provide one or more engineered characteristics provided herein. FIG. 21B depicts the planar upper 2100 in a formed dimensional configuration, in accordance with aspects hereof. FIG. 21B depicts a tongue portion not originally depicted in FIG. 21A. However, it is contemplated that the tongue portion may be formed as part of the planar upper 2100 of FIG. 21A or it may be formed separately and incorporated into the article of footwear.

Element Scrims

As previously set forth, a scrim is an element maintained in a relative position by one or more fiber layers as a fiber-bound element. FIGS. 22A through 25D explore element scrims, in accordance with aspects hereof. An element scrim, as provided above, may include one or more elements traditionally applied to a textile with a different coupling mechanism and the elements may have a functional purpose beyond the textile. Non-limiting examples of elements may include snaps, buttons, zippers, hook and loop structures, tubing, rings, grommets, electrical sensors, electrical transmission elements, fiber optics, bladders, tread/traction elements, and the like. Element scrims also may include elements that form a raised surface relief that provides a visually, cognitively, and/or tactilely perceived presence and/or absence of an entrapped or encased scrim. Element scrims that form a raised surface relief may not have a functional purpose beyond the textile and may be provided in whole or in part for the visual appearance they provide.

FIGS. 22A through 22E depict exemplary elements in various views and states of entanglement. FIG. 22A depicts a plan view of a collection of elements 2200, in accordance with aspects herein. The collection of elements 2200 includes an impervious generic element 2210, a second impervious generic element 2212, a snap with a flange 2214, a snap with a first entanglement flange 2216, a snap with a second entanglement flange 2218, an electrical element with an entanglement flange 2220, a first solid channel 2222, a second solid channel 2224, a first deformable channel 2226, a first hollow channel 2228, a second hollow channel 2230, and a D-ring 2232. It is understood this collection of elements 2200 is exemplary in nature and is not limiting.

Some of the elements may be merely encased within a fiber layer and others may be entangled with the fibers. As will be explained in greater detail below, the mere encasement may allow movement (e.g., rotation) of the element within the defined encasement volume. Additionally, as also will be explained in greater detail hereinafter, the merely encased elements easily may be removed from the entangled fiber layer to create a volume (e.g., a pocket, a channel, a window, or an opening) wherein the encased element was positioned during entanglement and prior to removal. The entangled elements may be securely fiber bound to at least a fiber layer (and also potentially to one or more scrims) to prevent movement of the element, such as rotational movement. The elements may be formed from any material or combination of materials, such as, without limitation, a polymer, metal, and/or organic material. The elements may be formed from any technique, such as molded, deposition-formed, reductions-formed, extruded, and the like. The elements may have any size, shape, or configuration.

The impervious generic element 2210 may be any element that is encased within a fiber layer. As best seen in FIG. 22E, a portion of an encasing fiber layer may be removed to expose the impervious generic element 2210. This is possible, in part, as the removed fibers from the fiber layer are not entangled with the impervious generic element 2210. Therefore, the impervious generic element 2210 may provide a mask, window, or other feature as will be described hereinafter. In aspects, a portion of the fibers forming the encasing fiber layer may be manually or forcibly parted or separated to expose a portion of the impervious generic element 2210. For instance, the impervious generic element 2210 may include a peaked or raised portion or other suitable protuberance that, upon forcible or manual separation of fibers, may be exposed.

The second impervious generic element 2212 is similar to the impervious generic element 2210, but as seen best in FIG. 22E, an aperture is formed through the fiber layer(s) and the second impervious generic element 2212 post-entanglement. Therefore, the second impervious generic element 2212 provides an example of post-processing that may be performed on a scrim to further engineer a fiber-bound engineered material. In aspects hereof, the second impervious generic element 2212 may provide a reinforcement, a lace aperture, or other purpose. The aperture formed through the second impervious generic element 2212 and the fiber layer(s) may be formed by, without limitation, a punch, a drill, a CNC machine, a laser, a water jet, cutting, slitting, dissolving, and the like.

The snap with a flange 2214, while called a "snap" may be a grommet or other ring-shaped element. The snap with a flange 2214 may be formed from an impervious material as depicted in FIG. 22C such that fibers from the fiber layers do not entangle with the snap with a flange 2214, but instead the fibers entangle with each other, fiber binding the snap with a flange 2214 in a volume to encase the snap with a flange 2214. As the snap with a flange 2214 has a symmetrical shape within the volume encasing the snap with a flange 2214 and the snap with a flange 2214 does not include entanglement structures, the snap with a flange 2214 may be free to rotate within the volume while still being secured to the fiber layer. A reciprocal snap element intended to mechanically engage the snap with a flange 2214 is also contemplated, but not depicted.

It is contemplated that a scrim, such as an element scrim, may be sufficiently encased within a fiber-bound layer to at least temporarily position and maintain the scrim. A subsequent operation, such as application of pressure, heat, adhesive, and the like, may be used to finally secure the entrapped scrim with the fiber layer. Stated differently, an entrapment and/or entanglement may be used as a temporary bonding process to maintain a position of a scrim and a subsequent process may be implemented to supplement the bonding to securely maintain the scrim relative to the fiber layer.

The snap with a first entanglement flange 2216 is similar to the snap with a flange 2214, but the flange portion includes a plurality of apertures through which fibers from the fiber layer(s) may extend. The fibers that extend through the apertures of the flange may prevent the rotational movement within a fiber volume provided by the snap with a flange 2214. Therefore, it is contemplated that an element may be adapted to be merely encased or entangled with fibers through one or more structural changes, such as an aperture through a flange in this example.

The snap with the second entanglement flange 2218 provides an alternative flange concept that may provide a different entanglement characteristic than the snap with a first entanglement flange 2216. The snap with a first entanglement flange 2216 and the snap with a second entanglement flange 2218 provide examples of how an entanglement characteristic with an element may be adjusted through a structural change of the element. For example, instead of apertures extending through an existing structure, the structure itself may be altered to enhance entanglement characteristics, as depicted by the snap with a second entanglement flange 2218. As such, it is contemplated that an entanglement structure may be co-produced or post-produced from similar or dissimilar materials to the scrim portion to which the entanglement structure is attached.

The electrical element with an entanglement flange 2220 represents any electrical component (e.g., sensor, light, integrated circuit, battery, or antenna) that may be fiber bound to an engineered material. While depicted with an entanglement flange, it is contemplated that the electrical elements may be merely encased and not entangled in some aspects. It is contemplated that one or more electrical conductors may extend to the electrical element with an entanglement flange 2220 (or any electrical element secured with fiber binding). The electrical conductors may be part of a scrim or independent elements that also are fiber bound by a fiber layer. For example, an electrical harness having a selection of components electrically coupled may be inserted as one or more scrims that are entangled with one or more fiber layers.

The first solid channel 2222 is similar in concept to the impervious generic element 2210; however, the first solid channel 2222 is contemplated to have an extended longitudinal length relative to a traverse cross-section measurement (e.g., a diameter). The first solid channel 2222 may represent a fiber optic, an electrically-conductive element or another impervious element.

The second solid channel 2224 is similar to the first solid channel 2222; however, as can be seen in FIG. 22E, the second solid channel 2224 may be removed to form a channel within the entangled fiber layer in the volume previously filled by the second solid channel 2224. Because the second solid channel 2224 is impervious, fibers do not entangle therewith and the second solid channel 2224 may be removed without significant damage to the entangled fiber layer.

The first deformable channel 2226 is contemplated to have an extended longitudinal length relative to a traverse cross-section measurement (e.g., a diameter) with a resilience that allows for temporary or permanent deformation in the traverse cross-section. The deformation is depicted in FIG. 22C. It is contemplated that the first deformable channel 2226 may provide an impact-attenuating ability or other cushioning function, in exemplary aspects.

The first hollow channel 2228 may be a tube-like structure having any traverse cross-sectional shape (e.g., round, ovoid, triangular, rectilinear, lobed, dogbone, or hollow). A tube-like structure may be effective to conduct a fluid, such as a liquid or a gas, or to maintain, foamable materials, flowable materials, expandable materials, or state-changing materials. Additionally a tube-like structure may serve as a conduit through which elements (e.g., fiber optics, micro fibers, or electrical components) may pass subsequent to entanglement. For example, elements that may not be suitable to be processed with entanglement (e.g., due to increased risk of breakage) still may be integrated into a fiber-bound engineered material by using the first hollow channel 2228 as a conduit.

The second hollow channel 2230 may be like the first hollow channel 2228; however, it may be relatively non-deformable in a cross-section, as seen in FIG. 22C.

The D-ring 2232 represents an element that may be encased but, leveraging rotational movement, may be repositioned, in part, from the exterior of the fiber layer, as seen in FIG. 22D. For example, the entire D-ring 2232 may be encased in the fiber layer, but a mask or trimming operation may free the curved portion leaving the linear portion encased. Subsequent to freeing the curved portion of the D-ring 2232, the curved portion may rotate about an axis defined by a longitudinal direction of the linear portion still encased. While a 'D' ring is depicted, it is contemplated that any ring or clasp may be fiber-bound. In an exemplary aspect, the clasp or ring may have a linear portion that can freely rotate while being encased. However, it is contemplated that a rotation may not be leveraged and a portion of fiber encasing the ring or clasp may be trimmed to allow at least a portion of the ring or clasp to be accessible beyond the fiber layer. Rotation may be inhibited or encouraged through structural design (e.g., non-symmetrical design or inclusion of entanglement structures) of the encased element and/or post-processing (e.g., application of energy, heat, pressure, or adhesive).

FIG. 22B depicts a cross-sectional view of the elements from FIG. 22A having a first fiber layer 2234 above and a second fiber layer 2236 below, in accordance with aspects hereof. While two fiber layers are depicted, it is contemplated that some elements may be sufficiently entangled with a single fiber layer. Those elements merely encased, however, may benefit from at least a second fiber layer to form an encasing fiber structure to be entangled, in an exemplary aspect. The cross-section also illustrates fibers entangled with elements, such as through the entanglement flanges of snaps 2216 and 2218.

FIG. 22C depicts the cross-sectional view of FIG. 22B subsequent to entangling the first fiber layer 2234 and the second fiber layer 2236, in accordance with aspects hereof. The entanglement fiber binds the elements. The entanglement results in the elements being at least partially encased and/or entangled with the fibers.

FIG. 22D depicts a plan view of some elements from FIG. 22C subsequent to having a trimming operation performed thereon, in accordance with aspects hereof. FIG. 22E depicts a cross-section along cut line 22E of FIG. 22D, in accordance with aspects hereof. As can be seen in the FIGS. 22D and 22E, a post-entanglement trimming operation can remove portions of fibers to expose one or more portions of the elements encased therein and/or entangled therewith. The trimming operation also may extract a portion of the element itself, such as for the second impervious generic element 2212. Also, it is contemplated that a post-entanglement element may be exposed, in part, to permit access, such as an element 2238. Further, an element may be extracted altogether leaving a fiber cavity in a void that was formed during entanglement around an element, as depicted by 2240.

It is contemplated that a fiber cavity may be filled with one or more materials. For example, a foamable material and/or a flowable material, such as a pellet or powder, may be inserted into the fiber cavity. The cavity may be sealed through further entanglement or other closure means with the foamable and/or flowable material contained therein. The foamable material may be foamed (e.g., triggered with heat or other catalyst) such that the fiber cavity fills with the foamable material. Other materials also are contemplated, such as a curable material (e.g., silicone) that may be inserted in a first state (e.g., liquid, dispersion, or paste) and form into another state (e.g., a resilient solid). The channel provides a vessel to contain the added materials, in an exemplary aspect. Additionally, a fiber cavity may serve as a channel through which a draw string or other cinchable element may extend. It is further contemplated that a locking element (e.g., a cord lock) may be fiber-bound in the material to maintain the draw string at a set tension. Further yet, it is contemplated that a low-friction surface coating may be applied or formed along the fiber-formed cavity/volume. The low-friction surface coating may be low friction relative to an untreated portion of the same fiber material. The low-friction characteristic may be in threading elements through the fiber volume or for moving items once within the fiber volume.

As previously set forth, fiber-encased elements include elements that form a raised surface relief. The raised surface relief provides a visually, cognitively and/or tactilely perceived presence and/or absence of entrapped scrims and scrim elements including transitions providing a distinctive signature "bound by fiber" appearance. One aspect of the signature appearance is that it alludes to an alternative manufacturing technology due to the lack of obvious traditional construction or attachment mechanisms, such as stitching or fused sheet plastic polymer films. Examples may include, without limitation, scrims and fibers (e.g., molded parts, foams, support cables, fusible fiber bundles, and textiles (such as those with openings)) having physical properties that create perceivable differentiations such as pattern, texture, color differentiation, Z-dimensional differentiation, density and/or other physical characteristic where the variabilities are detectable. In aspects, a scrim may be subjected to one or more or manufacturing processes (e.g., dyed, screen-printed, embroidered or the like) prior to fiber binding such that upon fiber binding, one or more visual properties of the scrim may become visible on a surface of a resultant manufactured article. For instance, a portion of a pre-processed scrim may extend through the fibers (e.g., creating a color differentiation) and/or may be encased or entrapped by the fibers (e.g., creating a raised surface relief of a desired shape or configuration).

Figure 27:
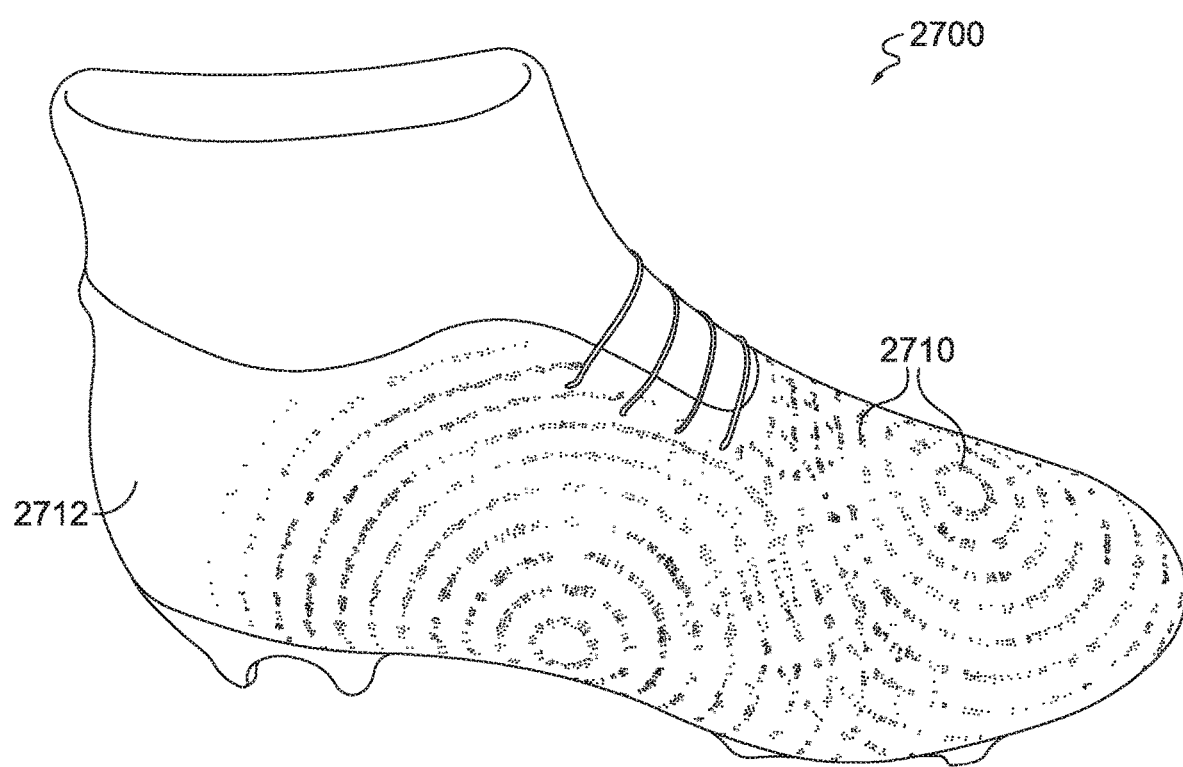
FIG. 27 depicts an embroidered scrim, the embroidery imparting a desired design to a manufactured footwear article, in accordance with aspects hereof.

FIG. 27 depicts an article of footwear 2700 formed utilizing a mesh scrim and a scrim having a pattern embroidered thereon with a high tenacity thread (which may be of any color or reflectivity, as desired). When fiber-bound, the embroidered pattern 2710 is visible at the surface of the manufactured article. In the article of FIG. 27, a separately applied skin layer 2712 also is applied on the surface of the fiber-bound article that will form the exterior-facing surface of the resultant manufactured article of footwear 2700.

Tactile features of fiber-bound encased elements in a shoe upper may include soft, lightweight, compliant, permeable and non-plasticy, relative to the appearance, heaviness and less compliant feel of elements traditionally bonded with adhesives or melt-bonded with sheet plastic polymer films.

The above phenomena may be observed or experienced where the entrapped elements have heightened visual, cognitive and/or tactile perceivability due to the change in surrounding media such as is produced by translucency/transparency and/or textural cues created by fibers, additives, treatments, polymer encasements, shape transformation (such as by bending or molding) and/or the addition of temporary or permanent light emitting elements within or beyond the structure that provide backlighting to reveal the internal layering of, and/or transitions between, entrapped scrim and fiber elements.

Turning now to FIG. 23A, depicted is a zipper 2300, in accordance with aspects hereof. The zipper 2300 is comprised of a first tape 2302 and a second tape 2304. A first plurality of teeth 2306 is coupled with the first tape 2302. A second plurality of teeth 2308 is coupled with the second tape 2304. While not depicted, it is contemplated that the zipper 2300 may be comprised of top stops, bottom stops, insert pin(s), box pin(s), and/or a retaining box, as is traditional for a zipper. A slider is included to engage and/or disengage the first plurality of teeth 2306 and the second plurality of teeth 2308. Optional apertures 2310 on the first tape 2302 and optional apertures 2312 on the second tape 2304 also are depicted. However, the apertures in connection with the tapes 2302, 2304 are exemplary in nature. They may be of any size, shape, order, position, sequence, or the like. In an alternative aspect, each tooth may have an integrally formed or joined entanglement structure that may allow for direct entanglement of a tooth without a tape-like structure. For example, each tooth (or a collection of teeth) may be formed (e.g., molded) with one or more entanglement structures. Therefore, the entanglement process is an effective process to maintain a set position of the one or more teeth with or without a supplemental tape. Additionally, in addition to or in the alternative of apertures extending through the tape, the tape itself may be an entanglement structure (e.g., a fiber-formed material susceptible to fiber entanglement).

In an exemplary aspect, the zipper 2300 is an element scrim that is fiber-bound to a fiber layer. Fibers of the fiber layer entangle with the first tape 2302 and the second tape 2304. The entanglement with the tape(s) 2302, 2304 may occur by puncturing the tape(s), such as through needle entanglement (barbed-needle entanglement or structured-needle entanglement), or through a modified tape (or integral entanglement structure) having one or more structures adapted to encourage entanglement. An example of entanglement structures includes the apertures 2310 and 2312. Alternative structures also are contemplated, such as non-linear edges on the tape (e.g., scalloped edges), slits, and/or flange portions, such as the flange elements depicted in FIG. 22A on the snap with the second entanglement flange 2218.

In an exemplary aspect, preventing fiber interactions with the first plurality of teeth 2306 and the second plurality of teeth 2308 may be attempted to prevent malfunction of the zipper 2300 caused by fiber interference. As such, and as depicted in FIG. 23B, one or more masks may be included with the zipper 2300 during entanglement. FIG. 23B depicts a cross-section of the zipper 2300 from FIG. 23A and a first fiber layer 2314 and a second fiber layer 2316 in accordance with aspects hereof. A first mask 2318 and a second mask 2320 are positioned between a fiber layer (2314 and 2316, respectively) and the zipper 2300 in locations where fiber entanglement is not intended to occur. A mask is an impervious (e.g., not prone to fiber entanglement) element that is temporarily (or permanently) included to prevent fibers from becoming entangled with an underlying element/scrim when entanglement occurs. A mask may be formed from any material, such as a polymer composition, metallic composition, or organic composition. In an exemplary aspect, a mask may be formed from a plastic sheet material and sized to correspond with a portion of the zipper 2300, primarily at the intersection of the first teeth 2306 and the second teeth 2308. The masks 2318, 2320 may extend along a longitudinal length of the zipper 2300. In exemplary aspects, it is contemplated that a mask may be removed or a mask may be fugitive (e.g., dissolvable or disintegrable). Additionally, in an aspect, it is contemplated that a mask may be maintained relative to a scrim and/or fiber layer subsequent to entanglement. For example, the mask may prevent fouling or other damage by fibers during actual use of the article, in an exemplary aspect.

Figure 23C:
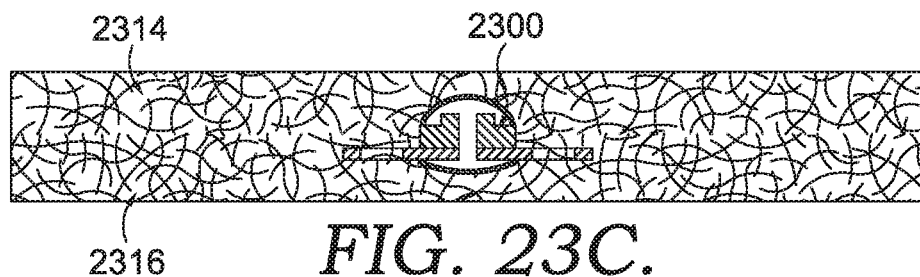
FIG. 23C depicts the exemplary assembly of FIG. 23B subsequent to initial entanglement of the first and second fiber layers, in accordance with aspects hereof.

FIG. 23C depicts that the first fiber layer 2314 and the second fiber layer 2316 are entangled fiber binding the zipper 2300 of FIG. 23B, in accordance with an aspect hereof. As can be seen, fibers from the first fiber layer 2314 and fibers from the second fiber layer 2316 extend through the apertures 2310, 2312 of the zipper tape to fiber bind the zipper 2300 with the fiber layers 2314, 2316. As also depicted, the masks 2318, 2320 prevent entanglement of fibers with the zipper 2300 teeth. Use of the masks 2318, 2320 allows for an entanglement process that may be uniformly applied rather than avoiding entanglement up to the teeth 2306, 2308.

Figure 23D:
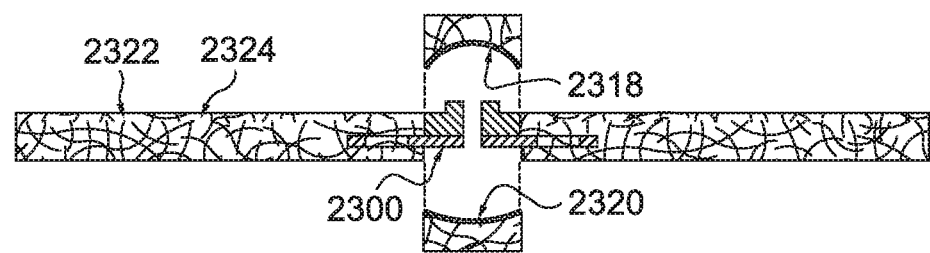
FIG. 23D depicts the exemplary assembly of FIG. 23C subsequent to full entanglement of the first and second fiber layers and performance of a trimming operation, in accordance with aspects hereof.

FIG. 23D depicts a trimming operation of the fibers subsequent to complete entanglement of the assembly from FIG. 23C, in accordance with aspects hereof. As can be seen, the first plurality of fibers 2322 and the second plurality of fibers 2324 are entangled and fiber bind the zipper 2300. It is contemplated that one or more fibers may entangle with the tape of the zipper 2300 and/or one or more fibers may entangle with other fibers of the fiber layers 2314, 2316 through one or more apertures or entanglement structures of the zipper 2300 (e.g., apertures 2310, 2312).

A material reduction/trimming operation, such as via a laser, water jet, knife, die, or the like then may be performed to remove fibers proximate one or more masks. In this example, a slit through the entangled fiber layer may be made along the mask 2318 to allow removal of the mask 2318 and access to the zipper 2300 for operation. Alternatively, a trimming operation may be performed to remove fibers overlaying the mask 2318, such as a cut along a perimeter of the mask 2318, as depicted in FIG. 23D. Removal of the fibers proximate the mask may reduce, in an exemplary aspect, unintentional interference with zipper operations by fibers of the entangled fiber layer. A similar operation may be performed on the second mask 2320.

A zipper may be incorporated into an article with a fiber-bound structure. For example, it is contemplated a zipper may be formed in a shoe upper as a closure mechanism. A fiber-bound zipper also may be formed into an article of apparel (e.g., shirt, shorts, pants, or bra). A fiber-bound zipper also may be incorporated into outerwear (e.g., jacket, glove, or hat). A fiber-bound zipper may be incorporated into equipment (e.g., protective gear). Fiber binding of a zipper reduces or eliminates stitching or other bonding mechanisms that may cause increased manufacturing costs and time. Also, fiber binding of a zipper allows for a seamless construction that provides an alternative feel to a wearer/user, a different distribution of forces to the article in which it is incorporated, and/or a different appearance.

Fiber binding also may serve as a tamper-proof construction. For example, a fiber-bound element having a mask (or no mask) may secure an item or a volume. The volume or void may remain verifiably sealed until the fiber is trimmed allowing access to the scrim, which may be a closure/opening element (e.g., zipper or hook-and-loop). Stated differently, delaying a trimming process provides functionalization proof for the fiber-bound element (e.g., proof that an element has not been adjusted, such as zipped or unzipped).

Figure 24A:
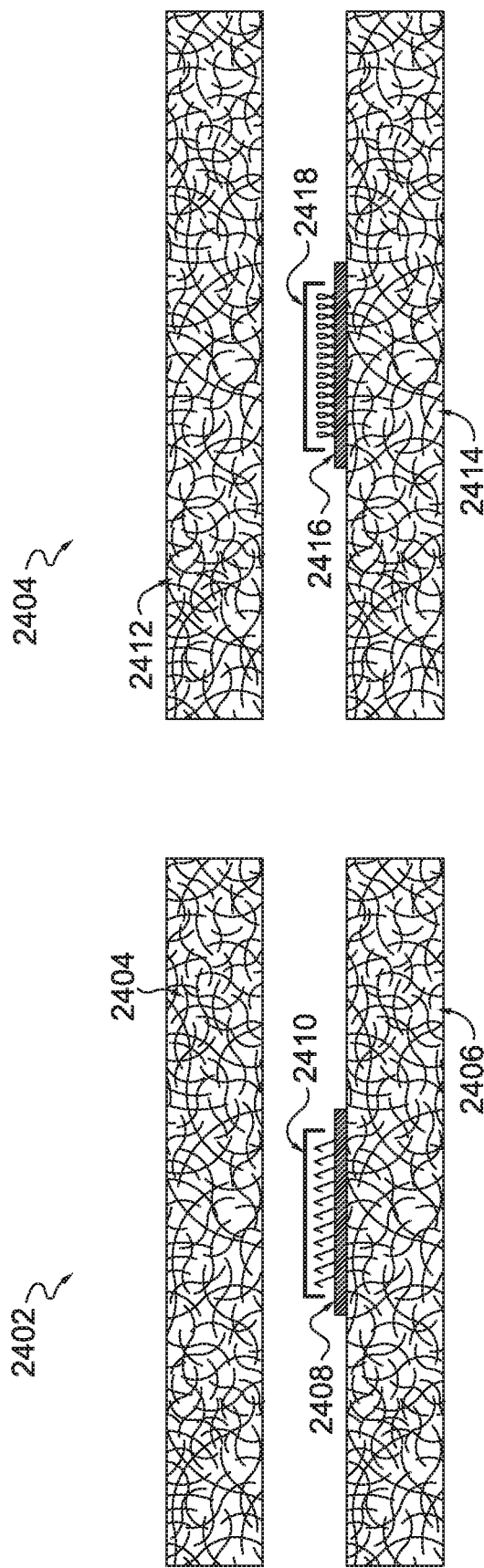
FIG. 24A depicts hook-and-loop elements positioned between respective first and second fiber layers, in accordance with aspects hereof.
Figure 24B:
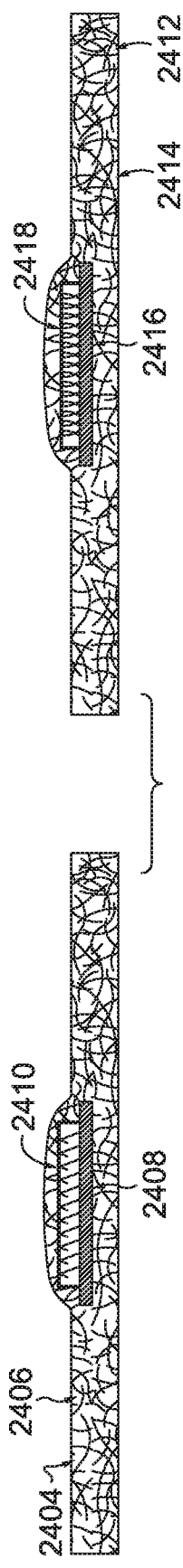
FIG. 24B depicts the exemplary assemblies of FIG. 24A subsequent to entanglement of the first and second fiber layers, in accordance with aspects hereof.
Figure 24C:
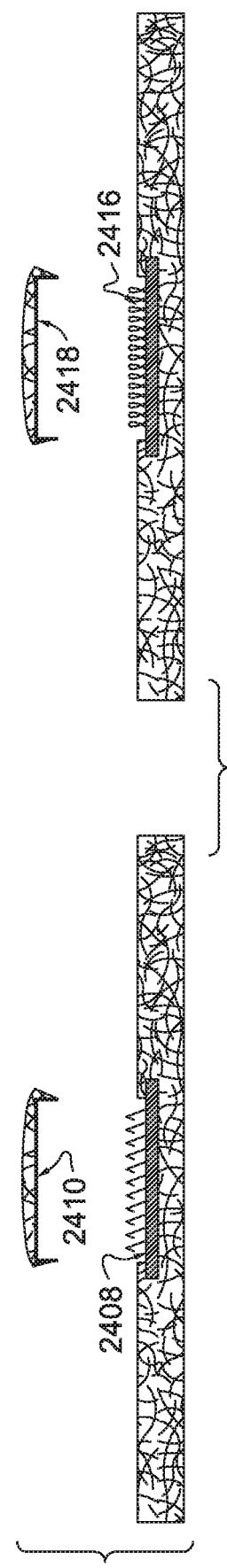
FIG. 24C depicts the assemblies of FIG. 24B having a trimming operation performed, in accordance with aspects hereof.

FIGS. 24A through 24C depict fiber-bound hook-and-loop fasteners as element scrims, in accordance with aspects hereof. While a hook-and-loop structure is depicted, it is contemplated that any fastener configuration (e.g., mushroom cap and receptacle) may be implemented. FIG. 24A depicts a hook assembly 2402 comprised of a hook fastener 2408 positioned between a first fiber layer 2404 and a second fiber layer 2406. A mask 2410 also is depicted masking the hooks of the hook fastener 2408. The mask 2410 limits entanglement of fibers from the first fiber layer 2404 with the hooks of the hook fastener 2408. A mask may be formed from an impervious material or technique that limits fiber penetration and/or entanglement below the mask, as previously described.

A loop assembly 2404 is also depicted in FIG. 24A. The loop assembly 2404 is comprised of a first fiber layer 2412, a second fiber layer 2414, and a loop fastener 2416. A mask 2418 also is depicted masking the loops of the loop fastener 2416. The hook fastener 2408 and the loop fastener 2416 are effective to cooperate to form a hook-and-loop fastening mechanism that can be engaged and disengaged to open and close a connected article, in an exemplary aspect.

FIG. 24B depicts entanglement of the first fiber layers and the second fiber layers of the respective hook assembly and loop assembly. As depicted, however, the mask 2410 and the mask 2418 limit entanglement of fibers with the hooks or loops of the respective assemblies. As previously described with respect to the zipper 2300 in FIG. 23A, it is contemplated that the hook fastener 2408 and/or the loop fastener 2416 may be modified to provide entanglement structures. For example, one or more apertures may be formed integrally with or through the elements in locations that will not be obscured by a mask, such as a perimeter. Additionally, it is contemplated that entanglement structures, such as non-linear edges, and additional structures may be incorporated with the hook fastener 2408 and/or the loop fastener 2416 to assist in achieving fiber binding of those elements to a fiber layer. It also is contemplated that mere encasement may be sufficient to maintain the hook fastener 2408 and/or the loop fastener 2416 in a defined position of a fiber material. Further, encasement may be used to temporarily maintain the elements until a post process (e.g., energy, heat, pressure, or adhesive) may be applied. It is contemplated that the elements, such as the hook assembly, may include a mask or an impervious backing/material to prevent fouling of the functional portion(s) of the elements. For example, fibers extending through a back portion of the hook assembly into the hooks may reduce the gripping ability of the hooks. Therefore, a mask or impervious material may be used relative to the element to prevent fiber entanglement that could limit functional intentions of the element.

FIG. 24C depicts a trimming operation of the assemblies from FIG. 24B, in accordance with aspects hereof. The hook fastener 2408 is fiber-bound even after trimming allows removal of the mask 2410 and associated fibers. This trimming operation exposes the hooks of the hook fastener 2408 for use as a hook-and-loop fastener. A trimming operation associated with the loop fastener 2416 allows for the removal of the mask 2418 and associated fibers. Once removed, the loops of the loop fastener 2416 are exposed to be effectively used as a hook-and-loop fastener.

It is contemplated that any size, shape, or type of hook and/or loop may be fiber-bound. A hook and/or loop assembly may be incorporated into an article with a fiber-bound structure. For example, it is contemplated a hook and/or loop assembly may be formed in a shoe upper as a closure mechanism. A fiber-bound hook and/or loop assembly also may be formed into an article of apparel (e.g., shirt, shorts, pants, or bra). A fiber-bound hook and/or loop assembly also may be incorporated into outerwear (e.g., jacket, glove, or hat). A fiber-bound hook and/or loop assembly also may be incorporated into equipment (e.g., protective gear). Fiber binding a hook and/or loop assembly reduces or eliminates stitching or other bonding mechanisms that may cause increased manufacturing costs and time. Also, fiber binding of a hook and/or loop assembly allows for a seamless construction that provides an alternative feel to a wearer/user, a different distribution of forces to the article in which it is incorporated, and/or a different appearance. An additional advantage of fiber binding a hook assembly is that, traditionally sewing of a hook assembly can result in thread being tangled and breaking during use as the hooks interact and move relative to the thread used to secure it by stitching. With fiber binding, a greater number of mechanical interactions (e.g., discrete fibers entangled) may be leveraged to secure the hook assembly (and/or loop assembly).

Figure 25A:
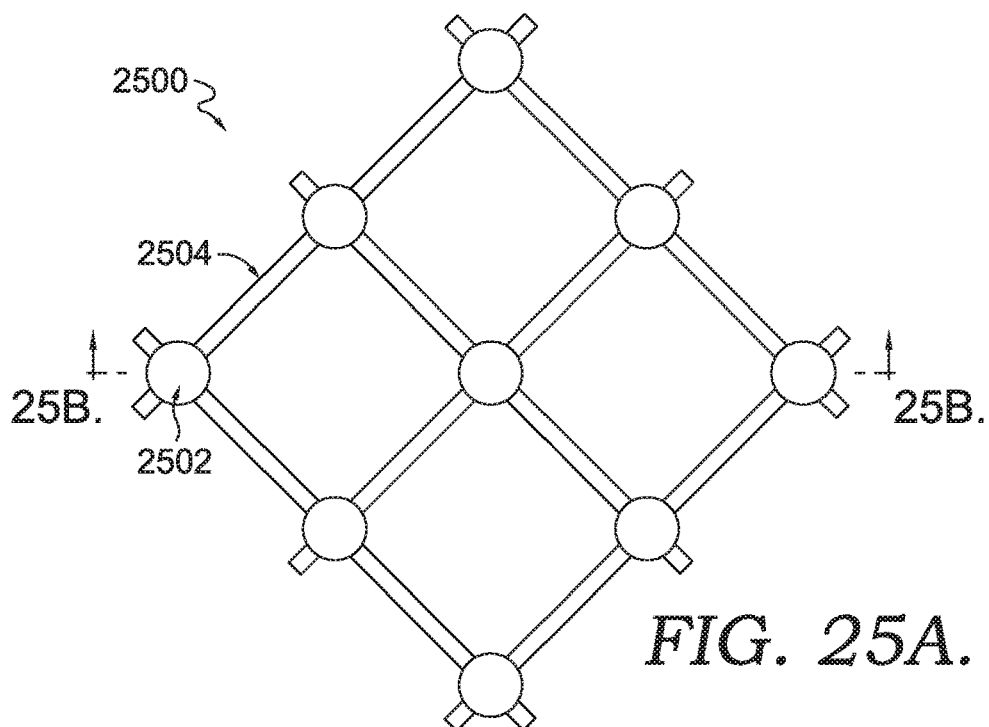
FIG. 25A depicts an exemplary dimensional-offset scrim, in accordance with aspects hereof.

FIGS. 25A through 25D depict a fiber-bound element that provides dimensional offsets, in accordance with aspects hereof. FIG. 25A depicts an exemplary dimensional offset element 2500, in accordance with aspects hereof. In a specific example, it is contemplated that a dimensional offset element may serve as a shoe outsole, protective padding element, and the like. The dimensional offset element 2500 is comprised of a plurality of protrusion elements 2502 and a lattice structure 2504. The lattice structure 2504 also may be referred to as a matrix that is two-dimensional and/or three-dimensional in structure. It is understood that the features of the dimensional offset element 2500 are merely exemplary in nature and are not limiting. It is contemplated that different sizes, shapes, and configurations may be implemented for those features. For example, when used as a footwear tread pattern, the dimensional offset element 2500 may have a varied pattern to accommodate different portions of the footwear (e.g., toe end, heel end, or midfoot). The plurality of protrusions 2502 may have different cross-sectional shapes and/or sizes. The plurality of protrusions 2502 may have variable offset heights (e.g., protrusion heights). The lattice structure 2504 may be nonlinear, variable in dimensions, and/or different in configuration (e.g., may have a gradient in sizing, gradient in spacing, traverse cross-section shape variations, longitudinal shape variations, wavy, or crimped).

The dimensional offset element 2500 may be formed from a variety of materials. In an exemplary aspect, the dimensional offset element 2500 is formed from a molded polymer, such as polyurethane, ethyl-vinyl acetate, silicone rubber, or the like. An exemplary material may be an elastomeric polymer. It is contemplated that the plurality of protrusions 2502 may be co-formed or independently formed from the lattice structure 2504. Also it is contemplated that the plurality of protrusions 2502 may be made from a different or similar material to the lattice structure 2504. Further, it is contemplated that the lattice structure 2504 may be omitted altogether and one or more of the plurality of protrusions 2502 may be a discrete element, in an exemplary aspect. When a protrusion of the plurality of protrusions 2502 is a discrete element, it is contemplated that a protrusion may have a flange or other entanglement structure as described throughout. Therefore, the lattice structure 2504 may be integral with and/or formed from the same material as one or more of the plurality of protrusions 2502 or the lattice structure 2504 may be separate and distinct from one or more of the plurality of protrusions 2502 as an entanglement structure.

Figure 25B:
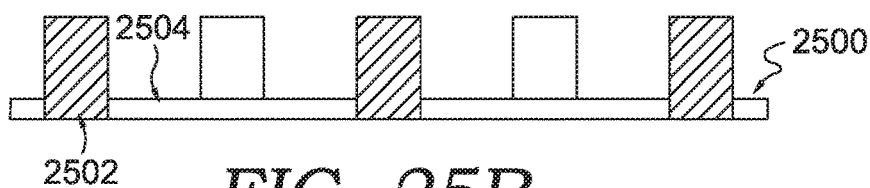
FIG. 25B depicts a cross-section of the exemplary dimensional-offset scrim of FIG. 25A, in accordance with aspects hereof.

FIG. 25B is a cross-sectional view along cutline 25B of FIG. 25A, in accordance with aspects hereof. As depicted, the plurality of protrusions 2502 extends from the lattice structure 2504 to extend a greater distance in the Z-direction (e.g., upwards in FIG. 25B). In an exemplary aspect, a fiber layer that fiber binds the dimensional offset element 2500 when entangled may have a Z-directional height from the lattice structure 2504 that is less than the plurality of protrusions 2502. Stated differently, the plurality of protrusions 2502 may extend beyond a fiber layer forming a fiber binding so that they are exposed and not covered/obscured by the fibers.

Figure 25C:
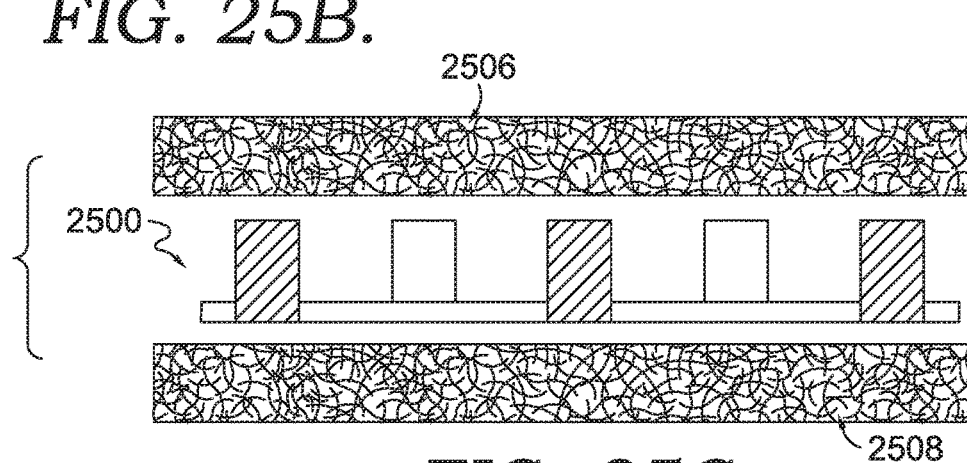
FIG. 25C depicts the cross-section of FIG. 25B positioned between first and second fiber layers, in accordance with aspects hereof.

FIG. 25C depicts the dimensional offset element 2500 of FIG. 25B with a first fiber layer 2506 and a second fiber layer 2508, in accordance with aspects hereof. As with other scrim and fiber layer combinations described herein, it is contemplated that one or more fibers in the first or second fiber layers 2506, 2508 may have variable characteristics. For example a low-melt polymer composition may form at least a portion of the fibers, such as fibers in the first fiber layer 2506. For example, it is contemplated that post entanglement, low-melt fibers may be exposed to energy causing a flowing or joining of fibers that results in a plate or sole structure through which the dimensional offset element 2500 protrudes to form traction elements. The formed plate or sole structure may have different permeability (e.g., air or water permeability), rigidity, flexibility, and/or abrasion resistance relative to non-melted fiber layers. It is further contemplated that one or more of the fibers may be able to join with one or more materials forming a dimensional offset element. For example, the fibers may bond with the dimensional offset through pressure, energy, chemicals, and/or other techniques.

Figure 25D:
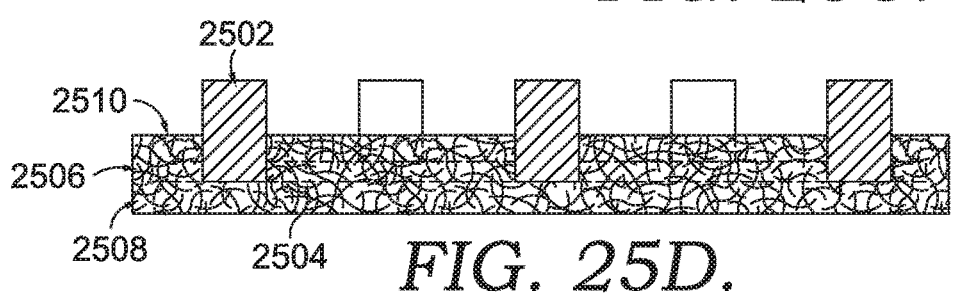
FIG. 25D depicts the assembly of FIG. 25C subsequent to entanglement of the first and second fiber layers, in accordance with aspects hereof.

FIG. 25D depicts the assembly of FIG. 25C subsequent to entanglement, in accordance with aspects hereof. The dimensional offset element 2500 is fiber-bound through the entanglement process by encasement of the lattice structure 2504. Additionally, it is contemplated that the dimensional offset element 2500 may include a fiber-based lattice structure that is entangled with one or more fibers from the fiber layer(s). It is further contemplated that one or more masks may be used to prevent entanglement of one or more portions of a dimensional offset element. Additionally or alternatively, masking may not be used as one or more portions may be formed from a fiber impervious material (e.g., firm polymer or rubber) that serves as a self-masking portion. Trimming operations also may be implemented in various aspects to expose or otherwise clear one or more fibers from a portion. As depicted, one or more of the plurality of protrusions 2502 extend beyond a fiber layer 2510 formed from the entanglement of the first fiber layer 2506 and the second fiber layer 2508. As a result, the dimensional offset element 2500 can provide dimensional offset from the entangled fiber layer, such as tread for a shoe, protective padding (e.g. elastomeric or foam), enhanced durability, breathability, reduced surface contact, and/or the like.

As explored with the element scrims above, masking is contemplated to be used in connection with any scrim. For example, it is contemplated that masking may be used with a scrim to prevent fiber entanglement with the scrim in one or more locations. When fibers from a fiber layer entangle with a scrim, the characteristics of the scrim may be altered. In some instances, the alteration of the scrim characteristics in a specific location may not be desired. Therefore, it is contemplated that a mask, such as a fiber impervious material (e.g., a polymer sheet) may be positioned between the scrim and the fiber layer. Subsequent to entanglement, a trimming process may be performed to remove the fibers adjacent the mask and the mask itself. The prevention of fiber entanglement at the location of the mask therefore may allow the original characteristics of the scrim to be maintained. Additionally, it is contemplated that a trimming operation and/or masking may be used to form windows where underlying engineering elements may be more visible or ascertainable as they are not being obscured by a fiber layer.

Self-masking, as previously described, is also contemplated. Self-masking contemplates a material and/or structure that alters an entanglement characteristic, such as prohibiting entanglement, restricting entanglement, and/or altering a location of entanglement. Examples include material selection of fiber impervious materials. Generally, hard or nonporous materials resist fiber entanglement. Another example of fiber impervious structures is those with an acute distal end. For example, conical or tapered structures can cause a splitting or separating of fibers around a portion of the structure during entanglement. The force applied during entanglement works to move the fibers around the structure as they entangle. Therefore, self-masking elements may be formed having a specific shape and/or material to limit the use of a separate mask while achieving a masking result, in an exemplary aspect.

Fiber binding also may be leveraged to bind a fiber material, such as a fiber-bound engineered material, to a dissimilar material at a perimeter of the fiber material. For example, a shoe upper may be formed by the fiber binding process provided herein. The shoe upper may then be secured to a sole, such as a foam sole, by entangling the fiber of the upper into and with the sole. For example, a needle may pressure-form one or more portions of the sole by pushing fibers from the fiber material into the sole. Fluid entanglement may alternatively be used to entangle a fiber layer with a sole structure (or any structure). Additionally, it is contemplated that the sole structure (or any structure for an article comprised of foam or other fiber-impervious or at least fiber-resistant material) includes an entanglement structure. For example, the sole (or any component) may be formed with a co-molded, co-formed, or post-processed attachment lattice. The lattice may be fiber-based or any entanglement structure/material provided herein. The entanglement structure serves as a fiber bonding interface for the component (e.g., sole) and one or more fiber layers, such as a fiber-bound engineered material.

Another advantage provided by fiber binding may include edge finishing. In traditional textiles, such as weft knit or woven, individual elements (e.g., yarns or strings) may unravel or fray. The unraveling of traditional materials may be prevented with edge finishes, such as seams, binders, and other techniques. The edge finishing techniques, however, may insert additional material, weight, cost, and processes. A fiber-bound engineered material is self-finishing. Because of the entanglement of a plurality of fibers, an edge formed during or as a result of a cutting operation on a fiber entanglement engineered material is self-finishing without additional materials. Further yet, it is contemplated that one or more reactive fibers may be included in the fiber layer that fuse or otherwise secure to other fibers at the edge to reinforce the self-finished edge. A fiber-bound engineered material is resistant to edge failures, such as unraveling. Further yet, fiber binding of materials susceptible to edge failures can stem those failures as well. For example, a scrim formed from a knit material if cut prior to the fiber entanglement may unravel along a cut. If, however, the knit material is fiber-bound prior to being cut, the fiber-bound knit scrim is resistant to edge failure. Therefore, cut edges of fiber-bound engineered materials may be resistant to edge failures and edge finishing techniques may be omitted.

Synthetic Leather

A fiber-bound engineered material as provided herein may be processed into synthetic leather that maintains the engineered characteristics while further being classified as engineered synthetic leather. This material that is highly efficient to manufacture and also has an infinite degree of custom engineering available, may replicate synthetic leather in an engineered material form. At least two types of synthetic leather may be formed from a fiber-bound engineered material.

A first type of synthetic leather engineered material includes a formed-fiber-bound engineered material, at least a portion of which is impregnated with a polymer, such as silicone or polyurethane, such that the polymer at least partially encases the fibers. If a scrim is present, the polymer may also coat and least partially encase the scrim as well. Stated differently, the polymer may fill interstitial volumes of the fiber-bound engineered material. The polymer coated material then may be treated to form a porous structure, such as with a solvent or a mechanical process. Additional processing may occur to form the fiber-bound engineered material into a synthetic (e.g., imitation) leather. For example, colorants, dyes, textures, top coats (e.g., polyurethanes, silicones, or ethylene-vinyl acetate), and the like may be applied at various stages to achieve a leather-like feel and appearance.

A second type of synthetic leather engineered material includes a formed-fiber-bound engineered material as provided herein wherein at least a portion of the fibers are protein-based fibers. Examples of protein-based fibers are cut, chopped, or ground animal materials such as hides, or protein-based materials which have been solubilized and re-formed into fibers. The protein-based fibers may form a composition also comprised of a low-melt polymer fiber, where the low-melt polymer fiber has a melt temperature or a softening temperature below a softening temperature or decomposition temperature of the protein-based fiber.

The composition comprised of the low-melt polymer fiber and the protein-based fiber may also include a base fiber. The base fiber is a fiber having a melt temperature, softening temperature, or decomposition temperature above the low-melt polymer fiber. The base fiber may be any material, such as a synthetic, organic, or metallic. This composition of materials may form, at least in part, the fiber layer used to construct a fiber-bound engineered material.

Prior to entanglement of the fiber layer having protein-based fibers, the low-melt fibers blended with the protein-based fibers may be melted to secure, at least temporarily, the protein-based fibers and the base fibers. The webbing formed with base fibers and protein-based fibers may then proceed to an entanglement process. It is contemplated in the above composition that the low-melt polymer may be a non-fiber form and/or a portion of a bi-component fiber with the base fiber. Also, it is contemplated that a temporary backing material may be applied to the fiber layer prior to entanglement. The backing material may aid in maintaining the protein-based fibers in connection with the base fibers during the entanglement process, in an exemplary aspect. In alternative aspects, it is contemplated that the backing material may be omitted and a scrim forming at least a portion of the fiber-bound engineered material serves to maintain the protein-based fibers in connection with the base fibers. The resulting fiber-bound engineered material having protein-based fibers may provide a material with the feel and look of leather, but with functional attributes of an engineered material.

Top coating of synthetic leather engineered materials also is contemplated. A top coating may include one or more polymeric materials. The polymeric material may be a thermoplastic material or a thermoset material. The polymeric material can include polyurethanes, polyesters, polyethers, polyamides, polyolefins including polypropylenes and polyethylenes, polycarbonates, polyacrylates including polyacrylonitriles, vinyl polymers including polyvinyl butyral (PVB) and ethylene vinyl acetate (EVA), aramids, any co-polymers thereof, and any combination thereof. The coating may be applied to a surface of the synthetic leather engineered material. The top coating may be applied in a zonal manner to provide another potential level of engineered materials. For example, a first material may be applied as a top coat to increase abrasion resistance in a desired location (e.g., toe end of a shoe). A second material may be applied in another location to achieve ultraviolet light resistance. Therefore, surface coatings may be used to achieve an engineered characteristic that has an intended function at an intended location.

A synthetic leather engineered material further may be processed to achieve different results. For example, processes may be performed to form suede leather. Regardless of which technique is utilized to form a synthetic leather from the fiber-bound engineered material, the resulting product may be implemented in a variety of articles as a substitute for traditional leather or monolithic (e.g., uniform) synthetic leather. Seams, bulk, and layers may be reduced with an engineered synthetic leather formed from a fiber-bound engineered material.

The synthetic leather may be further processed to achieve different results. For example processes may be performed to form suede leather.

Regardless of which technique of forming synthetic leather from the fiber-bound engineered material, the resulting product may be implemented in a variety of articles as a substitute for traditional leather or monolithic (e.g., uniform) synthetic leather. Seams, bulk, and layers may be reduced with an engineered synthetic leather formed from a fiber-bound engineered material.

Articles

While the present application provides for fiber-bound engineered materials generally, many examples are directed to an article of footwear. It is understood that the concepts introduced may be applied to a variety of articles in a variety of industries. For example, it is contemplated that the clothing and apparel industry may leverage fiber-bound engineered materials. For example, a bra may be formed using materials and techniques described herein to provide support, padding, integrated clasps, hooks, buckles, rings, adjusters, underwire, and/or supports, and to minimize bulk. Outerwear, such as a jacket, may be formed to have functional characteristics at intended locations (e.g., abrasion resistance from scrims at joints, water resistance from fusible fibers at the top of shoulders, breathability in chest and back portions from macro textures and/or exposed scrim elements, pockets created through zonal prohibition of entanglement and closure systems from fiber-bound element scrims like zippers and snaps). Within the upholstery industry, fiber-bound engineered materials may be leveraged to form integrated conduits of fluids or electrical elements to heat and/or cool and to provide abrasion resistance at upholstery edges through scrims or fiber selection. Thermal covering, such as a heated blanket, may be formed through one or more fiber-bound engineered materials. The medical and/or safety field may leverage fiber-bound engineered materials, for example, such that element scrims can position and maintain supportive elements, integral fastening mechanisms, sensors, and/or transmission materials relative to a patient (human or animal), such as integral to a splint, cast, cuff, belt, wrap, mask, or other. In the automotive, aerospace, and construction industries, fiber-bound engineered materials may be leveraged to form engineered components, such as laminates, composites, or other hybrid materials from fiber-bound engineered materials encased in polymers, like a resin. The sporting goods industry may leverage fiber-bound engineered materials for equipment, such as gloves, hats, masks, bats, sticks, handles, padding, and the like. As such, while specific examples are made throughout to footwear, it is understood that fiber-bound engineered materials may be implemented in a variety of industries and articles.

Manufacturing Systems

Formation of fiber-bound engineered materials may be done in an automated and/or manual environment. It is contemplated that a fiber-bound engineered material may be formed in a continuous manner starting at any point, but as early as fiber creation. For example, fibers may be formed, such as through extrusion, to be laid as a nonwoven batting layer. One or more scrim elements may be formed independently or inline. For example, an engineered knit scrim may be formed at an automated loom on a production line that converges with the line forming the fiber-bound engineered material. This convergence concept may be used for all elements incorporated into the fiber-bound engineered material. After the scrim has been positioned, either by human or a pick-and-place machine, an optional fiber layer may be placed over the assembly, as provided herein. The assembly may be conveyed to an entanglement machine, such as a hyrdoentanglement machine, that entangles the assembly into a fiber-bound engineered material. The fiber-bound engineered material then may pass through one or more manufacturing stations at which one or more post-processing operations may occur (e.g., cutting, trimming, energy application, molding, selective and/or strategic ablating, or tumbling). The fiber-bound engineered material then may enter into an article forming process, such as an automated shoe manufacturing process, to form a dimensional article (e.g., shoe) from the fiber-bound engineered material.

Throughout the process, it is contemplated that one or more computer-assisted machines may operate based on inputs and one or more instructions stored in computer readable memory, such as a non-transitory computer readable media. For example, it is contemplated that at least one vision system having a capture device, such as a CCD sensor, is capable of capturing data effective for identifying one or more features to determine an article size, type, orientation, and/or quality. The input from the vision system may be used by a computing device for controlling one or more devices, such as a pickup tool (e.g., vacuum, adhesion, or gripper), or a tool configured for one or more of a cutting, trimming, spraying, conveyance, stitching, bonding, cleaning, heating, molding, quality control, or blowing machine, and the like. For example, a fiber-bound engineered material may pass along a conveyor that is captured by a vision system. The vision system may capture an image of the fiber-bound engineered material. The image is processed by a computing device to determine a size, style, and orientation of the fiber-bound engineered material as a specific footwear upper. This information may spawn one or more instructions to be pulled from a data store to control a pickup tool. The pickup tool picks up the fiber-bound engineered material and places the fiber-bound engineered material at a defined position and orientation for subsequent processing. The subsequent processing may be a post-processing operation, such as a cutting, stitching, forming, bonding, cleaning, or a like process. At least one vision systems may be implemented throughout to ensure alignment, orientation, position, and/or quality.

It also is contemplated that during the formation of the fiber-bound engineered material, one or more automated or manual operations may be performed. For example, a vision system and a pickup tool may be used in combination to pick up and place one or more scrim(s) on a fiber layer. The one or more scrim(s) may be selected based on feedback from the vision system or other identification systems, such as an RFID system, optical scanner, laser scanner, and the like. The pickup tool also may determine a position or relative location of a fiber layer onto which the picked-up scrim is to be placed. A computing device may determine a tool path for the pickup tool to follow in order to pick up the scrim and to place the scrim on a fiber layer (or anywhere) such that an appropriate orientation and location are achieved.

Automated processing machines may be leveraged. For example, a computer controlled cutting machine that leverages dies, lasers, water jets, blades, and the like may cut one or more portions from the fiber-bound engineered material. As previously described, the fiber-bound engineered material may have a self-finishing edge that allows for such an operation to occur without preventative measures taken to limit fraying or raveling. In this example, a vision system may determine a location at which the fiber-bound engineered material is positioned relative to the cutting tool. This information then may be provided to a computing device such that a known tool path may be adjusted to compensate for the determined position/orientation of the fiber-bound engineered material. A similar process may be leveraged for other operations to be performed on the fiber-bound engineered material.

With manufacturing, it is contemplated that a customized article may be formed. For example, a consumer may select specific attributes (e.g., size, color, fit, or function) that are specific to the consumer. A unique fiber-bound engineered material may be manufactured in response. This could allow for customized orders, parts, and articles. This also allows for just-in-time manufacturing of a fiber-bound engineered material that is specific to a consumer's selections.

Post Processing

A fiber-bound engineered material may be post processed. Post processing may further supplement engineering aspects of the materials, such as zonal application of post processing. Post processing may include, but is not limited to, tumbling, sheering, abrading (which may be selective and/or strategic to create areas that are thinner or more translucent than other areas), puckering, flocking, molding, and energy application. Each of these post-processing techniques may adjust a state of one or more materials used to form the engineered material. For example, a surface appearance/texture may be manipulated through a post-processing technique. Texture, feel, appearance, flexibility, and response may all be adjusted through post processing.

By way of example, FIG. 28 depicts an article of footwear formed from a mesh scrim 2810, as well as a laser or die-cut film scrim 2812. The outer layer of fibers utilized to form the article enjoys a lower melting point than the scrim materials and has been melted post-entanglement to form a transparent skin on the exterior of the upper.

Post processing may additionally include assembling a fiber-bound component with one or more additional components to be included in the resultant manufactured article. For instance, FIG. 26 illustrates an exemplary article of footwear 2600 formed, at least in part, by fiber-binding particulates in a desired pattern 2610 between two fiber layers. The fiber-bound portion of the footwear article (i.e., the upper 2612) is sewn to a knit component (i.e., the collar 2614) to form the resultant article 2600.

Materials

As mentioned above for the various components, examples of suitable polymers for the fibers, scrim, and the like can include one or more polyesters, one or more polyamides, one or more polyurethanes, one or more polyolefins, copolymers thereof, and blends thereof.

In one aspect, the fiber/scrim compositionally includes a one or more polyesters. The polyester(s) can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof).

The polyester(s) also can be derived from polycarbonate prepolymers, such as poly(hexamethylene carbonate) glycol, poly(propylene carbonate) glycol, poly(tetramethylene carbonate)glycol, and poly(nonanemethylene carbonate) glycol. Suitable polyesters can include, by way of example and not limitation, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly(nonanemethylene carbonate), and combinations thereof.

In another aspect, the fiber/scrim compositionally includes one or more polyamides (nylons). In some embodiments, the polyamide(s) can be derived from the condensation of polyamide prepolymers, such as lactams, amino acids, and/or diamino compounds with dicarboxylic acids, or activated forms thereof. The resulting polyamide includes amide linkages (—(CO)NH—). Examples of suitable polyamides include, without limitation, polycarpolactum (PA6), polyhexamethyleneaidpamide (PA6,6), polyhexamethylenenonamide (PA6,9), polyhexamethylenesebacamide (PA6,10), polyamide 6/12 (PA6,12), polyenantholactum (PA7), polyundecanolactum (PA11), polylaurolactam (PA12), and combinations thereof. In further embodiments, the polyamide(s) may include one or more thermoplastic polyamide copolymers, such as those under the tradename "PEBAX" from Arkema, Inc., Clear Lake, Tex.; and "SERENE" coating from Sumedics, Eden Prairie, Minn.

In another aspect, the fiber/scrim compositionally includes one or more polyurethanes, each having one or more polyurethane copolymer chains (e.g. thermoplastic polyurethanes, thermoset polyurethanes, ionomeric polyurethane elastomers, and the like). In some embodiments, at least a portion of the polyurethane copolymer chains each include a plurality of hard segments forming crystalline regions with other hard segments of the polyurethane copolymer chains, and a plurality of soft segments covalently bonded to the hard segments.

The polyurethane can be produced by polymerizing one or more isocyanates with one or more polyols to produce copolymer chains having carbamate linkages (—N(CO)O—), where the isocyanate(s) each preferably include two or more isocyanate (—NCO) groups per molecule, such as 2, 3, or 4 isocyanate groups per molecule (although, single-functional isocyanates can also be optionally included, e.g., as chain terminating units).

Examples of suitable aliphatic diisocyanates for producing the polyurethane copolymer chains include hexamethylene diisocyanate (HDI), isophorone diisocyanate (IPDI), butylene diisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

Examples of suitable aromatic diisocyanates for producing the polyurethane copolymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups. In some preferred embodiments, the polyurethane copolymer chains are produced from diisocynates including HMDI, TDI, MDI, $H_{12}$ aliphatics, and combinations thereof.

Examples of suitable chain extender polyols for producing the polyurethane copolymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis(2-hydroxyethyl) ethers of hydroquinone and resorcinol, xylene-α,α-diols, bis(2-hydroxyethyl) ethers of xylene-α,α-diols, and combinations thereof.

Examples of suitable soft segment polyols include polyethers, polyesters, polycarbonates, and combinations thereof. Examples of suitable polyethers include, but are not limited to polyethylene oxide (PEO), polypropylene oxide (PPO), polytetrahydrofuran (PTHF), polytetramethylene oxide (PTMO), and combinations thereof. Examples of suitable polyesters include those described above. Examples of suitable polycarbonates can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate. The soft segment polyols can be present in an amount of 5% to 85% by weight, from 5% to 70% by weight, or from 10% to 50% by weight, based on the total weight of the reactant monomers.

In another aspect, the fiber/scrim compositionally includes one or more polyolefins, which can be formed through free radical, cationic, and/or anionic polymerization. Examples of suitable polyolefins include polyethylene, polypropylene, polybutylene, copolymers thereof, and blends thereof. The processes and articles described herein are particularly suitable for use with polymers with limited chemical or reptation bonding capabilities (e.g., polyolefins, which are traditionally difficult to bond well to other polymers such as polyurethanes and polyamides).

As used herein, the term "polymer" refers to a molecule having polymerized units of one or more species of monomer. The term "polymer" is understood to include both homopolymers and copolymers. The term "copolymer" refers to a polymer having polymerized units of two or more species of monomers, and is understood to include terpolymers. As used herein, reference to "a" polymer or other chemical compound refers one or more molecules of the polymer or chemical compound, rather than being limited to a single molecule of the polymer or chemical compound. Furthermore, the one or more molecules may or may not be identical, so long as they fall under the category of the chemical compound. Thus, for example, "a" polylaurolactam is interpreted to include one or more polymer molecules of the polylaurolactam, where the polymer molecules may or may not be identical (e.g., different molecular weights and/or isomers).

An abbreviated listing of non-limiting materials contemplated to form at least a portion of fibers, fiber layers, scrims, scrim elements, and other elements provided herein includes the following: vegetatively-derived (based on cellulose or lignin) materials (e.g., plant-based, algae-based, or microbe-based materials), such as cotton, hemp, jute, flax, ramie, sisal, bagasse, or banana; wood-derived materials, such as groundwood, lacebark, thermomechanical pulp, bleached or unbleached kraft or sulfite pulp; animal-derived materials, such as silkworm silk, spider silk, sinew, catgut, wool, sea silk, hair (cashmere wool, mohair, angora), and fur; and mineral-derived materials, such as asbestos. Materials may also be biological derived fibrous proteins or protein filaments.

Another abbreviated listing of non-limiting materials contemplated to form at least a portion of fibers, fiber layers, scrims, scrim elements, and other elements provided herein includes the following: regenerated natural materials such as regenerated cellulose (Tencel, Rayon, Modal, bamboo fiber, seacell fiber, cellulose diacetate, and cellulose triacetate); collagen or peptide-based materials; fibers derived from processed animal products such as processed animal hides (e.g., leather); metallic materials; carbon fiber; silicon carbide fiber; fiberglass; and mineral fibers.

Yet another abbreviated listing of non-limiting materials contemplated to form at least a portion of fibers, fiber layers, scrims, scrim elements, and other elements provided herein includes the following: synthetic polymers, polyesters (e.g., PET, PBT, and PTT), polyamides (nylon), polyolefins (e.g., polyethylene, polypropylene and polybutylene and UHMPE), polyurethanes, thermoplastic polyurethanes, polycarbonates, aromatic polyamids (aramids), phenol-formaldehyde (PF), polyvinyl chloride (PVC) fiber, acrylic polyesters, liquid crystalline polymers, copolymers of two or more of the above polymers, mixtures of two or more of the above polymers, and fiber-reinforced polymers (e.g., fiberglass).

Individual elements can be made from polymeric materials comprising or consisting essentially of one or more of the above polymers.

Individual elements can be made from two or more different polymeric materials (i.e., not just as mixtures, but as separate components of a multi-component fiber, such as configured in the form of segmented pie, islands in the sea, sheath/core format, etc.).

Carrier Screens

As previously described, fiber binding is a process in which fibers from one or more fiber layers are entangled to form a complex composite material that is engineered for an article. The one or more fiber layers serve as a platform and a binder onto which additional materials are secured to build a unique hybrid composite material that is consolidated into a single material through entanglement. The entanglement causes the fibers of the one or more fiber layers to physically interact with and lock in the materials to create a cohesive and complete material that can be formed into an article. The materials added to the fiber layer(s) and the materials forming the fiber layer(s) can be deliberately and/or strategically placed to achieve an intended functional characteristic at an intended relative location that allows for a highly engineered material to be formed as a complex composite that is consolidated into a single material through entanglement.

Formation of fiber-bound engineered materials may be performed in an automated and/or manual environment. In aspects, formation of fiber-bound engineered materials may be performed utilizing carrier screens. Carrier screens have a mesh-like construction which includes a plurality of apertures. In some examples, the apertures are formed between the intersections of a plurality of linear elements such as filaments, yarns, cords, or wires. The linear elements can take the form of vertical elements and a plurality of horizontal elements. In other examples, the apertures are formed in a film or sheet. As such, carrier screens provide a permeable platform onto which one or more fiber layers and/or scrims may be placed during fiber-bound engineered material formation. Carrier screens further may provide a mechanism for holding fibers forming one or more fiber layers and/or scrims in place during processing. By way of example, in conveyor manufacturing of fiber-bound engineered materials, carrier screens may be provided on a first surface of the input materials (fiber layer(s) and/or scrim(s)) to act as a conveyor belt onto which such materials may be placed. Optionally, on an opposite surface of the input materials, a second carrier screen may be placed to maintain the materials in the desired position for processing. Stated differently, the input materials may be positioned on one carrier screen, or sandwiched between two or more carrier screens such that the materials are positionally maintained prior to and during entanglement. In this way, carrier screens provide a permeable platform, and additionally may provide a permeable material-holding mechanism, such that fluid (e.g., water) may pass through the carrier screen(s) and entangle the fiber layer(s) and/or scrim(s) with one another to form a fiber-bound engineered material.

Formation of fiber-bound engineered materials utilizing carrier screens can be advantageous in a variety of manufacturing scenarios. For instance, use of carrier screens is advantageous for aligning and registering fiber layer(s) and/or scrim(s), including dimensionally small or delicate material inputs and masks that are difficult to feed into an entangling device in other ways without losing proper alignment and registration, or desired shape dimensions. Additionally, carrier screens are advantageous for holding shaped fiber pieces in place for processing that, post-entanglement, will form stabilizing border sections adjacent to exposed scrim sections (that is, sections of a scrim that are exposed without additional fiber binding in order to create zones of, for example, enhanced breathability, elasticity, and/or drape in, e.g., articles of apparel or footwear). Further, carrier screens are advantageous to keep small material inputs such as loose fibers or masks in place and protected during processing. Use of carrier screens in the formation of fiber-bound engineered materials also may impart a surface texture onto the output fiber-bound material. For instance, if a screen includes a first portion having a first texture and a second portion having a second texture on the same side thereof, if a screen includes a different screen texture on opposing sides thereof, or if a screen includes any combination of varying textures on one or both sides thereof, multiple different textures may be imparted onto the output fiber-bound material. Similarly, if two carrier screens are utilized on opposing surfaces of the material inputs, an output fiber-bound engineered material may be produced having a different texture on each surface thereof. Still further, carrier-screen-mediated entanglement allows manufacture of fiber-bound components to near-net-shape which permits the substantial reduction of scrap waste resulting from post-processing trimming operations. In screen-less entangling, for instance, where continuous fiber and scrim rolls themselves are utilized to advance the material inputs through the entangler, the resultant fiber-bound components often need to be cut from a full roll width, with unneeded sections being discarded, creating additional waste and expense.

Suitable carrier screens may be comprised of any material that is robust enough to withstand use under pressures exerted by hydroentangling fluid streams. (It should be noted that although the term "hydroentangling" or "hydroentanglement" are utilized throughout the present description, fluid entanglement utilizing any suitable fluid is contemplated. Use of these terms is not intended to limit the scope of aspects of the present application to fluid entanglement utilizing water.) By way of example, a mesh textile, for instance one formed from synthetic polymeric fibers such as yarns including monofilament yarns or coated fiberglass filaments, such as is used for window screens, may be utilized as a carrier screen, as may polymer extrusions, films, or cut netting. Carrier screens further may be comprised of a woven metal linear element mesh, e.g., aluminum wire mesh, bronze wire mesh, or a multiple-material wire composition mesh (e.g., a copper/zinc composition wire mesh), such as is often used for window screens. Perforated films or sheets, such as perforated extruded polymeric films and expanded perforated metal sheets can also be used as carrier screens. Suitable carrier screens may be dimensionally stable during use, while at the same time being flexible enough to move through the required geometries of the fiber-binding processing stages. Additionally, suitable carrier screens may conform enough to match the surface profile of the materials being entangled both before and after entanglement. Suitable carrier screens may be easily separated from, and removable from, the entangled materials that are transported and/or supported. That is, suitable carrier screens may not permanently entangle with the materials that are being carried and/or supported, or may permanently entangle with only a portion or zone of the materials that are being carried and/or supported. In some examples, suitable carrier screens may have little to no elongation in the length or width directions and/or may undergo no permanent deformation as a result of passing through the stations of the hydroentangler. Accordingly, aspects of the present application contemplate woven, knit, braided, or stamped perforated constructions for carrier screens. Suitable carrier screens may be reusable (as is useful to reduce waste) or single use.

As previously set forth, carrier screens described herein have a mesh-like construction which includes a plurality of apertures formed between the intersections of a plurality of vertical linear elements and a plurality of horizontal linear elements forming a mesh-like construction. The size of the apertures in a carrier screen typically is stated as a quantity of apertures across a one-inch square portion of the carrier screen (warp apertures) and a quantity of apertures down the same one-inch square portion of the carrier screen (fill apertures). For instance, in aspects hereof, suitable carrier screens may include, by way of example only, 15×10 (indicating 15 warp apertures and 10 fill apertures in a one-inch square portion of the screen), 18×16 (indicating 18 warp apertures and 16 fill apertures in a one-inch square portion of the screen), 20×20 (indicating 20 warp apertures and 10 fill apertures in a one-inch square portion of the screen), 17×20 (indicating 17 warp apertures and 20 fill apertures in a one-inch square portion of the screen); 18×14 (indicating 18 warp apertures and 14 fill apertures, or 20×30 (indicating 20 warp apertures and 30 fill apertures in a one-inch square portion of the screen). Stated more generally, in aspects, suitable carrier screens may include a quantity of warp apertures between 14 and 20. In further aspects, suitable carrier screens may include a quantity of warp apertures between 16 and 20. In aspects, suitable carrier screens may include a quantity of fill apertures between 14 and 30. In further aspects, suitable carrier screens may include a quantity of fill apertures between 16 and 20. While exemplary ranges are provided herein, it is understood that any suitable number of warp and fill apertures may be utilized within aspects of the present application.

In addition to the number of apertures per square inch, the size of the apertures in a carrier screen may be altered by the diameter of the linear element utilized to form the carrier screen. The larger the diameter of the linear element, the smaller the apertures in the resultant carrier screen (assuming the same number of warp and fill apertures). Exemplary linear element diameters include, by way of example only, 0.005 mm to 0.03 mm. Further exemplary linear element diameters include, by way of example only, 0.01 mm to 0.025 mm Still further exemplary linear element diameters include, by way of example only, 0.01 mm to 0.02 mm. While exemplary diameter ranges are provided herein, it is understood that any suitable linear element diameter may be utilized within aspects of the present application.

As the carrier screens described herein have a mesh-like construction which includes a plurality of apertures penetrating the entire depth of the carrier screen, contemplated carrier screens are permeable to fluids, including liquids. For use in hydroentangling, suitable carrier screens include apertures which provide the liquid with a substantially straight path from a first side of the carrier screen to a second side of the carrier screen, allowing the liquid to move into, through, and out the other side thereof while retaining a pressure sufficient to entangle the fibers located on the screen(s). In other words, suitable carrier screens include apertures of sufficient number and size to allow fluids to act with the force required to entangle the input materials and form a fiber-bound engineered material. If splitting of microfibers also is required, suitable carrier screens have apertures of sufficient number and size to allow the pressure of the fluid jets to separate the fiber segments.

Aspects hereof contemplate that sections of a carrier screen may be solid (i.e., without apertures), for instance in a predetermined pattern or design, such that the solid sections provide a masking effect in relation to the materials being processed. Use of a carrier screen having strategically situated sections that are variably solid and permeable may create sections of entangled and non-entangled materials in the resulting fiber-bound engineered materials. Additionally or alternatively, a first section of a carrier screen may include apertures which differ in size or number as compared to a second section of the carrier screen. These first and second sections can be present in a predetermined pattern or design. Use of a carrier screen having strategically situated first and second sections may create sections of first and second entangled materials in the resulting fiber-bound engineered materials, wherein the first and second sections have differing levels of entanglement or density. In certain aspects hereof, first and second sections may have differing levels of entanglement or density that differs by at least 10%, each of the first and second sections having a surface area of at least 0.25 $cm^2$.

Figure 32:
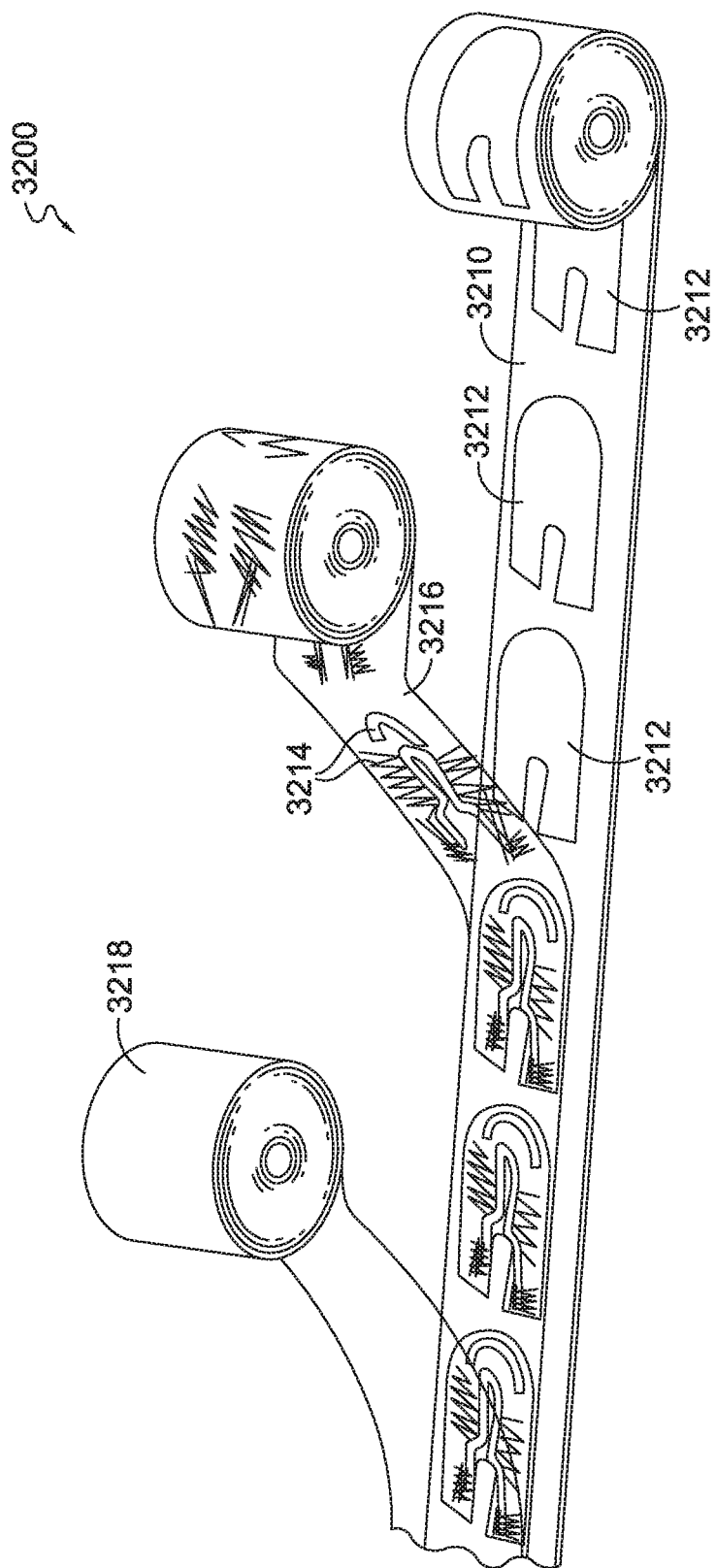
FIG. 32 depicts a configuration for manufacturing fiber-bound engineered materials utilizing individual pre-sized, cut fiber layers, in accordance with aspects hereof.

With reference to FIG. 32, an exemplary conveyor-type configuration 3200 for forming fiber-bound engineered materials utilizing carrier screens is illustrated. The configuration 3200 includes a fluid-permeable first carrier screen 3210. The illustrated first carrier screen 3210 acts as a carrier for the input materials prior to and during processing. The configuration 3200 includes a first fiber layer 3212 comprising a first plurality of fibers. The first plurality of fibers may be homogenous or heterogeneous, and may be formed as a nonwoven material that is sometimes referred to as batting. Batting may be formed from a single stratum of fibers or a plurality of strata of fibers. Each stratum may have a different or a similar composition of fibers. Batting may be formed as a continuous material (e.g., a rolled good) or it may be formed as a discrete element (e.g., batch goods). As illustrated, the first fiber layer 3212 is comprised of a plurality of pre-sized, cut fiber batting pieces that may be manually or automatically placed on the first carrier screen 3210. Once the first fiber layer 3212 is in place, scrims and other desired elements (e.g., textiles, cables, elements formed of thermoplastic materials, foams, shaped polymeric or metal components, and the like) 3214 are placed (automatically or manually) on (or adjacent and overlapping in a Z-directional placement) the first fiber layer 3212. In the illustrated configuration 3200, the scrims and other desired elements 3214 are illustrated on a roll (which may include a fugitive backing 3216 that is dissolved or otherwise removed during processing). For example, the fugitive backing 3216 may be formed of a water-soluble polymeric material, such as a polymeric material comprising water-soluble polyvinyl alcohol. Though not illustrated in FIG. 32, aspects hereof contemplate individually placed scrims and/or other desired elements as well.

On top of the scrims and other desired elements 3214 (or adjacent and overlapping in a Z-directional placement), an optional second fiber layer may be placed. The illustrated configuration 3200 does not include a second fiber layer but such configuration is described more fully below with reference to FIG. 33. When present, the second fiber layer may be manually or automatically placed on the scrims and other desired elements 3214. In aspects, a fluid-permeable second carrier screen 3218 then may be placed on the scrim or other desired elements 3214 (or on the second fiber layer, when present). The second carrier screen 3218, in cooperation with the first carrier screen 3210, holds the input materials (fiber layer(s), scrims and other desired elements) in place and under tension. The material input/carrier screen assembly may be conveyed to an entanglement machine, such as a hydroentanglement machine, that entangles the assembly into a fiber-bound engineered material.

In aspects, subsequent to entanglement, the first and second carrier screens 3210, 3220 may be removed and a fiber-bound, engineered material may be output. In such aspects, the fiber-bound engineered material then may pass through one or more manufacturing stations at which one or more post-processing operations may occur (e.g., cutting, trimming, energy application, application of colorants, dyes and finishes, application of impregnation polymers, molding, or tumbling). In alternative aspects, the first and second carrier screens 3210, 3220 may be maintained in place after entanglement and the fiber-bound, engineered material may be transported through one or more post-processing stations (for instance, for application of thermal energy (e.g., for drying), addition of colorants, dyes and/or finishes, or for the application of impregnation fibers). Subsequent to such post-processing operations, the fiber-bound engineered material may enter into an article forming process, such as an automated shoe manufacturing process, to form a dimensional article (e.g., shoe) from the fiber-bound engineered material.

Figure 33:
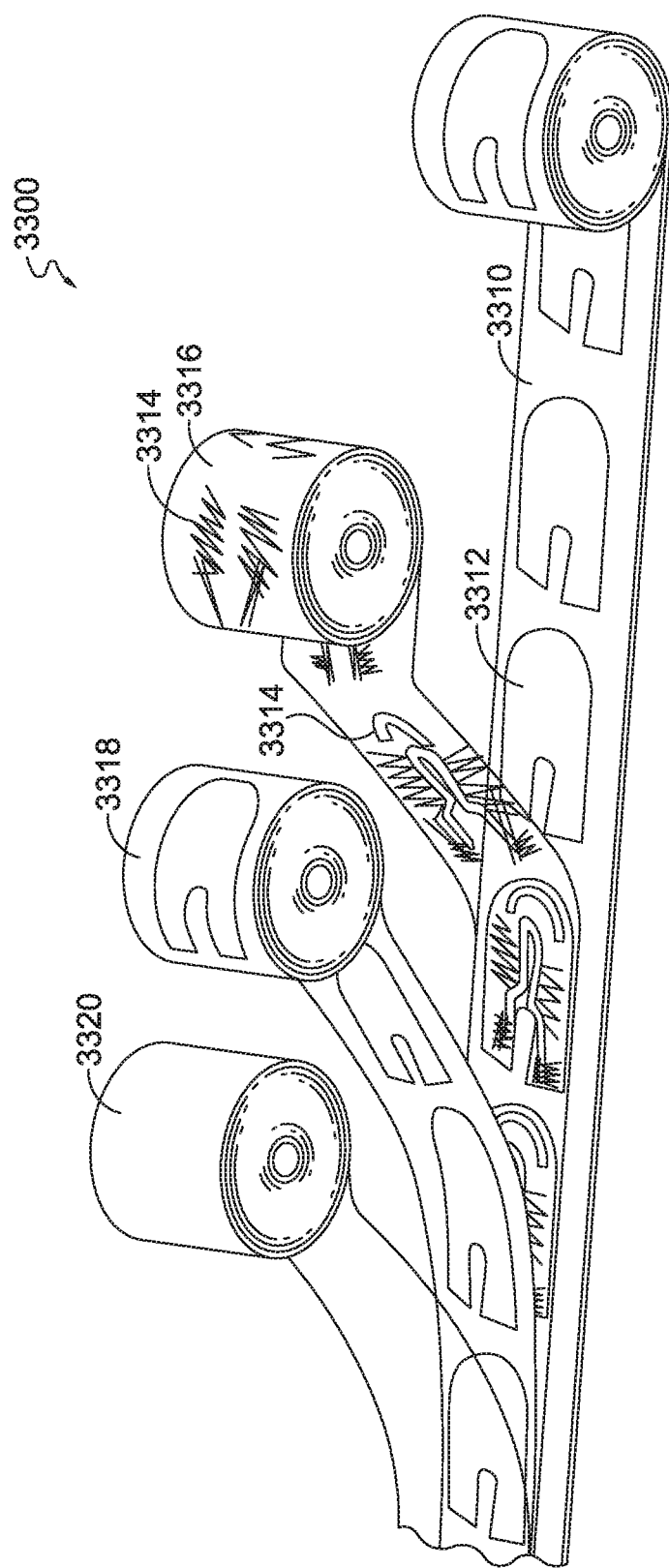
FIG. 33 depicts a configuration for manufacturing fiber-bound engineered materials utilizing pre-sized, cut fiber layers provided as a continuous roll, in accordance with aspects hereof.

Turning now to FIG. 33, a second exemplary conveyor-type configuration 3300 for forming fiber-bound engineered materials utilizing carrier screens is illustrated. The configuration 3300 includes a fluid-permeable first carrier screen 3310. The illustrated first carrier screen 3310 acts as a carrier for the input materials prior to and during processing. The configuration 3300 includes a first fiber layer 3312 comprised of a plurality of pre-sized, cut fiber batting pieces attached to a minimal or fugitive roll that is dissolved or otherwise removed during processing. Once the first fiber layer 3312 is in place, scrims and other desired elements (e.g., textiles, cables, elements formed of thermoplastic materials, foams, shaped polymeric or metal components, and the like) 3314 are placed (automatically or manually) on (or adjacent and overlapping in a Z-directional placement) the first fiber layer 3312. In the illustrated configuration 3300, the scrims and other desired elements 3314 are illustrated on a roll (which also may include a fugitive backing 3316 that is dissolved or otherwise removed during processing). Though not illustrated in FIG. 33, aspects hereof contemplate individually placed scrims and/or other desired elements as well.

On top of the scrims and other desired elements 3314 (or adjacent and overlapping in a Z-directional placement), an optional second fiber layer may be placed. The illustrated configuration 3300 includes a second fiber layer 3318 comprised of a plurality of pre-sized fiber pieces attached to a minimal or fugitive roll that is dissolved or otherwise removed during processing. The second fiber layer 3318 may be manually or automatically placed on the scrims and other desired elements 3314. In aspects, a fluid-permeable second carrier screen 3320 then may be placed on the second fiber layer 3318. The second carrier screen 3320, in cooperation with the first carrier screen 3310, holds the input materials (fiber layer(s), scrims and other desired elements) in place and under tension. The material input/carrier screen assembly may be conveyed to an entanglement machine, such as a hydroentanglement machine, that entangles the assembly into a fiber-bound engineered material.

Subsequent to entanglement, the first and second carrier screens 3310, 3320 may be removed and a fiber-bound, engineered material may be output. The fiber-bound engineered material then may pass through one or more manufacturing stations at which one or more post-processing operations may occur (e.g., cutting, trimming, energy application, application of colorants, dyes and finishes, application of impregnation polymers, molding, or tumbling). In alternative aspects, the first and second carrier screens 3310, 3320 may be maintained in place after entanglement and the fiber-bound, engineered material may be transported through one or more post-processing stations (for instance, for application of thermal energy (e.g., for drying), addition of colorants, dyes and/or finishes, or for the application of impregnation fibers). The fiber-bound engineered material then may enter into an article forming process, such as an automated shoe manufacturing process, to form a dimensional article (e.g., shoe) from the fiber-bound engineered material.

Figure 34:
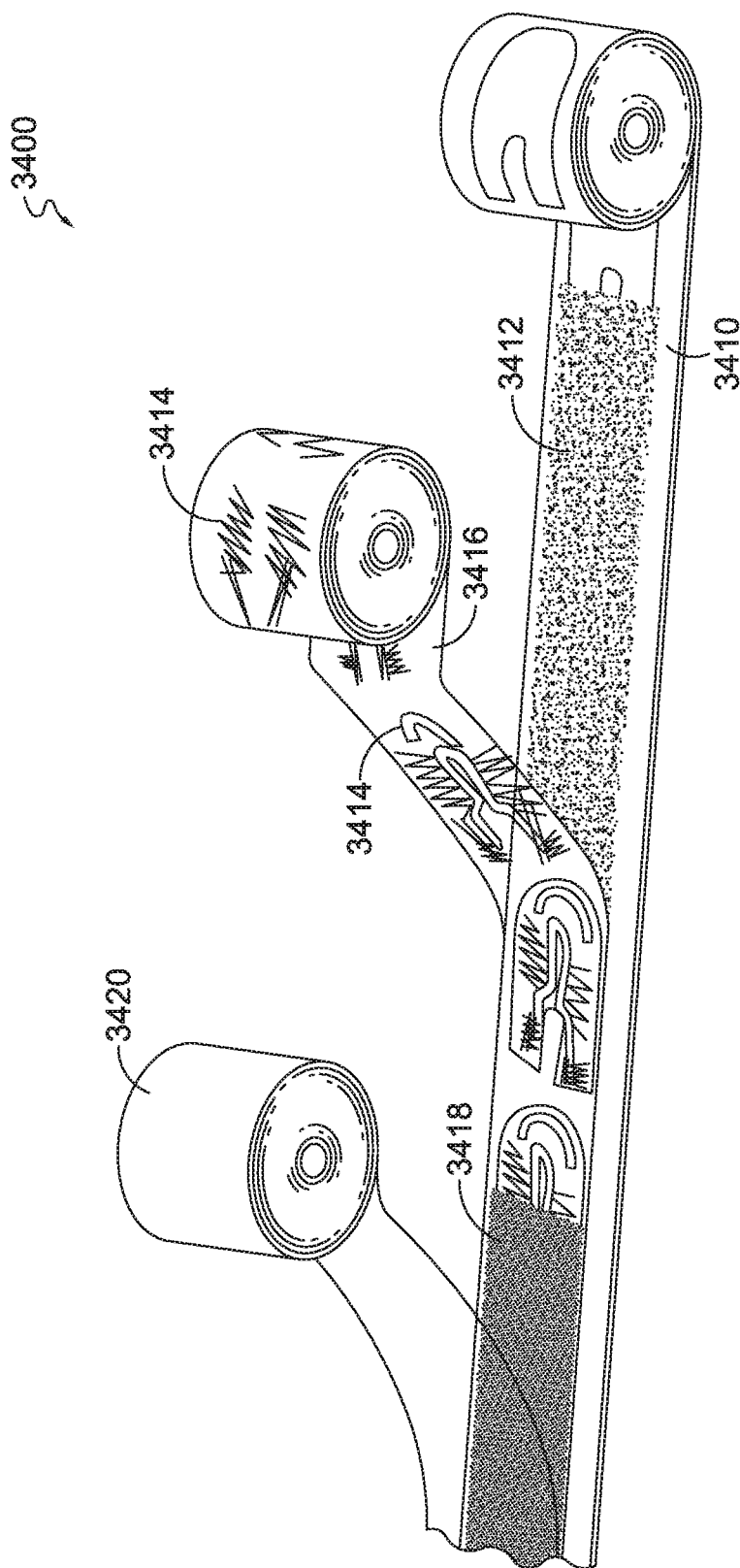
FIG. 34 depicts a configuration for manufacturing fiber-bound engineered materials utilizing loose cut fibers, in accordance with aspects hereof.

With reference now to FIG. 34, a third exemplary conveyor-type configuration 3400 for forming fiber-bound engineered materials utilizing carrier screens is illustrated. The configuration 3400 includes a fluid-permeable first carrier screen 3410. The illustrated first carrier screen 3410 acts as a carrier for the input materials prior to and during processing. The configuration 3400 includes a first fiber layer 3412 comprised of a plurality of loose fibers that are distributed onto the first carrier screen 3410. Once the first fiber layer 3412 is in place, scrims and other desired elements (e.g., textiles, cables, elements formed of thermoplastic materials, foams, shaped polymeric or metal components, and the like) 3414 are placed (automatically or manually) on (or adjacent and overlapping in a Z-directional placement) the first fiber layer 3412. In the illustrated configuration 3400, the scrims and other desired elements 3414 are illustrated on a roll (which may include a fugitive backing 3416 that is dissolved or otherwise removed during processing). Though not illustrated in FIG. 34, aspects hereof contemplate individually placed scrims and/or other desired elements as well.

On top of the scrims and other desired elements 3414 (or adjacent and overlapping in a Z-directional placement), an optional second fiber layer may be placed. The illustrated configuration 3400 includes a second fiber layer 3418 comprised of a plurality of loose fibers. The second fiber layer 3418 may be manually or automatically distributed onto the scrims and other desired elements 3414. A fluid-permeable second carrier screen 3420 then may be placed on the second fiber layer 3418. The second carrier screen 3420, in cooperation with the first carrier screen 3410, holds the input materials (fiber layer(s), scrims and other desired elements) in place and under tension. The material input/carrier screen assembly may be conveyed to an entanglement machine, such as a hydroentanglement machine, that entangles the assembly into a fiber-bound engineered material.

Subsequent to entanglement, the first and second carrier screens 3410, 3420 may be removed and a fiber-bound, engineered material may be output. The fiber-bound engineered material then may pass through one or more manufacturing stations at which one or more post-processing operations may occur (e.g., cutting, trimming, energy application, application of colorants, dyes and finishes, application of impregnation polymers, molding, or tumbling). In alternative aspects, the first and second carrier screens 3410, 3420 may be maintained in place after entanglement and the fiber-bound, engineered material may be transported through one or more post-processing stations (for instance, for application of thermal energy (e.g., for drying), addition of colorants, dyes and/or finishes, or for the application of impregnation fibers). The fiber-bound engineered material then may enter into an article forming process, such as an automated shoe manufacturing process, to form a dimensional article (e.g., shoe) from the fiber-bound engineered material.

In an exemplary aspect hereof, method of forming a component (for instance, a component of an article of footwear, an apparel component, or a sporting equipment component) is provided. The method comprises placing a fiber layer adjacent a first carrier screen, the fiber layer comprising a first plurality of fibers. The method further comprises placing a scrim on the first fiber layer, wherein the scrim comprises a second plurality of fibers, wherein the scrim includes a first surface and an opposite second surface, and wherein the scrim first surface is adjacent and overlapping the first fiber layer in a Z-directional placement. Still further, the method comprises entangling at least a portion of the first plurality of fibers with at least a portion of the second plurality of fibers.

In another exemplary aspect hereof, a method of forming a component (for instance, a component of an article of footwear, an apparel component, or a sporting equipment component) is provided. The method comprises placing a first fiber layer adjacent a first carrier screen, the first fiber layer comprising a first plurality of fibers. The method further comprises placing a scrim adjacent the first fiber layer, the scrim having a first surface and an opposite second surface, the scrim first surface being adjacent and overlapping the first fiber layer in a first Z-directional placement. Still further, the method comprises placing a second fiber layer on the second surface of the scrim, the second fiber layer comprising a second plurality of fibers and having a first surface and an opposite second surface, the first surface of the second fiber layer being adjacent and overlapping the second surface of the scrim in a second Z-directional placement. Further still, the method comprises entangling at least a portion of the first plurality of fibers with at least a portion of the second plurality of fibers.

Exemplary aspects hereof further provide a method of forming a component (for instance, a component of an article of footwear, an apparel component, or a sporting equipment component). The method comprises placing a first fiber layer adjacent a first carrier screen, the first fiber layer comprising a first plurality of fibers, wherein the first plurality of fibers comprises at least one of a plurality of loose fibers, a plurality of shaped fiber pieces, and a plurality of fibers adhered to a fugitive backing; placing a scrim adjacent the first fiber layer, the scrim having first surface and an opposite second surface, the scrim first surface being adjacent and overlapping the first fiber layer in a first Z-directional placement; placing a second fiber layer on the second surface of the scrim, the second fiber layer comprising a second plurality of fibers and having a first surface and an opposite second surface, the first surface of the second fiber layer being adjacent and overlapping the second surface of the scrim in a second Z-directional placement; placing a second carrier screen adjacent the second surface of the second fiber layer; and entangling at least a portion of the first plurality of fibers with at least a portion of the second plurality of fibers.

From the foregoing, it will be seen that aspects of this invention are well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

While specific elements and steps are described in connection to one another, it is understood that any element and/or steps provided herein are contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

Claims are provided hereinafter. Although the fiber-bound engineered materials formed utilizing engineered scrims and methods of manufacturing such materials are described above by referring to particular aspects, it should be understood that modifications and variations could be made without departing from the intended scope of protection provided by the following claims. It is contemplated that any one of the dependent claims may multiply depend from other claims of the same independent claim set. Therefore, while not specifically listed as "[t]he component of claims X-Y, wherein . . . " or "[t]he component of claims X-Y further comprising . . . ," the Applicant contemplates each dependent claim may be multiply dependent in some aspects.

As used herein and in connection with the features listed hereinafter, the terminology "any of features" or similar variations of said terminology is intended to be interpreted such that features may be combined in any combination. For example, an exemplary feature 4 may indicate the method/apparatus of any of features 1 through 3, which is intended to be interpreted such that elements of feature 1 and feature 4 may be combined, elements of feature 2 and feature 4 may be combined, elements of feature 3 and 4 may be combined, elements of features 1, 2, and 4 may be combined, elements of features 2, 3, and 4 may be combined, elements of features 1, 2, 3, and 4 may be combined, and/or other variations. Further, the terminology "any of features" or similar variations of said terminology is intended to include "any one of features" or other variations of such terminology, as indicated by some of the examples provided above.

Exemplary Features Having Multiple Dependency:

Feature 1. A method of forming a component, the method comprising: placing a first fiber layer adjacent a first carrier screen, the first fiber layer comprising a first plurality of fibers; placing a scrim adjacent the first fiber layer, wherein the scrim comprises a second plurality of fibers, wherein the scrim includes a first surface and an opposite second surface, and wherein the scrim first surface is adjacent and overlapping the first fiber layer in a Z-directional placement; and entangling at least a portion of the first plurality of fibers with at least a portion of the second plurality of fibers.

Feature 2. The method of feature 1, wherein the component is one of a component of an article of footwear, an apparel component, or a sporting equipment component.

Feature 3. The method of any of features 1 and 2, wherein the component is a component of an article of footwear.

Feature 4. The method of any of features 1 through 3, wherein the component is an upper of the article of footwear.

Feature 5. The method of feature 4, wherein the upper of the article of footwear is comprised of a medial portion, a lateral portion, and a forefoot region of the article of footwear.

Feature 6. The method of any of features 1 through 5, wherein the entangling is performed, at least in part, with a fluid stream.

Feature 7. The method of any of features 1 through 6, wherein the first plurality of fibers comprises, at least in part, a plurality of loose fibers.

Feature 8. The method of any of features 1 through 6, wherein the first plurality of fibers comprises, at least in part, a plurality of shaped fiber pieces.

Feature 9. The method of any of features 1 through 6, wherein the first plurality of fibers, at least in part, is adhered to a fugitive backing.

Feature 10. The method of any of features 1 through 9, further comprising placing a second carrier screen adjacent the second surface of the scrim.

Feature 11. The method of feature 10, wherein at least one of the first carrier screen and the second carrier screen is formed of a mesh comprised, at least in part, of a monofilament polymeric yarn, fiberglass filament, plastic fiber polyester fiber, a polymer extrusion, a film, cut netting, woven aluminum, woven bronze, or a multiple-material woven composition.

Feature 12. The method of any of features 10 and 11, wherein at least one of the first carrier screen and the second carrier screen is formed of a mesh including one or more warp apertures and one or more fill apertures.

Feature 13. The method of any of features 10 through 12, wherein at least one of the first carrier screen and the second carrier screen is formed of a mesh including a plurality of warp apertures and a plurality of fill apertures, wherein a quantity of warp apertures is between 14 and 20, and wherein a quantity of fill apertures is between 14 and 30.

Feature 14. The method of any of features 10 through 12, wherein at least one of the first carrier screen and the second carrier screen is formed of a mesh including a plurality of warp apertures and a plurality of fill apertures, wherein a quantity of warp apertures is between 16 and 20, and wherein a quantity of fill apertures is between 16 and 20.

Feature 15. The method of any of features 11 through 14, wherein the mesh comprises a diameter of 0.005 mm to 0.03 mm.

Feature 16. The method of any of features 11 and 14, wherein the mesh comprises a diameter of 0.01 mm to 0.025 mm.

Feature 17. The method of any of features 11 through 14, wherein the mesh comprises a diameter of 0.01 mm to 0.02 mm.

Feature 18. The method of any of features 1 through 17, wherein the first plurality of fibers comprises, at least in part, one selected from one selected from polyurethanes, thermoplastic polyurethanes, polyesters, polyethers, polyamides, polyolefins, polycarbonates, polyacrylates, aramids, cellulosic materials, glass, carbon, metals, minerals, co-polymers thereof, and any combinations thereof.

Feature 19. The method of any of features 1 through 18, further comprising applying energy to the component subsequent to entangling.

Feature 20. The method of any of features 1 through 19, further comprising impregnating the component with a polymer and forming the component into a synthetic leather.

Feature 21. The method of any of features 1 through 20, wherein the first plurality of fibers comprises a protein-based material.

Feature 22. The method of any of features 1 through 20, wherein the first plurality of fibers comprises an animal-derived material and a polymer material.

Feature 23. The method of any of features 1 through 22, wherein the scrim is formed as a knit, woven, braided, non-woven, direct-fiber-placed, molded, cast, extruded, deposited, expanded, reductions-formed, 3D-printed, sheet, film, or embroidered element.

Feature 24. The method of any of features 1 through 23, wherein the component has a first functional zone and a second functional zone, the first functional zone having a functional characteristic that differs from the same functional characteristic of the second functional zone.

Feature 25. The method of feature 24, wherein the functional characteristic differs by at least 10% between the first and second functional zones.

Feature 26. The method of any of features 24 and 25, wherein the functional characteristic is one of air permeability, porosity, moisture wicking capacity, water resistance, water proofing, imperviousness, hydrophobicity, fineness, burst strength, toughness, sheer force resistance, recovery after elongation, bending modulus, cold flexibility, resistance to crack propagation, thermal degradation resistance, thermal glass transition temperature, melting point, capacity to take a heat set, Z-directional thickness, gauge, specific gravity, density per unit area, weight per unit area, surface area, continuity of surface, dimensional stability, resistance to compression set, deformability, creep resistance, bonding capacity, adhesive compatibility, electrical conductance, light transmittance, fluid transfer capability, washability, resistance to shrinkage, resistance to solvents, colorability, colorfastness, resistance to UV light degradation, microbial resistance, moisture permeability, modulus of elasticity, abrasion resistance, resilience, durability, strength, tensile strength, hardness, flex elongation, tear strength, and thermal insulative capacity.

Feature 27. A component formed utilizing the method of any of features 1 through 26.

Feature 28. A component comprising: a first fiber layer comprising a first plurality of fibers; and a scrim comprising a second plurality of fibers, wherein the scrim includes a first surface and an opposite second surface, wherein at least a portion of the first plurality of fibers is entangled with at least a portion of the second plurality of fibers utilizing at least one carrier screen, and wherein the scrim first surface is adjacent and overlapping the first fiber layer in a Z-directional placement.

Feature 29. The component of feature 28, wherein the component is one of a component of an article of footwear, an apparel component, or a sporting equipment component.

Feature 30. The component of any of features 28 and 29, wherein the component is a component of an article of footwear.

Feature 31. The component of any of features 28 through 30, wherein the component is an upper of the article of footwear.

Feature 32. The component of any of features 28 through 31, wherein the upper of the article of footwear is comprised of a medial portion, a lateral portion, and a forefoot region of the article of footwear.

Feature 33. The component of any of features 28 through 32, wherein the first plurality of fibers comprises, at least in part, a plurality of loose fibers.

Feature 34. The component of any of features 28 through 32, wherein the first plurality of fibers comprises, at least in part, a plurality of shaped fiber pieces.

Feature 35. The component of any of features 28 through 32, wherein the first plurality of fibers, at least in part, is adhered to a fugitive backing.

Feature 36. The component of any of features 28 through 35, wherein the at least one carrier screen is formed of a mesh comprised, at least in part, of a monofilament polymeric yarn, fiberglass filament, plastic fiber, polyester fiber, a polymer extrusion, a film, cut netting, woven aluminum, woven bronze, or a multiple-material woven composition.

Feature 37. The component of any of features 28 through 36, wherein the at least one carrier screen is formed of a mesh including one or more warp apertures and one or more fill apertures.

Feature 38. The component of any of features 28 through 37, wherein the at least one carrier screen is formed of a mesh including a plurality of warp apertures and a plurality of fill apertures, wherein a quantity of warp apertures is between 14 and 20, and wherein a quantity of fill apertures is between 14 and 30.

Feature 39. The component of any of features 28 through 37, wherein the at least one carrier screen is formed of a mesh including a plurality of warp apertures and a plurality of fill apertures, wherein a quantity of warp apertures is between 16 and 20, and wherein a quantity of fill apertures is between 16 and 20.

Feature 40. The component of any of features 37 through 39, wherein the mesh comprises a diameter of 0.005 mm to 0.03 mm.

Feature 41. The component of any of features 37 and 39, wherein the mesh comprises a diameter of 0.01 mm to 0.025 mm.

Feature 42. The component of any of features 37 through 39, wherein the mesh comprises a diameter of 0.01 mm to 0.02 mm.

Feature 43. The component of any of features 28 through 42, wherein at least one of the first plurality of fibers and the second plurality of fibers comprises, at least in part, one selected at least one selected from polyurethanes, thermoplastic polyurethanes, polyesters, polyethers, polyamides, polyolefins, polycarbonates, polyacrylates, aramids, cellulosic materials, glass, carbon, metals, minerals, co-polymers thereof, and any combinations thereof.

Feature 44. The component of any of features 28 through 43, wherein the component is impregnated forming a synthetic leather.

Feature 45. The component of any of features 28 and 44, wherein the first plurality of fibers comprises a polymeric composition comprised of at least one polymer.

Feature 46. The component of any of features 28 through 45, wherein the first plurality of fibers comprises at least one selected from polyurethanes, thermoplastic polyurethanes, polyesters, polyethers, polyamides, polyolefins, polycarbonates, polyacrylates, aramids, cellulosic materials, glass, carbon, metals, minerals, co-polymers thereof, and any combinations thereof.

Feature 47. The component of any of features 28 through 45, wherein the first plurality of fibers is comprised of at least one polymer that consists essentially of at least one selected from polyurethanes, thermoplastic polyurethanes, polyesters, polyethers, polyamides, polyolefins, polycarbonates, polyacrylates, aramids, cellulosic materials, glass, carbon, metals, minerals, co-polymers thereof, and any combinations thereof.

Feature 48. The component of any of features 28 through 47, wherein the first plurality of fibers is comprised of a staple fiber or a continuous filament fiber.

Feature 49. The component of any of features 28 through 48, wherein the first plurality of fibers is comprised of a fiber having a linear mass density measurement of 1 denier per filament (dpf) to 9 dpf.

Feature 50. The component of any of features 28 through 48, wherein the first plurality of fibers is comprised of a fiber having a linear mass density measurement of 1 denier per filament (dpf) to 4 dpf.

Feature 51. The component of any of features 28 through 48, wherein the first plurality of fibers is comprised of a fiber having a linear mass density measurement of 0.001 denier per filament (dpf) to 0.999 dpf.

Feature 52. The component of any of features 28 through 48, wherein the first plurality of fibers is comprised of a fiber having a width measurement of 200 microns to 100 nanometers.

Feature 53. The component of any of features 28 through 48, wherein the first plurality of fibers is comprised of a fiber having a width measurement of 100 microns to 100 nanometers.

Feature 54. The component of any of features 28 through 48, wherein the first plurality of fibers is comprised of a fiber having a width measurement of 25 microns to 0.01 microns.

Feature 55. The component of any of features 28 through 48, wherein the first plurality of fibers is comprised of a fiber having a width measurement of 10 microns to 0.01 microns.

Feature 56. The component of any of features 28 through 55, wherein the first fiber layer is a non-woven textile.

Feature 57. The component of any of features 28 through 56, wherein the first plurality of fibers comprises a protein-based material.

Feature 58. The component of any of features 28 through 57, wherein the first plurality of fibers comprises an animal-derived material and a polymer material.

Feature 59. The component of any of features 28 through 58, wherein the scrim is formed as a knit, woven, braided, non-woven, direct-fiber-placed, molded, cast, extruded, deposited, expanded, reductions-formed, 3D-printed, sheet, film, or embroidered element.

Feature 60. The component of any of features 28 through 59, wherein the component has a first functional zone and a second functional zone, the first functional zone having a functional characteristic that differs from the same functional characteristic of the second functional zone.

Feature 61. The component of feature 60, wherein the functional characteristic differs by at least 10% between the first and second functional zones.

Feature 62. The component of any of features 60 and 61, wherein the functional characteristic is one of air permeability, porosity, moisture wicking capacity, water resistance, water proofing, imperviousness, hydrophobicity, fineness, burst strength, toughness, sheer force resistance, recovery after elongation, bending modulus, cold flexibility, resistance to crack propagation, thermal degradation resistance, thermal glass transition temperature, melting point, capacity to take a heat set, Z-directional thickness, gauge, specific gravity, density per unit area, weight per unit area, surface area, continuity of surface, dimensional stability, resistance to compression set, deformability, creep resistance, bonding capacity, adhesive compatibility, electrical conductance, light transmittance, fluid transfer capability, washability, resistance to shrinkage, resistance to solvents, colorability, colorfastness, resistance to UV light degradation, microbial resistance, moisture permeability, modulus of elasticity, abrasion resistance, resilience, durability, strength, tensile strength, hardness, flex elongation, tear strength, and thermal insulative capacity.

Feature 63. The component of any of features 28 through 62, wherein a density of at least one of the first plurality of fibers, the second plurality of fibers, and the entangled first and second pluralities of fibers is at least 10% greater in a first section of the component as compared to a second section of the component, each of the first and second sections having a surface area of at least 0.25 cm².

Feature 64. A method of forming a component, the method comprising: placing a first fiber layer adjacent a first carrier screen, the first fiber layer comprising a first plurality of fibers; placing a scrim adjacent the first fiber layer, the scrim having first surface and an opposite second surface, the scrim first surface being adjacent and overlapping the first fiber layer in a first Z-directional placement; placing a second fiber layer on the second surface of the scrim, the second fiber layer comprising a second plurality of fibers and having a first surface and an opposite second surface, the first surface of the second fiber layer being adjacent and overlapping the second surface of the scrim in a second Z-directional placement; and entangling at least a portion of the first plurality of fibers with at least a portion of the second plurality of fibers.

Feature 65. The method of feature 64, wherein the component is one of a component of an article of footwear, an apparel component, or a sporting equipment component.

Feature 66. The method of any of features 64 and 65, wherein the component is a component of an article of footwear.

Feature 67. The method of any of features 64 through 66, wherein the component is an upper of the article of footwear.

Feature 68. The method of feature 67, wherein the upper of the article of footwear is comprised of a medial portion, a lateral portion, and a forefoot region of the article of footwear.

Feature 69. The method of any of features 64 through 68, wherein the entangling is performed, at least in part, with a fluid stream.

Feature 70. The method of any of features 64 through 69, wherein the first plurality of fibers comprises, at least in part, a plurality of loose fibers.

Feature 71. The method of any of features 64 through 69, wherein the first plurality of fibers comprises, at least in part, a plurality of shaped fiber pieces.

Feature 72. The method of any of features 64 through 69, wherein the first plurality of fibers, at least in part, is adhered to a fugitive backing.

Feature 73. The method of any of features 64 through 72, further comprising placing a second carrier screen adjacent the second surface of the second fiber layer;

Feature 74. The method of any of features 64 through 73, wherein at least one of the first carrier screen and the second carrier screen is formed of a mesh comprised, at least in part, of a monofilament polymeric yarn, fiberglass filament, plastic fiber polyester fiber, a polymer extrusion, a film, cut netting, woven aluminum, woven bronze, or a multiple-material woven composition.

Feature 75. The method of any of features 64 through 74, wherein at least one of the first carrier screen and the second carrier screen is formed of a mesh including one or more warp apertures and one or more fill apertures.

Feature 76. The method of any of features 64 through 75, wherein at least one of the first carrier screen and the second carrier screen is formed of a mesh including a plurality of warp apertures and a plurality of fill apertures, wherein a quantity of warp apertures is between 14 and 20, and wherein a quantity of fill apertures is between 14 and 30.

Feature 77. The method of any of features 64 through 75, wherein at least one of the first carrier screen and the second carrier screen is formed of a mesh including a plurality of warp apertures and a plurality of fill apertures, wherein a quantity of warp apertures is between 16 and 20, and wherein a quantity of fill apertures is between 16 and 20.

Feature 78. The method of any of features 75 through 77, wherein the mesh comprises a diameter of 0.005 mm to 0.03 mm.

Feature 79. The method of any of features 75 and 77, wherein the mesh comprises a diameter of 0.01 mm to 0.025 mm.

Feature 80. The method of any of features 75 through 77, wherein the mesh comprises a diameter of 0.01 mm to 0.02 mm Feature 81. The method of any of features 64 through 80, wherein at least one of the first plurality of fibers and the second plurality of fibers comprises, at least in part, at least one selected from polyurethanes, thermoplastic polyurethanes, polyesters, polyethers, polyamides, polyolefins, polycarbonates, polyacrylates, aramids, cellulosic materials, glass, carbon, metals, minerals, co-polymers thereof, and any combinations thereof.

Feature 82. The method of any of features 64 through 81, further comprising applying energy to the component subsequent to entangling.

Feature 83. The method of any of features 64 through 82, further comprising impregnating the component with a polymer and forming the component into a synthetic leather.

Feature 84. The method of any of features 64 through 83, wherein the first plurality of fibers comprises a protein-based material.

Feature 85. The method of any of features 64 through 83, wherein the first plurality of fibers comprises an animal-derived material and a polymer material.

Feature 86. The method of any of features 64 through 85, wherein the scrim is formed as a knit, woven, braided, non-woven, direct-fiber-placed, molded, cast, extruded, deposited, expanded, reductions-formed, 3D-printed, sheet, film, or embroidered element.

Feature 87. The method of any of features 64 through 86, wherein the component has a first functional zone and a different second functional zone, the first functional zone having a functional characteristic that differs from the same functional characteristic of the second functional zone.

Feature 88. The method of feature 87, wherein functional characteristic differs by at least 10% between the first and second functional zones.

Feature 89. The method of any of features 87 and 88, wherein the functional characteristic is one of air permeability, porosity, moisture wicking capacity, water resistance, water proofing, imperviousness, hydrophobicity, fineness, burst strength, toughness, sheer force resistance, recovery after elongation, bending modulus, cold flexibility, resistance to crack propagation, thermal degradation resistance, thermal glass transition temperature, melting point, capacity to take a heat set, Z-directional thickness, gauge, specific gravity, density per unit area, weight per unit area, surface area, continuity of surface, dimensional stability, resistance to compression set, deformability, creep resistance, bonding capacity, adhesive compatibility, electrical conductance, light transmittance, fluid transfer capability, washability, resistance to shrinkage, resistance to solvents, colorability, colorfastness, resistance to UV light degradation, microbial resistance, moisture permeability, modulus of elasticity, abrasion resistance, resilience, durability, strength, tensile strength, hardness, flex elongation, tear strength, and thermal insulative capacity.

Feature 90. A component formed utilizing the method of any of feature 64 through 89.

Feature 91. A component comprising: a first fiber layer comprising a first plurality of fibers; a scrim including a first surface and an opposite second surface, wherein the scrim first surface is adjacent and overlapping the first fiber layer in a first Z-directional placement; and a second fiber layer, the second fiber layer comprising a second plurality of fibers and having a first surface and an opposite second surface, the first surface of the second fiber layer being adjacent and overlapping the second surface of the scrim in a second Z-directional placement, wherein at least a portion of the first plurality of fibers is entangled with at least a portion of the second plurality of fibers utilizing at least one carrier screen.

Feature 92. The component of feature 91, wherein the component is one of a component of an article of footwear, an apparel component, or a sporting equipment component.

Feature 93. The component of any of features 91 and 92, wherein the component is a component of an article of footwear.

Feature 94. The component of any of features 91 through 93, wherein the component is an upper of the article of footwear.

Feature 95. The component of any of feature 94, wherein the upper of the article of footwear is comprised of a medial portion, a lateral portion, and a forefoot region of the article of footwear.

Feature 96. The component of any of features 91 through 95, wherein the first plurality of fibers comprises, at least in part, a plurality of loose fibers.

Feature 97. The component of any of features 91 through 95, wherein the first plurality of fibers comprises, at least in part, a plurality of shaped fiber pieces.

Feature 98. The component of any of features 91 through 95, wherein the first plurality of fibers, at least in part, is adhered to a fugitive backing.

Feature 99. The component of any of features 91 through 98, wherein the at least one carrier screen is formed of a mesh comprised, at least in part, of a monofilament polymeric yarn, fiberglass filament, plastic fiber polyester fiber, a polymer extrusion, a film, cut netting, woven aluminum, woven bronze, or a multiple-material woven composition.

Feature 100. The component of any of features 91 through 99, wherein the at least one carrier screen is formed of a mesh including one or more warp apertures and one or more fill apertures.

Feature 101. The component of any of features 91 through 100, wherein the at least one carrier screen is formed of a mesh including a plurality of warp apertures and a plurality of fill apertures, wherein a quantity of warp apertures is between 14 and 20, and wherein a quantity of fill apertures is between 14 and 30.

Feature 102. The component of any of features 91 through 100, wherein the at least one carrier screen is formed of a mesh including a plurality of warp apertures and a plurality of fill apertures, wherein a quantity of warp apertures is between 16 and 20, and wherein a quantity of fill apertures is between 16 and 20.

Feature 103. The component of any of features 99 through 102, wherein the mesh comprises a diameter of 0.005 mm to 0.03 mm.

Feature 104. The component of any of features 99 and 102, wherein the mesh comprises a diameter of 0.01 mm to 0.025 mm.

Feature 105. The component of any of features 99 through 102, wherein the mesh comprises a diameter of 0.01 mm to 0.02 mm.

Feature 106. The component of any of features 91 through 105, wherein at least one of the first plurality of fibers and the second plurality of fibers comprises, at least in part, at least one selected from polyurethanes, thermoplastic polyurethanes, polyesters, polyethers, polyamides, polyolefins, polycarbonates, polyacrylates, aramids, cellulosic materials, glass, carbon, metals, minerals, co-polymers thereof, and any combinations thereof.

Feature 107. The component of any of features 91 through 106, wherein at least one of the first plurality of fibers and the second plurality of fibers comprises a polymeric composition comprised of at least one polymer.

Feature 108. The component of any of features 91 through 107, wherein at least one of the first plurality of fibers and the second plurality of fibers comprises at least one selected from a thermoplastic polyurethane, polyurethane, polyester, polyamides, polyolefin, polycarbonate and co-polymers thereof.

Feature 109. The component of any of features 91 through 107, wherein at least one of the first plurality of fibers and the second plurality of fibers is comprised of at least one polymer that consists essentially of at least one selected from a thermoplastic polyurethane, polyurethane, polyester, polyamides, polyolefin, polycarbonate and co-polymers thereof.

Feature 110. The component of any of features 91 through 109, wherein at least one of the first plurality of fibers and the second plurality of fibers is comprised of a staple fiber or a continuous filament fiber.

Feature 111. The component of any of features 91 through 110, wherein at least one of the first plurality of fibers and the second plurality of fibers is comprised of a fiber having a linear mass density measurement of 1 denier per filament (dpf) to 9 dpf.

Feature 112. The component of any of features 91 through 110, wherein at least one of the first plurality of fibers and the second plurality of fibers is comprised of a fiber having a linear mass density measurement of 1 denier per filament (dpf) to 4 dpf.

Feature 113. The component of any of features 91 through 110, wherein at least one of the first plurality of fibers and the second plurality of fibers is comprised of a fiber having a linear mass density measurement of 0.001 denier per filament (dpf) to 0.999 dpf.

Feature 114. The component of any of features 91 through 110, wherein at least one of the first plurality of fibers and the second plurality of fibers is comprised of a fiber having a width measurement of 200 microns to 100 nanometers.

Feature 115. The component of any of features 91 through 110, wherein at least one of the first plurality of fibers and the second plurality of fibers is comprised of a fiber having a width measurement of 100 microns to 100 nanometers.

Feature 116. The component of any of features 91 through 110, wherein at least one of the first plurality of fibers and the second plurality of fibers is comprised of a fiber having a width measurement of 25 microns to 0.01 microns.

Feature 117. The component of any of features 91 through 110, wherein at least one of the first plurality of fibers and the second plurality of fibers is comprised of a fiber having a width measurement of 10 microns to 0.01 microns.

Feature 118. The component of any of features 91 through 117, wherein at least one of the first fiber layer and the second fiber layer comprises is a non-woven textile.

Feature 119. The component of any of features 91 through 118, wherein the component is impregnated forming a synthetic leather.

Feature 120. The component of any of features 91 through 119, wherein at least one of the first plurality of fibers and the second plurality of fibers comprises a protein-based material.

Feature 121. The component of any of features 91 through 120, wherein at least one of the first plurality of fibers and the second plurality of fibers comprises an animal-derived material and a polymer material.

Feature 122. The component of any of features 91 through 121, wherein the scrim is formed as a knit, woven, braided, non-woven, direct-fiber-placed, molded, cast, extruded, deposited, expanded, reductions-formed, 3D-printed, sheet, film, or embroidered element.

Feature 123. The component of any of features 91 through 122, wherein the component has a first functional zone and a different second functional zone, the first functional zone having a functional characteristic that differs from the same functional characteristic of the second functional zone.

Feature 124. The component of feature 123, wherein functional characteristic differs by at least 10% between the first and second functional zones.

Feature 125. The component of any of features 123 and 124, wherein the functional characteristic is one of air permeability, porosity, moisture wicking capacity, water resistance, water proofing, imperviousness, hydrophobicity, fineness, burst strength, toughness, sheer force resistance, recovery after elongation, bending modulus, cold flexibility, resistance to crack propagation, thermal degradation resistance, thermal glass transition temperature, melting point, capacity to take a heat set, Z-directional thickness, gauge, specific gravity, density per unit area, weight per unit area, surface area, continuity of surface, dimensional stability, resistance to compression set, deformability, creep resistance, bonding capacity, adhesive compatibility, electrical conductance, light transmittance, fluid transfer capability, wash ability, resistance to shrinkage, resistance to solvents, colorability, colorfastness, resistance to UV light degradation, microbial resistance, moisture permeability, modulus of elasticity, abrasion resistance, resilience, durability, strength, tensile strength, hardness, flex elongation, tear strength, and thermal insulative capacity.

Feature 126. The component of any of features 91 through 125, wherein a density of at least one of the first plurality of fibers, the second plurality of fibers, and the entangled first and second pluralities of fibers is at least 10% greater in a first segment of the component as compared to a second segment of the component, each of the first and second segments having a surface area of at least 0.25 cm$^2$.

Feature 127. A method of forming a component comprising: placing a first fiber layer adjacent a first carrier screen, the first fiber layer comprising a first plurality of fibers, wherein the first plurality of fibers comprises at least one of a plurality of loose fibers, a plurality of shaped fiber pieces, and a plurality of fibers adhered to a fugitive backing; placing a scrim adjacent the first fiber layer, the scrim having first surface and an opposite second surface, the scrim first surface being adjacent and overlapping the first fiber layer in a first Z-directional placement; placing a second fiber layer on the second surface of the scrim, the second fiber layer comprising a second plurality of fibers and having a first surface and an opposite second surface, the first surface of the second fiber layer being adjacent and overlapping the second surface of the scrim in a second Z-directional placement; placing a second carrier screen adjacent the second surface of the second fiber layer; and entangling at least a portion of the first plurality of fibers with at least a portion of the second plurality of fibers.

Feature 128. The method of feature 127, wherein the component is one of a component of an article of footwear, an apparel component, or a sporting equipment component.

Feature 129. The method of any of features 127 and 128, wherein the component is a component of an article of footwear.

Feature 130. The method of any of features 127 through 129, wherein the component is an upper of the article of footwear.

Feature 131. The method of feature 130, wherein the upper of the article of footwear is comprised of a medial portion, a lateral portion, and a forefoot region of the article of footwear.

Feature 132. The method of any of features 127 through 131, wherein the entangling is performed, at least in part, with a fluid stream.

Feature 133. The method of any of features 127 through 132, wherein at least one of the first plurality of fibers and the second plurality of fibers comprises, at least in part, a plurality of loose fibers.

Feature 134. The method of any of features 127 through 132, wherein at least one of the first plurality of fibers and the second plurality of fibers comprises, at least in part, a plurality of shaped fiber pieces.

Feature 135. The method of any of features 127 through 132, wherein at least one of the first plurality of fibers and the second plurality of fibers, at least in part, is adhered to a fugitive backing.

Feature 136. The method of any of features 127 through 135, wherein at least one of the first carrier screen and the second carrier screen is formed of a mesh comprised, at least in part, of a monofilament polymeric yarn, fiberglass filament, plastic fiber polyester fiber, a polymer extrusion, a film, cut netting, woven aluminum, woven bronze, or a multiple-material woven composition.

Feature 137. The method of any of features 127 through 136, wherein at least one of the first carrier screen and the second carrier screen is formed of a mesh including one or more warp apertures and one or more fill apertures.

Feature 138. The method of any of features 127 through 137, wherein at least one of the first carrier screen and the second carrier screen is formed of a mesh including a plurality of warp apertures and a plurality of fill apertures, wherein a quantity of warp apertures is between 14 and 20, and wherein a quantity of fill apertures is between 14 and 30.

Feature 139. The method of any of features 127 through 137, wherein at least one of the first carrier screen and the second carrier screen is formed of a mesh including a plurality of warp apertures and a plurality of fill apertures, wherein a quantity of warp apertures is between 16 and 20, and wherein a quantity of fill apertures is between 16 and 20.

Feature 140. The method of any of features 136 through 139, wherein the mesh comprises a diameter of 0.005 mm to 0.03 mm.

Feature 141. The method of any of features 136 and 139, wherein the mesh comprises a diameter of 0.01 mm to 0.025 mm.

Feature 142. The method of any of features 136 through 139, wherein the mesh comprises a diameter of 0.01 mm to 0.02 mm.

Feature 143. The method of any of features 127 through 142, wherein at least one of the first plurality of fibers and the second plurality of fibers comprises, at least in part, one selected from an aramid, a glass, a cellulose-based material, a protein-based material, a thermoplastic polyurethane, polyurethane, polyester, polyamides, polyolefin, or polycarbonate.

Feature 144. The method of any of features 127 through 143, further comprising applying energy to the component subsequent to entangling.

Feature 145. The method of any of features 127 through 144, further comprising impregnating the component with a polymer and forming the component into a synthetic leather.

Feature 146. The method of any of features 127 through 145, wherein at least one of the first plurality of fibers and the second plurality of fibers comprises a protein-based material.

Feature 147. The method of any of features 127 through 146, wherein at least one of the first plurality of fibers and the second plurality of fibers comprises an animal-derived material and a polymer material.

Feature 148. The method of any of features 127 through 147, wherein the scrim is formed as a knit, woven, braided, non-woven, direct-fiber-placed, molded, cast, extruded, deposited, expanded, reductions-formed, sheet, film, or embroidered element.

Feature 149. The method of any of features 127 through 148, wherein the component has a first functional zone and a different second functional zone, the first functional zone having a functional characteristic that differs from the same functional characteristic of the second functional zone.

Feature 150. The method of feature 149, wherein the functional characteristic differs by at least 10% between the first and second functional zones.

Feature 151. The method of any of features 149 and 150, wherein the functional characteristic is one of air permeability, porosity, moisture wicking capacity, water resistance, water proofing, imperviousness, hydrophobicity, fineness, burst strength, toughness, sheer force resistance, recovery after elongation, bending modulus, cold flexibility, resistance to crack propagation, thermal degradation resistance, thermal glass transition temperature, melting point, capacity to take a heat set, Z-directional thickness, gauge, specific gravity, density per unit area, weight per unit area, surface area, continuity of surface, dimensional stability, resistance to compression set, deformability, creep resistance, bonding capacity, adhesive compatibility, electrical conductance, light transmittance, fluid transfer capability, wash ability, resistance to shrinkage, resistance to solvents, colorability, colorfastness, resistance to UV light degradation, microbial resistance, moisture permeability, modulus of elasticity, abrasion resistance, resilience, durability, strength, tensile strength, hardness, flex elongation, tear strength, and thermal insulative capacity.

Feature 152. A component formed utilizing the method of any of features 127 through 151.

What is claimed is:

1. A method of forming fiber-bound engineered components that can be incorporated into an article, the method comprising:
    placing a plurality of substantially identical discrete fiber layers each made of a first plurality of fibers within discrete locations along a length of a continuous elongated carrier screen having a plurality of apertures through which fluid can pass and functioning as a conveyor belt for the discrete fiber layers, the discrete locations each comprising only a portion of a total area of the carrier screen;
    placing a discrete scrim made of a second plurality of fibers on top of and in registration with each discrete fiber layer such that each scrim overlies its associated discrete fiber layer to form an assembly; and
    as to each assembly, entangling at least a portion of the first plurality of fibers with at least a portion of the second plurality of fibers by passing a fluid stream through the apertures of the carrier screen to form a fiber-bound engineered component.

2. The method of claim 1, wherein the fiber-bound engineered components are components of an article of footwear, an apparel component, or a sporting equipment component.

3. The method of claim 1, wherein the discrete scrims are adhered to a fugitive backing.

4. The method of claim 1, further comprising placing a further carrier screen over the discrete scrims to sandwich the discrete fiber layers and the discrete scrims between the two carrier screens prior to entangling.

5. The method of claim 4, wherein at least one of the carrier screens is formed of a mesh comprising, at least in part, a monofilament polymeric yarn, fiberglass filament, plastic fiber, polyester fiber, a polymer extrusion, a film, cut netting, woven aluminum, woven bronze, or a multiple-material woven composition.

6. The method of claim 4, wherein at least one of the carrier screens is formed of a mesh including a plurality of warp apertures and a plurality of fill apertures, wherein the at least one carrier screen includes 14 to 20 warp apertures per square inch and 14 to 30 fill apertures per square inch.

7. The method of claim 4, wherein at least one of the carrier screens is formed of a mesh including a plurality of warp apertures and a plurality of fill apertures, wherein the at least one carrier screen includes 16 to 20 warp apertures per square inch and 16 to 20 fill apertures per square inch.

8. The method of claim 1, further comprising placing a further discrete fiber layer on top of and in registration with each discrete scrim prior to entangling, the further discrete fiber layers each comprising a third plurality of fibers so that, within each assembly, at least a portion of the third plurality of fibers is entangled with at least a portion of the second plurality of fibers.

9. The method of claim 1, wherein the carrier screen and its discrete fiber layers are wound up as a continuous roll.

10. The method of claim 9, further comprising unwinding the carrier screen from the continuous roll.

11. A method of forming a plurality of fiber-bound engineered components that can be incorporated into articles, the method comprising:
   providing a carrier screen having a plurality of apertures through which fluid can pass, the carrier screen being configured as a continuous elongated screen;
   placing a plurality of discrete fiber elements on a surface of the carrier screen at discrete spaced locations along a length of the carrier screen;
   sequentially delivering each discrete fiber element to a first station with the carrier screen;
   sequentially placing a discrete scrim on top of and in registration with each discrete fiber element at the first station to form a plurality of composite elements on the carrier screen;
   sequentially delivering each composite element to a second station with the carrier screen; and
   sequentially entangling the discrete fiber element and the discrete scrim of each composite element together at the second station by passing a fluid stream through the apertures of the carrier screen to form the plurality of fiber-bound engineered components.

12. The method of claim 11, wherein the carrier screen is wound up to form a continuous roll and wherein sequentially delivering each discrete fiber element to a first station and sequentially delivering each composite element to a second station comprises unwinding the carrier screen from the roll.

13. The method of claim 12, wherein the discrete scrims are provided on a continuous elongated fugitive backing that is applied to the carrier screen at the first station.

14. The method of claim 13, wherein the fugitive backing is wound up to form a further continuous roll and wherein sequentially placing a discrete scrim on top of and in registration with each discrete fiber element comprises unwinding the fugitive backing from its roll.

15. The method of claim 14, further comprising covering the plurality of composite elements with a further carrier screen at a third station to sandwich the composite elements between the two carrier screens prior to entangling, the further carrier screen also being configured as a continuous elongated screen having a plurality of apertures through which fluid can pass.

16. The method of claim 15, wherein the further carrier screen is wound up to form a continuous roll and wherein covering the plurality of composite elements comprises unwinding the further carrier screen from its roll.

17. A method of forming a plurality of fiber-bound engineered components that can be incorporated into articles, the method comprising:
   providing a carrier screen having a plurality of apertures through which fluid can pass, the carrier screen being configured as a continuous elongated screen;
   placing a plurality of first discrete fiber elements on a surface of the carrier screen at discrete spaced locations along a length of the carrier screen;
   sequentially delivering each first discrete fiber element to a first station with the carrier screen;
   sequentially placing a discrete fluid-impervious scrim on top of and in registration with each first discrete fiber element at the first station to form a plurality of first composite elements on the carrier screen;
   sequentially delivering each first composite element to a second station with the carrier screen;
   sequentially placing a second discrete fiber element on top of and in registration with each first discrete fiber element to form a plurality of second composite elements on the carrier screen at the second station, each second composite element including a discrete fluid-impervious scrim positioned between the two discrete fiber elements;
   sequentially delivering each second composite element to a third station with the carrier screen; and
   sequentially entangling the first and second discrete fiber elements of each second composite element together at the third station by passing a fluid stream through the apertures of the carrier screen to form the plurality of fiber-bound engineered components, each fiber-bound engineered component having a discrete fluid-impervious scrim encased between two discrete fiber elements.

* * * * *